(12) United States Patent
Fitzgerald et al.

(10) Patent No.: US 7,874,562 B2
(45) Date of Patent: Jan. 25, 2011

(54) GUIDES AND OTHER APPARATUS FOR INSERTING A CART, SUCH AS A CART WITH ONE OR MORE FIXED WHEELS, INTO AN ENCLOSURE

(75) Inventors: Robert M. Fitzgerald, Norcross, GA (US); Kyle Joiner, Roswell, GA (US); Ward P. Broom, Snellville, GA (US)

(73) Assignee: Innovative Product Achievements, Inc.

( * ) Notice: Subject to any disclaimer, the term of this patent is extended or adjusted under 35 U.S.C. 154(b) by 377 days.

(21) Appl. No.: 11/778,422

(22) Filed: Jul. 16, 2007

(65) Prior Publication Data

US 2008/0272564 A1 Nov. 6, 2008

Related U.S. Application Data

(63) Continuation-in-part of application No. 11/744,387, filed on May 4, 2007, now Pat. No. 7,628,410.

(51) Int. Cl.
*B62B 3/00* (2006.01)
(52) U.S. Cl. .................. 280/47.34; 280/79.11; 280/761
(58) Field of Classification Search .............. 280/47.34, 280/47.35, 79.11, 79.3, 288.4, 293, 295, 280/296, 267, 761; 312/311, 249.9, 249.1, 312/326, 329, 307, 318, 292, 310, 319, 349, 312/350, 249.8; 414/266, 267
See application file for complete search history.

(56) References Cited

U.S. PATENT DOCUMENTS 3,058,320 A * 10/1962 Foster et al. .................. 62/382
3,249,294 A 5/1966 Hughes et al.
3,392,543 A 7/1968 Miller
3,455,621 A 7/1969 Kingsley
3,464,509 A * 9/1969 Gray .......................... 177/208
3,690,118 A 9/1972 Rainwater
3,719,408 A 3/1973 Fullington et al.
3,752,550 A 8/1973 Niemeyer
3,785,669 A * 1/1974 Doheny .................. 280/47.18
3,834,865 A 9/1974 Lee
3,861,768 A 1/1975 Wilson
4,034,572 A 7/1977 Morris et al.
4,077,228 A 3/1978 Schumacher et al.
4,108,363 A 8/1978 Susumu (Continued)

OTHER PUBLICATIONS

Office Action dated May 3, 2010, U.S. Appl. No. 11/849,332.

*Primary Examiner*—J. Allen Shriver, II
*Assistant Examiner*—Bryan A Evans
(74) *Attorney, Agent, or Firm*—Alston & Bird LLP

(57) ABSTRACT

Various embodiments of the wheel positioning assembly are adapted for facilitating the insertion of a cart into an enclosure. In certain embodiments, the cart comprises: (1) first and second fixed front wheels that are disposed adjacent opposite front lateral sides of the cart; and (2) first and second swiveled rear wheels disposed adjacent opposite lateral side of the cart. In various embodiments, the wheel positioning assembly comprises: (1) a first wheel guide for physically guiding the first, fixed front wheel into a desired first-front-wheel position in which the first front wheel is disposed within the dispenser and adjacent a first wheel barrier; and (2) a locking mechanism for selectively maintaining the second rear wheel in a desired second-rear-wheel position within the dispenser. The first wheel barrier and the locking mechanism may selectively cooperate to physically prevent removal of the cart from the enclosure.

31 Claims, 53 Drawing Sheets

U.S. PATENT DOCUMENTS

| | | |
|---|---|---|
| 4,365,854 A | 12/1982 | Waller |
| 4,401,216 A * | 8/1983 | Koch .......................... 206/759 |
| 4,491,375 A * | 1/1985 | Ugalde .................... 312/249.9 |
| 5,067,630 A | 11/1991 | Nesser et al. |
| 5,683,221 A * | 11/1997 | Ablabutyan ................. 414/540 |
| 6,385,505 B1 | 5/2002 | Lipps |
| 6,502,718 B2 | 1/2003 | Fitzgerald et al. |
| 6,595,606 B1 | 7/2003 | Gunst |
| 6,626,508 B1 | 9/2003 | Hase et al. |
| 2002/0130135 A1 | 9/2002 | Fitzgerald et al. |
| 2004/0245272 A1 | 12/2004 | Fitzgerald et al. |
| 2006/0250056 A1 * | 11/2006 | Fitzgerald ................ 312/249.9 |
| 2006/0266770 A1 | 11/2006 | Fitzgerald |
| 2007/0073441 A1 | 3/2007 | Stonikas et al. |

* cited by examiner

GUIDES AND OTHER APPARATUS FOR INSERTING A CART, SUCH AS A CART WITH ONE OR MORE FIXED WHEELS, INTO AN ENCLOSURE

CROSS REFERENCE TO RELATED APPLICATIONS

This application is a continuation-in-part of U.S. patent application Ser. No. 11/744,387, filed May 4, 2007 now U.S. Pat. No. 7,628,410, entitled "Methods and Apparatus for Inserting a Cart, Such as a Cart With One or More Fixed Wheels, Into an Enclosure", the contents of which are incorporated herein by reference in their entirety.

BACKGROUND OF THE INVENTION

Automated dispensers are currently used to dispense soft drinks, food items, toiletries, and other items to users. In hospitals, such automated dispensers may be used to distribute linens, surgical scrubs, and other items to members of the hospital's staff.

In many situations, it is desirable to load items to be dispensed from a dispenser into a cartridge at a central location and then later insert the loaded cartridge into the dispenser so that items from the cartridge may be dispensed from the dispenser. In some cases, the dispenser may use an automated door to selectively control access to the contents of the cartridge.

In various dispensers, it is desirable to load the dispenser through the front of the dispenser, so that the front portion of the cartridge aligns with a front opening of the dispenser. This is fairly easy to accomplish with cartridges that include only swiveled wheels. However, cartridges with only swiveled wheels are often difficult and unsafe to transport in populated areas such as hospitals due to their lack of stability.

There is currently a need for dispensers that would facilitate the loading, into a dispenser's housing, of cartridges having one or more non-swiveled (e.g., fixed) wheels. More particularly, there is a need for dispensers that would facilitate the lateral loading of cartridges having stable, non-swiveled wheels into the dispenser (e.g., through a front opening in the dispenser).

SUMMARY OF THE INVENTION

A wheel positioning assembly according to various embodiments of the invention is adapted for facilitating the insertion of a cart into an enclosure. In certain embodiments, the cart comprises: (1) a first front wheel disposed adjacent both a front portion of the cart and a first lateral side of the cart; (2) a second front wheel disposed adjacent both a front portion of the cart and a second lateral side of the cart; (3) a first rear wheel disposed adjacent both a rear portion of the cart and the first lateral side of the cart; and (4) a second rear wheel disposed adjacent a rear portion of the cart and the second lateral side of the cart. In various embodiments, the wheel positioning assembly comprises: (1) a first wheel stop that is adapted for engaging and stopping the first front wheel when the first front wheel is adjacent a desired first-front-wheel position within the enclosure; and (2) a second wheel stop that is adapted for engaging and stopping the second rear wheel when the second rear wheel is adjacent a desired second-rear-wheel position within the enclosure.

A method, according to particular embodiments of the invention, of inserting a cart (such a cart of the type discussed above) into an enclosure, comprises the steps of: (1) moving the cart into a first position in which: (A) the second lateral side of the cart and a front face of the enclosure form an angle of between 10 and 80 degrees; and (B) a linear path of travel of the first, fixed front wheel is at least substantially aligned with a desired first-front-wheel position within the enclosure; (2) rolling the cart from the first position into a second position in which the first, fixed front wheel engages a first wheel stop that is disposed adjacent the desired first-front-wheel position; and (3) while maintaining the first, fixed front wheel positioned adjacent the first wheel stop, rotating the cart about the first, fixed front wheel until the cart is in a third position in which: (A) the cart is disposed substantially entirely within the enclosure; and (B) the second lateral side of the cart is substantially parallel to the front face of the enclosure.

As noted above, wheel positioning assemblies according to various embodiments of the invention are adapted for facilitating the insertion of a cart into an enclosure. In certain embodiments, the cart comprises: (1) a first front wheel disposed adjacent both a front portion of the cart and a first lateral side of the cart; (2) a second front wheel disposed adjacent both a front portion of the cart and a second lateral side of the cart; (3) a first rear wheel disposed adjacent both a rear portion of the cart and the first lateral side of the cart; and (4) a second rear wheel disposed adjacent a rear portion of the cart and the second lateral side of the cart. In various embodiments, the wheel positioning assembly comprises: (1) a first wheel guide for physically guiding the first, fixed front wheel into a desired first-front-wheel position in which the first front wheel is disposed within the dispenser adjacent a first wheel barrier; and (2) a locking mechanism for selectively maintaining the second rear wheel in a desired second-rear-wheel position within the dispenser. In particular embodiments, the first wheel barrier and the locking mechanism cooperate to physically prevent removal of the cart from dispenser when: (A) the first front wheel is in the desired first-front-wheel position; and (B) the second rear wheel is in the desired second-rear-wheel position and the locking mechanism is in a locked orientation.

BRIEF DESCRIPTION OF THE DRAWINGS

Having described the invention in general terms, reference will now be made to the accompanying drawings, which are not necessarily drawn to scale, and wherein.

DETAILED DESCRIPTION OF VARIOUS EMBODIMENTS OF THE INVENTION

Figure 1A:
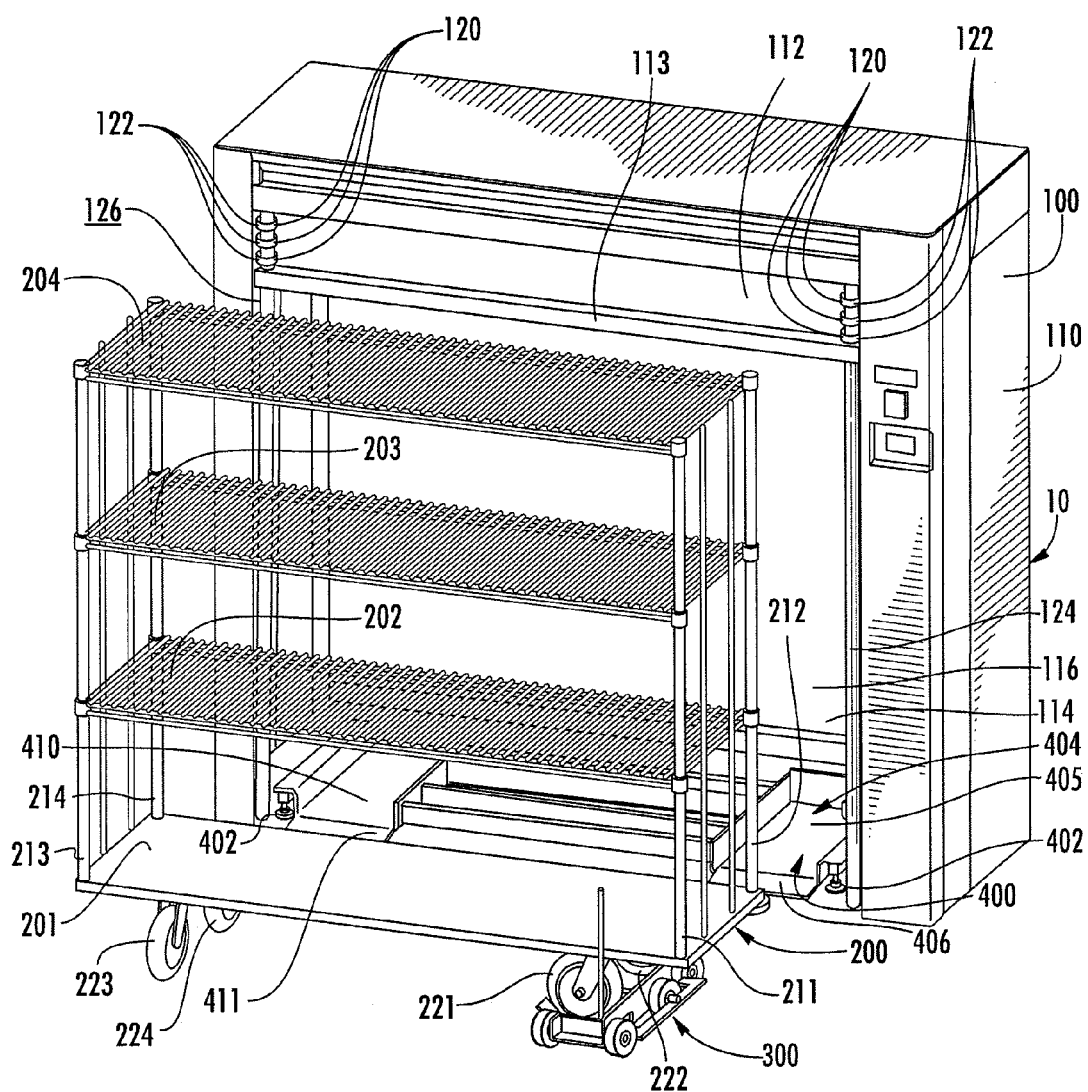
FIG. 1A is a perspective front view of a dispenser according to one embodiment of the invention. In this figure, the dispenser's flexible door is shown in an open position.

The present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Overview of Various Embodiments of the Invention

Various embodiments of the invention are directed to methods and apparatuses for facilitating the movement of a wheeled cart into an enclosure, such as the housing of an automated dispenser. Certain embodiments of the invention are particularly useful in facilitating the movement of a hospital cart (such as a hospital cart having a pair of substantially fixed-orientation wheels mounted adjacent a first end of the cart and a pair of swivel wheels mounted adjacent a second end of the cart). Particular embodiments of the invention are useful in allowing a user to insert the cart laterally into a dispenser (or other enclosure) and onto a scale within the dispenser while one or more of the cart's wheels is in a substantially fixed orientation. This may be useful, for example, when using standard hospital carts within the context of inventory management systems such as those described in Applicant's U.S. patent application Ser. No. 11/236,214, which is hereby incorporated herein by reference in its entirety.

In certain embodiments of these types of systems, a hospital cart is loaded with linens at a central location and then wheeled to a dispenser that is in a convenient linen distribution location within a hospital. The hospital cart is then inserted onto a scale within the dispenser and an automated access door associated with the dispenser is closed to prohibit unauthorized access to linens stored on the cart. To later access the linens, an authorized user typically swipes an access card through a card reader on the dispenser. The dispenser then automatically opens its access door to permit the user access to the linens. After the user removes the desired linens, the access door uses a scale upon which the cart is supported to determine the weight of linens removed from the cart. This information is then associated with the user and used to determine which entity (e.g., which department) should be billed for costs associated with using the linens (e.g., the laundry fees for the linens).

As noted above, in particular applications, various embodiments of the present invention are used to facilitate inserting a standard cart with at least one fixed wheel (and in many embodiments, at least a pair of fixed wheels) into the interior of the dispenser.

Overview of the General Structure of Exemplary Dispenser Components

Dispensers according to various embodiments of the invention include one or more common dispenser components. For the purpose of brevity, examples of various suitable dispenser components are described below. It should be understood that these components are intended as representative examples, and that other suitable components may be used in their place in particular embodiments of the invention.

Storage Cartridge

An exemplary storage cartridge 200 for use in various embodiments of the invention is shown in FIG. 1A. As may be understood from this figure, this storage cartridge 200 comprises a plurality of substantially horizontal, substantially rectangular, shelves 202-204 that are spaced apart from, and substantially parallel to, each other. These shelves 202-204 may be of any appropriate shape and/or structure, and may be made of any appropriate material (e.g., metal, plastic, or wood). The storage cartridge's shelves 202-204 may be supported by any appropriate support system. For example, in the embodiment shown in FIG. 1A, the storage cartridge's shelves 202-204 are supported by a plurality of vertical support columns 211-214 disposed adjacent the storage cartridge's respective corners.

In various embodiments of the invention, the storage cartridge 200 is mounted to roll on one or more rolling mechanisms (such as wheels or rollers). For example, in the embodiment of the invention shown in FIGS. 1A and 1B, the storage cartridge 200 is mounted on four wheels 221-224, and each of these wheels 221-224 is mounted adjacent a respective bottom corner of the storage cartridge 200. In various embodiments of the invention, the storage cartridge 200 includes two wheels 221, 222 that are mounted in a substantially fixed orientation adjacent one end of the storage cartridge 200. These "fixed" wheels 221, 222 are preferably spaced apart from, and co-facing each other. In addition, these wheels 221, 222 are preferably oriented to travel along parallel paths that extend, respectively, adjacent opposite lateral sides of the storage cartridge 200.

In particular embodiments of the invention, the storage cartridge 200 includes two swiveled wheels 223, 224 that are mounted to swivel relative to the cart's base platform 201. This allows the wheels' 223, 224 orientation relative to the storage cartridge's base portion 201 to change as the storage cartridge 200 moves over a support surface.

Dispenser Housing

A dispenser housing 100 according to one embodiment of the invention is also shown in FIG. 1A. As may be understood from this figure, in this embodiment of the invention, the dispenser housing 100 comprises: (1) a dispenser body 110; (2) a scale 400; (3) a calibration system; (4) an access door 112; and (5) a control system. These dispenser components are discussed in greater detail below.

1. Dispenser Body

As may be understood from FIG. 1A, in one embodiment of the invention, the dispenser body 110 defines both an interior portion 114, and a dispenser body access opening 116 through which the dispenser's storage cartridge 200 may be wheeled into the dispenser body's interior portion 114. In various embodiments of the invention, the dispenser body's interior portion 114 is dimensioned to receive the storage cartridge 200 substantially entirely within this interior portion 114.

2. Scale

As may be understood from FIG. 1A, in various embodiments of the invention, the dispenser 10 comprises one or more scales 400 that are adapted for weighing items within the dispenser 10. As shown in FIG. 1A, in various embodiments of the invention, the dispenser 10 may include a scale 400 that, for example, is positioned on and/or adjacent the dispenser's floor (e.g., adjacent the upper or lower surface of the floor), or integrated into the dispenser's floor. In various embodiments of the invention, the scale 400 is dimensioned and configured so that when the dispenser's storage cartridge 200 is operably loaded into the dispenser housing 100, the storage cartridge 200 is in weighing engagement with the dispenser's scale 400.

In particular embodiments of the invention, the dispenser's scale 400 includes a weighing platform 404 that is positioned so that the scale's weighing surface is disposed within, or immediately adjacent, a portion of the dispenser's housing 100 that will support the dispenser's storage cartridge 200 when the dispenser's storage cartridge 200 is operatively positioned within the dispenser's housing 100. In particular embodiments of the invention, the scale's weighing surface is disposed immediately adjacent the dispenser's floor.

In various embodiments of the invention, such as the embodiment shown in FIG. 1A, a weighing platform 404 of the dispenser's scale 400 is dimensioned for supporting the storage cartridge 200 by, for example, engaging the lower surface of the storage cartridge's wheels 221-224. For example, in the embodiment shown in FIG. 1A, the scale's weighing platform 404 includes two elongated wheel supports 404, 410 that are offset from, and parallel to each other, and that are spaced apart so that when the dispenser's storage cartridge 200 is in weighing engagement with the dispenser's scale 400: (1) a first pair of the cartridge's wheels (e.g., the storage cartridge's fixed wheels 221, 222) is supported by a first one of the wheel supports 405; and (2) a second pair of the storage cartridge's wheels (e.g., the storage cartridge's swiveled wheels 223, 224) is supported by a second one of the wheel supports 410. In various embodiments of the invention, a wheel stop is provided adjacent the interior end of each wheel support 405, 410 in order to prevent the storage cartridge 200 from striking the back interior wall of the dispenser's housing 100 when the storage cartridge 200 is loaded into the dispenser's housing 100.

It should be understood that any of a variety of suitable weighing mechanisms may be used in conjunction with the present invention. However, in one embodiment of the invention, the dispenser's scale 400 includes one or more load cells with leveling feet that are positioned (e.g., adjacent opposite lateral sides of the scale's weighing platform 405) to support the scale's weighing platform 404.

3. Calibration System

In various embodiments of the invention, the dispenser 100 includes one or more calibration systems for calibrating the dispenser's scale 400. In a particular embodiment, the dispenser 10 includes a calibration system that is configured to recalibrate a scale 400 associated with the dispenser 10 in response to the scale's weight reading being below a predetermined value (e.g., which may, for example, be about equal to, or equal to, the combined weight of the scale's weighing platform 404 and the dispenser's storage cartridge 200). In one embodiment, when the scale's weight reading falls below about the combined weight of the scale's weighing platform 404 and the dispenser's storage cartridge 200, the calibration system assumes that the dispenser's storage cartridge 200 has been removed and therefore that the weight measured by the scale 400 should be that of the weighing platform 404 alone, which is known. In this embodiment, the calibration system calibrates the dispenser's scale 400 based on this assumption.

4. Access Door

As may be understood from FIG. 1A, in a particular embodiment of the invention, the dispenser's access door 112 may include a flexible (e.g., fabric) barrier made, for example, of a robust, tear-resistant material, such as ballistic nylon. As shown in this figure, the access door 112 may define a plurality of ring holes 120 that are vertically spaced apart (e.g., substantially evenly spaced apart along a substantially vertical axis) along the lateral sides of the access door 112. In particular embodiments, the access door 112 includes a plurality of door attachment members 122 that, in various embodiments, are substantially ring shaped. In one embodiment, these door attachment members 122 are adapted to slideably attach the access door 112 adjacent the dispenser body's access opening 116 so that the access door 112 extends between: (1) a first substantially vertical support rod 124 that is positioned adjacent a first lateral side of the access door 112, and (2) a second substantially vertical support rod 126 that is positioned adjacent a second lateral side of the access door 112. In this embodiment, the access door 112 is preferably adapted to slide between: (1) a "door open" orientation in which the access door 112 is gathered into a plurality of folds adjacent a top portion of an opening defined between the first and second substantially vertical support rods 124, 126; and (2) a "door closed" orientation in which the access door 112 is in a substantially outstretched, planar orientation and at least substantially prevents access to an interior portion of the dispenser 100 through the dispenser's access opening 116.

In a particular embodiment, the access door 112 comprises a plurality of at least substantially ring shaped door attachment members 122, each of which is adapted to extend through a particular one of the ring holes 120 adjacent a particular lateral side of the access door 112, and around a support rod 124, 126 adjacent the particular lateral side of the access door 112.

In alternative embodiments, the dispenser's access door 112 may be, for example, a flexible door, such as those described in U.S. patent application Ser. No. 10/414,581, entitled "Reduced Friction Flexible Door", which was filed on Apr. 15, 2003, and which is hereby incorporated by reference. In certain embodiments of the invention, the access door 112 is a flexible "roll-up" door that is adapted so that the leading portion of the access door 112 slides within the plane of the dispenser housing's access opening 116 as the access door 112 is opened and closed.

Alternatively, the dispenser's access door 112 may take any other suitable configuration. For example, the access door 112 may include one or more user doors, such as those described in U.S. Patent Publication No. 2005/0060938 (application Ser. No. 10/671,301), which is entitled "Automated Sliding User Doors and Door Mechanisms for a Dispenser", and which is hereby incorporated by reference.

Figure 1B:
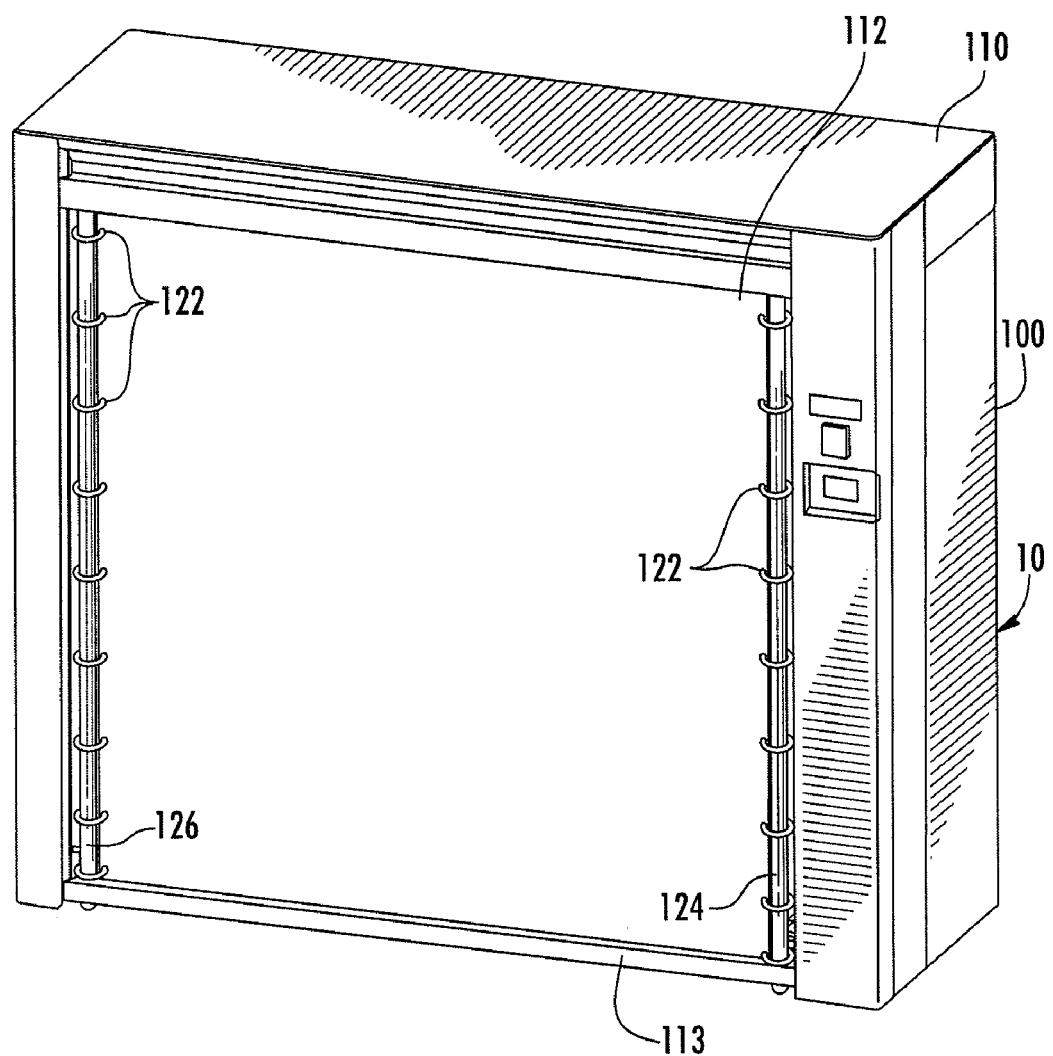
FIG. 1B is a perspective front view of the dispenser of FIG. 1A. In this figure, the dispenser's flexible door is shown in a closed position.

As shown in FIGS. 1A and 1B, in various embodiments of the invention, the dispenser's access door 112 is mounted to selectively restrict access to the dispenser body's interior portion 114. For example, in the embodiment shown in FIG. 1, the access door 112 is mounted adjacent the dispenser body 110 so that the access door 112 may slide between: (1) an open position in which the access door 112 does not substantially restrict access to the interior portion 114 of the dispenser body 110 (See FIG. 1A); and (2) a closed position in which the access door 112 substantially restricts (and preferably prevents) access to the dispenser body's interior portion 114 (See FIG. 1B).

5. Control System

In various embodiments of the invention, the dispenser 10 comprises a control system (which may, for example, comprise a suitable computer processor and memory) that is adapted for receiving information from one or more weighing mechanisms 400 associated with the dispenser 10 (and, in various embodiments, other portions of the dispenser 10, such as the dispenser's access door 112), and for transmitting this information (e.g., via a suitable network such as the Internet) to a remote server (e.g., an inventory management server associated with a laundry facility).

In various embodiments of the invention, the control system is further configured for controlling access to the dispenser's contents by selectively locking/unlocking, and/or opening/closing the dispenser's access door 112 in response to certain conditions being satisfied. For example, in various embodiments of the invention, the dispenser 100 is adapted to maintain the access door 112 in a closed, locked position (and thereby restrict access to the dispenser's contents) until a user inputs valid access information into the dispenser's control system (e.g., via a dispenser user interface, such as a keypad or card reader).

In various embodiments of the invention, the control system is configured to transmit information obtained from a user (e.g., the user's access information) to a remote server (e.g., an inventory management server, which is part of an inventory management system that is associated with a laundry facility) along with information obtained from the dispenser's weighing mechanisms 400. This information may include, for example, the identity of the user, an organizational entity with which the user is associated (e.g., a particular hospital department), the particular time and date that the user removed items from the dispenser 10, and/or the weight of items removed from the dispenser 10 at that particular time on that particular date. As described in greater detail below, this information may be used, for example, to track user activity and to keep track of which department should be charged for laundering the items removed from the dispenser 10.

In various embodiments of the invention, the dispenser's control system is adapted for conveying information to a user (e.g., via a message displayed on a display screen associated with the dispenser 10). For example, in one embodiment in which the dispenser 10 is used for distributing linen items, the control system may display a message regarding proper linen use. One such message may be, for example, "Do not use linen for cleaning up spills. Rather, use the rags available in the broom closet."

In another embodiment, the control system may display the weight of items removed from the dispenser as part of the current transaction. For example, the control system may display a message indicating that the user removed 5 lbs of linen from the dispenser during the current transaction. The control system may obtain this information, for example, by comparing: (1) the weight measured by the dispenser's scale 400 immediately before the transaction, with (2) the weight measured by the dispenser's scale 400 immediately after the transaction (e.g., immediately after the dispenser's door closes following the transaction).

Wheel Support Mechanism

In particular embodiments of the invention, the dispenser 10 includes a wheel support mechanism for facilitating the lateral movement of a storage cartridge 200 into the interior of the dispenser 10. One such embodiment is shown in FIGS. 1A and 1B in which the dispenser 10 includes a dispenser housing 100, a storage cartridge 200, and a wheel support mechanism 300. In this embodiment, the dispenser housing 100 and storage cartridge 200 have a structure as described in detail above. In particular, in this embodiment, the storage cartridge 200 includes two non-swiveled (e.g., substantially fixed) wheels 221, 222 that are mounted adjacent a first end of the storage cartridge 200 and two swiveled wheels 223, 224 that are mounted adjacent a second end of the storage cartridge 200.

Figure 2:
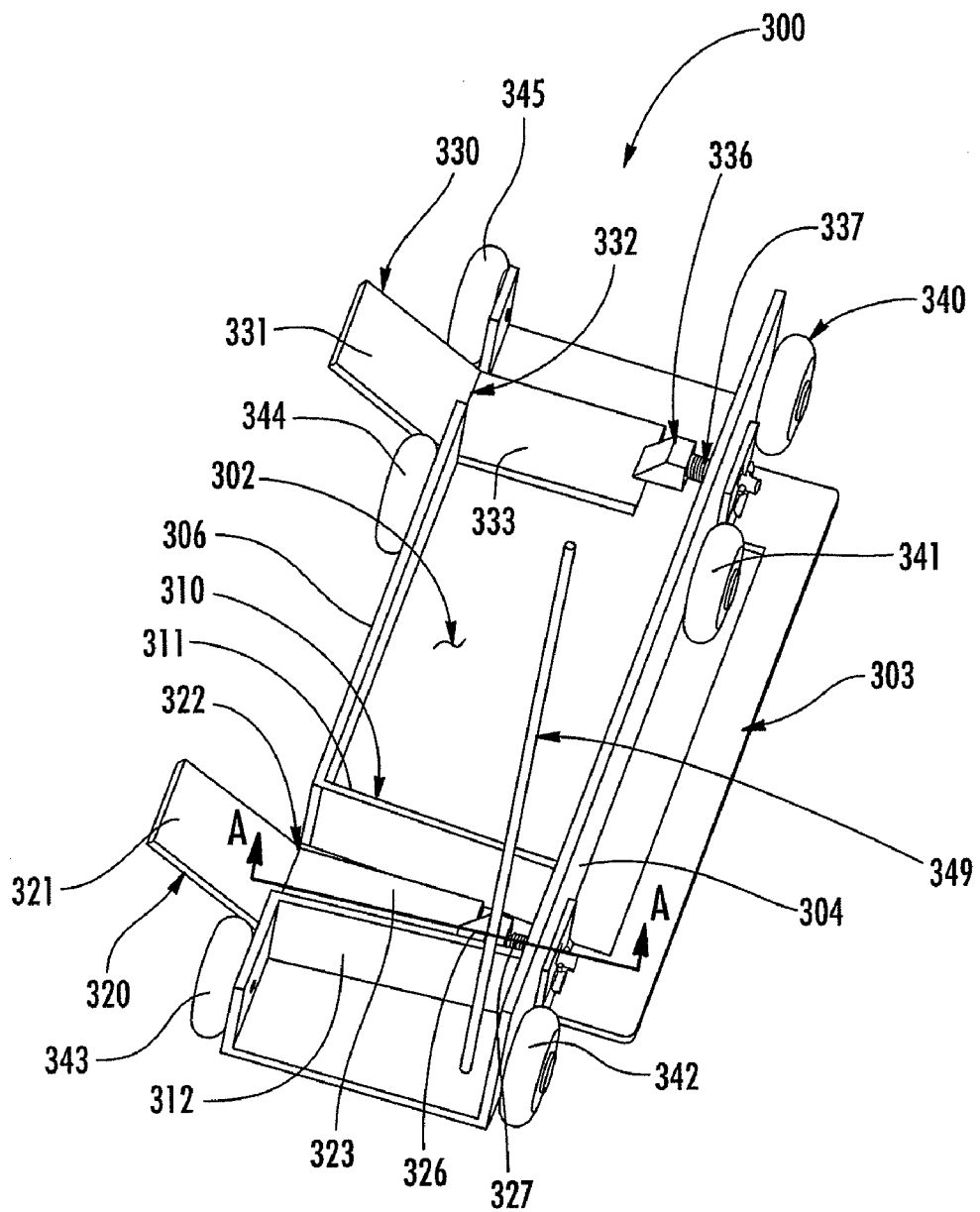
FIG. 2 is a top perspective view of a wheel support mechanism according to a particular embodiment of the invention.

As shown in FIGS. 1A, 1B, and 2, in this embodiment, the wheel support mechanism 300 includes a substantially planar, substantially horizontal base portion 302 (see FIG. 2) that is mounted on a plurality of wheels 340-345 to facilitate the rolling movement of the wheel support mechanism 300 adjacent a support surface. The wheel support mechanism 300 further includes a first ramp member 320 that is mounted adjacent a first end of the wheel support mechanism 300, and a second ramp member 330 that is mounted adjacent a second end of the wheel support mechanism 300.

In a particular embodiment of the invention, the first ramp member 320 comprises a first substantially planar ramp portion 321 and a first substantially planar ramp lifting member 323 that are attached to each other along a first pivot axis 322 to form a substantially V-shaped structure. In the embodiment shown in FIG. 2, the first ramp member 320 is pivotably mounted adjacent the wheel support mechanism 300 so that the first pivot axis 322 is substantially co-axial with a first side edge of the wheel support mechanism's base portion 302.

Similarly, in particular embodiments of the invention, the second ramp member 330 comprises a second substantially planar ramp portion 331 and a second substantially planar ramp lifting member 333 that are attached to each other along a second pivot axis 332 to form a substantially V-shaped structure. In the embodiment shown in FIG. 2, the second ramp member 330 is pivotably mounted adjacent the wheel support mechanism 300 so that the second pivot axis 332 is substantially co-axial with the first side edge of the wheel support mechanism's base portion 302. In particular embodiments, the first and second ramp members 320, 330 are spaced about the same distance apart as the distance between the fixed wheels of a storage cartridge 200 with which the wheel support mechanism 300 is to be used.

In a particular embodiment of the invention, the wheel support mechanism 300 includes a first ramp member lock 326 that is retractably mounted adjacent an interior end of the ramp lifting member 323 so that it is adjacent a distal end of the first ramp lifting member 323 when the first ramp lifting member 323 is in a "ramp up" orientation. In this embodiment, the first ramp member lock 326 is substantially wedge shaped with an upwardly facing angled portion, and the wheel support mechanism 300 includes a spring 327 that is: (1) disposed adjacent a rear surface of the first ramp member lock 326; and (2) adapted for urging the first ramp member lock 326 toward the ramp lifting member 323.

As shown in FIG. 2, this embodiment is configured so that when the first ramp lifting member 323 rotates from an upwardly angled to a substantially horizontal position, the distal end of the first ramp lifting member 323 engages the angled portion of the first ramp member lock 326 and thereby urges the first ramp member lock 326 away from the first ramp lifting member 323 until the distal end of the first ramp lifting member 323 passes the first ramp member lock 326. The first spring 327 then urges the first ramp member lock 326 toward and over the distal end of the first ramp lifting member 323. In this "locked" orientation, the first ramp member lock 326 physically prevents the first ramp lifting member 323 from rotating upwardly until the first ramp member lock 326 is again retracted (e.g., manually retracted by a user) against the first spring 327 into an unlocked position.

Similarly, as shown in FIG. 2, this embodiment is configured so that when the second ramp lifting member 333 rotates from an upwardly angled to a substantially horizontal position, the distal end of the second ramp lifting member 333 engages the angled portion of the second ramp member lock 336 and thereby urges the second ramp member lock 336 away from the second ramp lifting member 333 until the distal end of the second ramp lifting member 333 passes the second ramp member lock 336. The second spring 337 then urges the second ramp member lock 336 toward and over the distal end of the second ramp lifting member 333. In this "locked" orientation, the second ramp member lock 336 physically prevents the second ramp lifting member 333 from rotating upwardly until the second ramp member lock 336 is again retracted (e.g., manually retracted by a user) against the second spring 337 into an unlocked position.

In a particular embodiment of the invention, the wheel support mechanism 300 includes at least one wheel guide 310 that is adapted to guide a particular one of the storage cartridge's wheels into a desired position (and, optionally, to maintain that particular wheel in that desired position) as the particular wheel rolls over the upper surface of the first ramp member 320 and adjacent the support surface 302 of the wheel support mechanism 300. For example, in the embodiment shown in FIG. 2, the wheel support mechanism 300 includes a pair of offset, substantially vertical walls 311, 312 that are positioned on opposite sides of the first ramp member's first ramp lifting member 323. These substantially vertical walls 311, 312 are preferably substantially parallel to the lateral sides of the first ramp lifting member 323. In various embodiments, a similar wheel guide may be provided adjacent the second ramp lifting member 333.

Wheel Support Mechanism—Operation

FIGS. 3-6 depict the operation of the exemplary embodiment of the wheel support mechanism 300 shown in FIGS. 1 and 2. As may be understood from FIGS. 3-6, a user begins by moving the wheel support mechanism's first and second ramp members 320, 330 into a "ramp down" orientation in which: (1) the respective distal ends of their respective first and second ramp portions 321, 331 touch the support surface on which the wheel support mechanism 300 is resting; and (2) the first and second ramp lifting members 323, 333 are angled upwardly relative to the base 302 of the wheel support mechanism 300. Next, the user aligns: (1) the storage cartridge's right fixed wheel 221 with the wheel support mechanism's first ramp member 320; and (2) the storage cartridge's left fixed wheel 222 with the wheel support mechanism's second ramp member 330.

Figure 3:
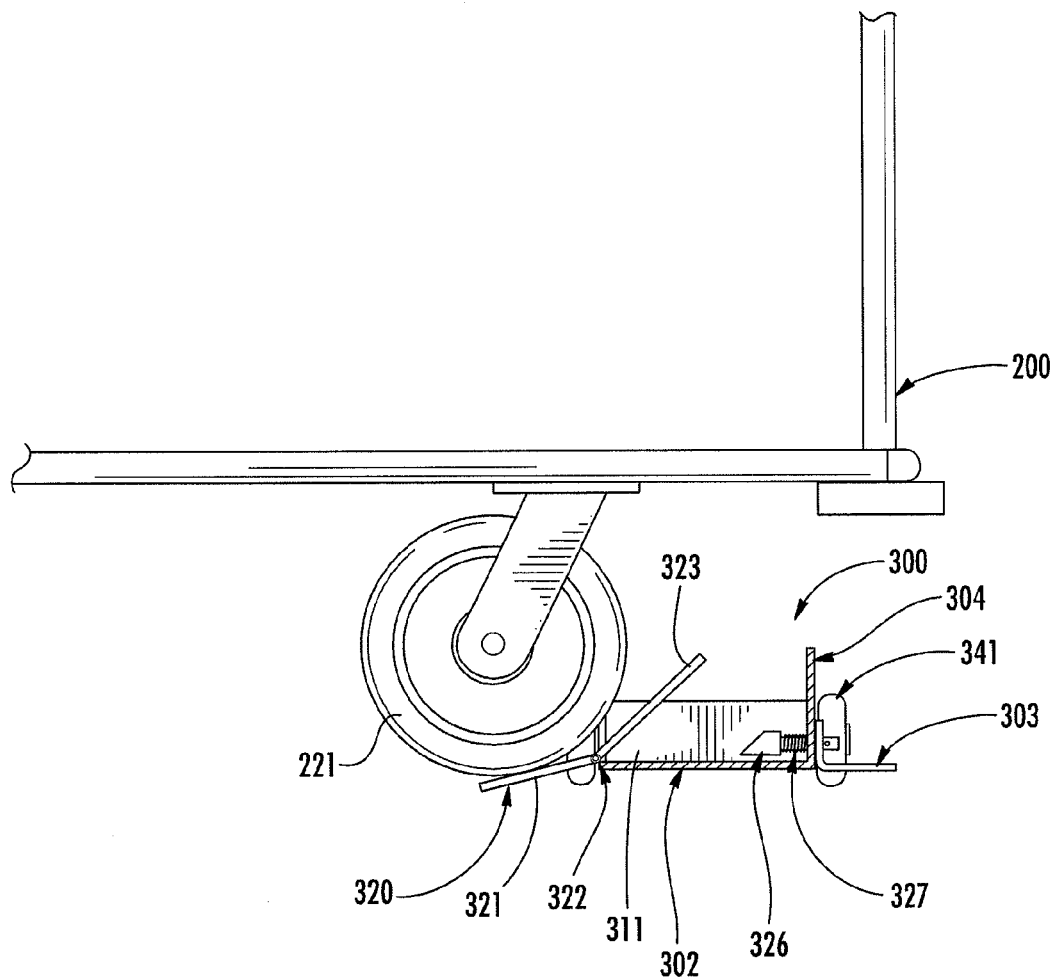
FIG. 3 is a cross-sectional side view of the wheel support mechanism of FIG. 2, taken through Section A-A of FIG. 2, in which a storage cartridge is shown rolling onto the wheel support mechanism.
Figure 4:
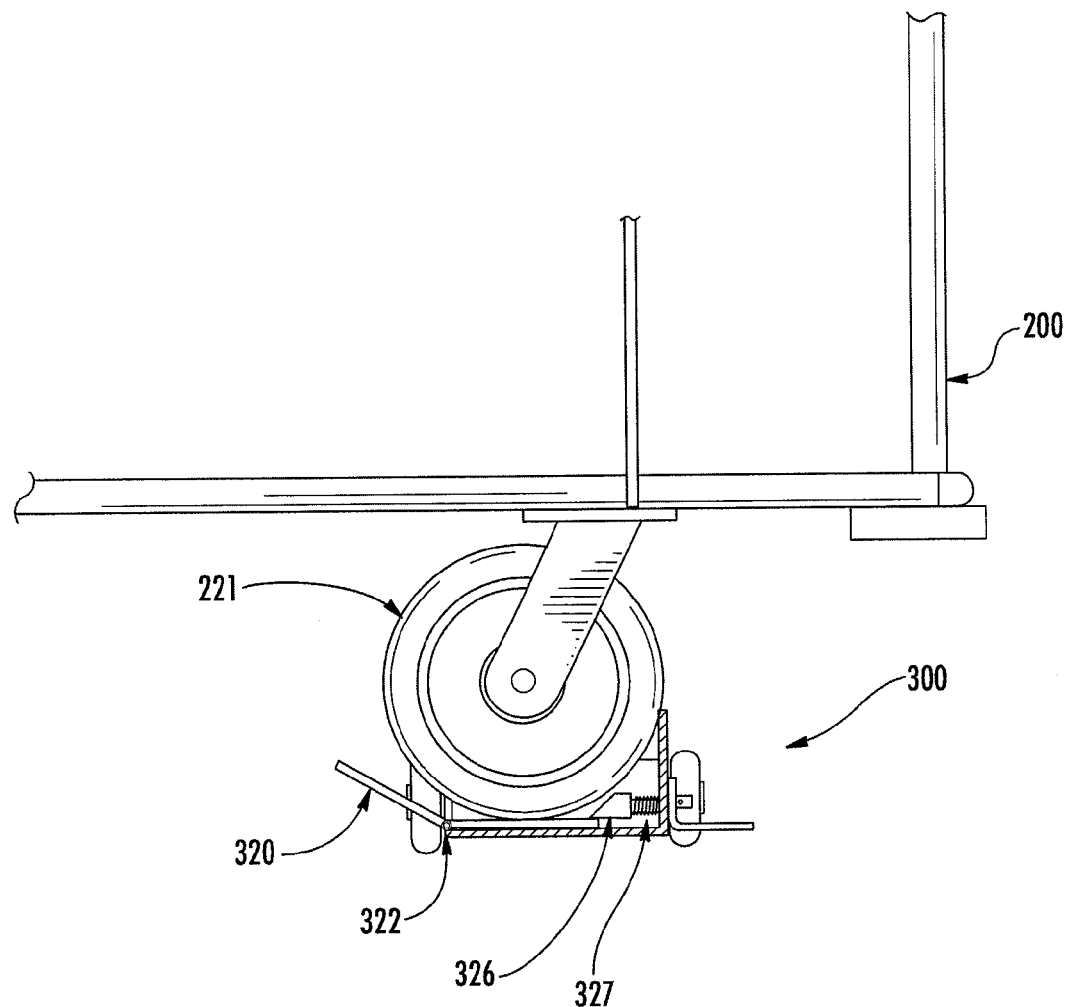
FIG. 4 is a cross-sectional side view of the wheel support mechanism of FIG. 2, taken through Section A-A of FIG. 2, in which a storage cartridge is shown after it has rolled onto the wheel support mechanism.

FIGS. 3 and 4 show the movement of the storage cartridge's right fixed wheel 221 onto the first ramp member 320. However, it should be understood that the general movement of the storage cartridge's left fixed wheel 222 onto the second ramp member 330 is essentially the same as that shown in FIGS. 3 and 4.

As may be understood from FIGS. 3 and 4, after the alignment step referenced above, the user pushes the storage cartridge 200 toward the wheel support mechanism 300. As a result, the storage cartridge's first and second fixed wheels 221, 222 roll, respectively, onto the first and second ramp portions 321, 331. The user then continues to push the storage cartridge 200 toward the wheel support mechanism 300 until the first and second fixed wheels 221, 222 engage, respectively, the first and second ramp lifting members 323, 333, which causes the first and second ramp members 320, 330 to rotate, respectively, about the first and second pivot axes 322, 332 until: (1) the respective distal ends of the first and second ramp portions 321, 331 are angled upwardly relative to the base 302 of the wheel support mechanism 300; and (2) the first and second ramp lifting members 323, 333 are in a substantially horizontal orientation adjacent the upper surface of the base 302 of the wheel support mechanism 300.

As noted above, during this transition, the distal end of the first ramp lifting member 323 engages the angled portion of the first ramp member lock 326 and thereby urges the first ramp member lock 326 away from the first ramp lifting member 323 until the distal end of the first ramp lifting member 323 passes the first ramp member lock 326. The first spring 327 then urges the first ramp member lock 326 toward and over the distal end of the first ramp lifting member 323. In this "locked" orientation, the first ramp member lock 326 physically prevents the first ramp lifting member 323 from rotating upwardly until the first ramp member lock 326 is again retracted (e.g., manually retracted by a user) against the first spring 327 into an unlocked position.

Similarly, as the storage cartridge 200 moves onto the wheel support mechanism 300, the distal end of the second ramp lifting member 333 engages the angled portion of the second ramp member lock 336 and thereby urges the second ramp member lock 336 away from the second ramp lifting member 333 until the distal end of the second ramp lifting member 333 passes the second ramp member lock 336. The second spring 337 then urges the second ramp member lock 336 toward and over the distal end of the second ramp lifting member 333. In this "locked" orientation, the second ramp member lock 336 physically prevents the second ramp lifting member 333 from rotating upwardly until the second ramp member lock 336 is again retracted (e.g., manually retracted by a user) against the second spring 337 into an unlocked position.

Figure 5:
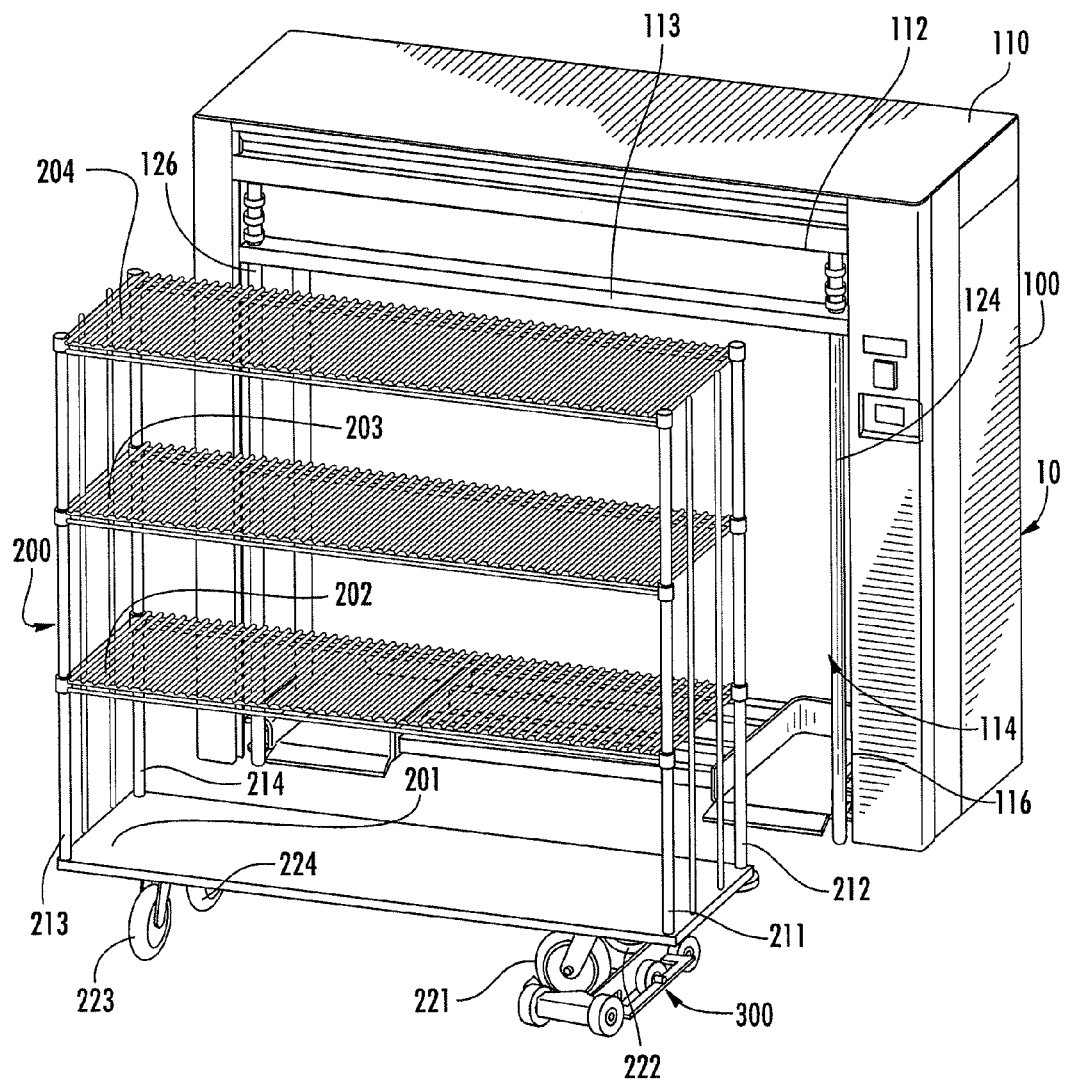
FIGS. 5 and 6 are perspective front views of a dispenser according to a particular embodiment of the invention that includes a wheel support mechanism, such as the wheel support port mechanism of FIG. 2.
Figure 6:
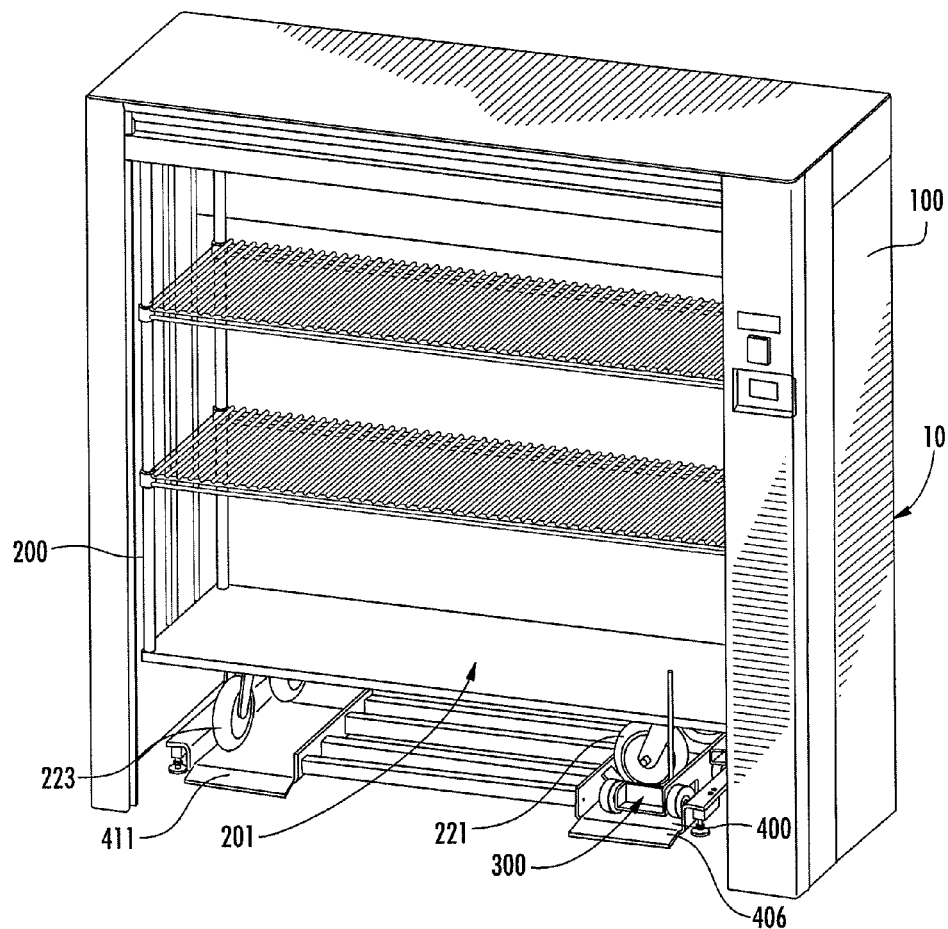

As shown in FIGS. 1A and 5, once the storage cartridge's fixed wheels 221, 222 are locked in place on the wheel support mechanism 300, the user: (1) aligns the wheel support mechanism 300 with the scale's first wheel support 406; and (2) aligns the storage cartridge's swiveled wheels 223, 224 with the scale's second wheel support 410. The user then pushes the storage cartridge 200 toward the scale 400 until: (1) the wheel support mechanism 300 is disposed on the scale's first wheel support 406; and (2) the storage cartridge's swiveled wheels 223, 224 are disposed on the scale's second wheel support 410, as shown in FIG. 6. In various embodiments, when the storage cartridge 200 is in this position, the storage cartridge 200 is preferably disposed entirely within the interior portion of the dispenser's housing, and the storage cartridge 200 is supported by the scale 400. This preferably allows the dispenser's access door to close without engaging the storage cartridge 200.

Alternative Embodiments of the Wheel Support Mechanism

Figure 7A:
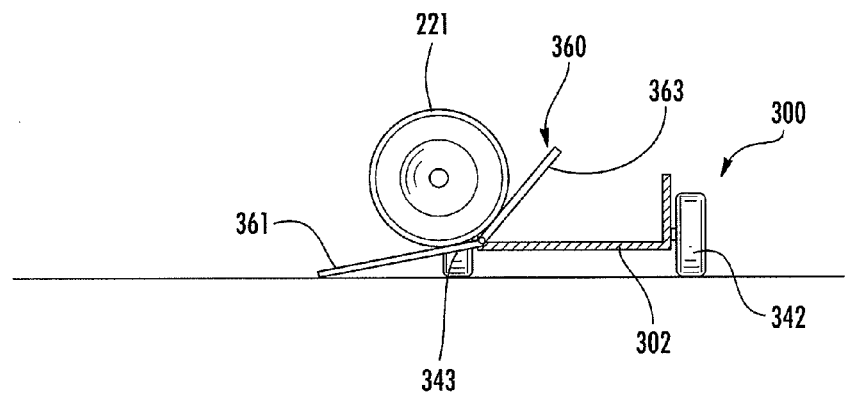
FIGS. 7A and 7B show side cross-sectional views of a wheel support mechanism according to a particular embodiment of the invention similar to the embodiment shown in FIG. 2, and taken through a section that corresponds generally to Section A-A of FIG. 2. These figures show the motion of a storage cartridge wheel 221 (e.g., a fixed cartridge wheel 221) as the wheel moves onto the wheel support mechanism. The body of the storage cartridge has been omitted from these figures for purposes of clarity.
Figure 7B:
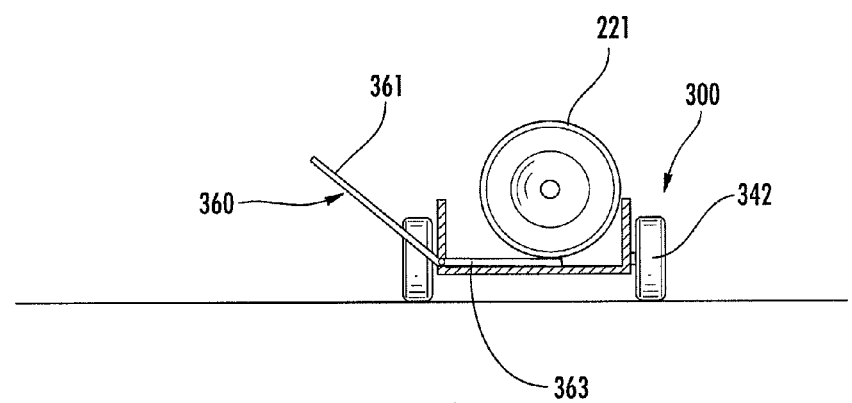

Embodiment of FIGS. 7A and 7B

FIGS. 7A and 7B show an alternative embodiment of the wheel support mechanism. In this embodiment, the wheel support mechanism's first and second ramp members 300 are structured similarly to the first and second ramp members 320, 330 shown in FIGS. 2 and 3 except that their respective first and second ramp lifting members 363 are, respectively, substantially shorter than their respective first and second ramp portions 361. Also, in various versions of this embodiment, the wheel support mechanism does not include ramp member locks for maintaining the ramp members 360 in a "ramp up" position when the storage cartridge 200 is being supported by the wheel support mechanism 300. Rather, in particular embodiments, such as the embodiment shown in FIGS. 7A and 7B, the weight of the storage cartridge 200 serves to maintain the ramp members 360 in a "ramp up" position when the storage cartridge 200 is being supported by the wheel support mechanism 300.

Figure 8A:
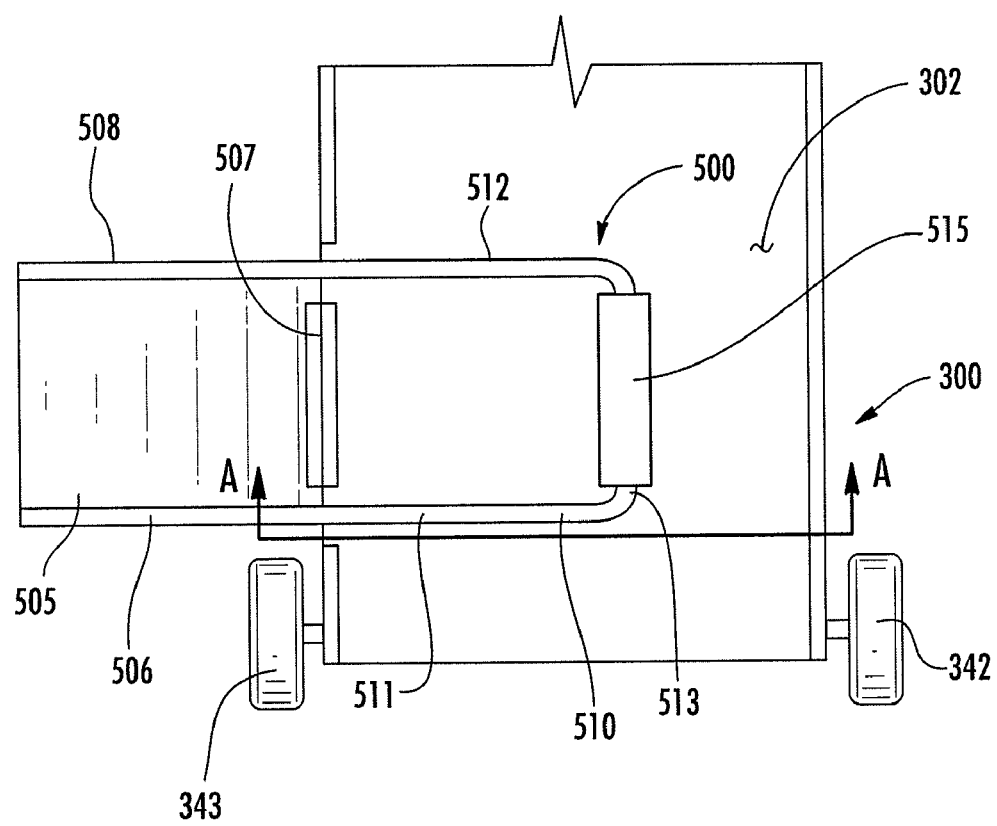
FIG. 8A is a top view of a wheel support mechanism according to a particular embodiment of the invention.
Figure 8B:
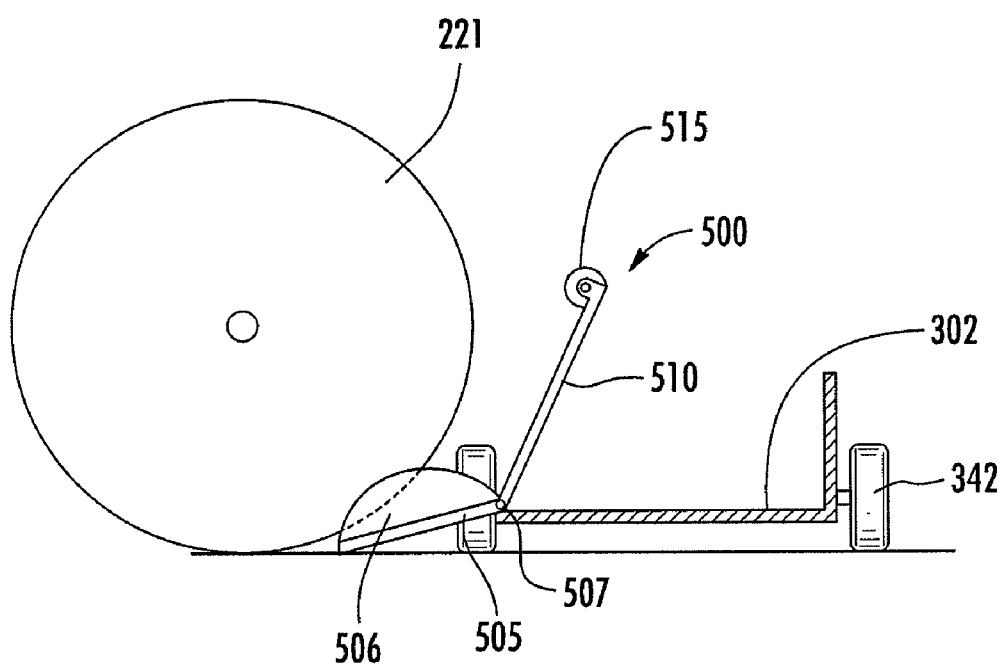
FIGS. 8B and 8C are side cross-sectional views of the wheel support mechanism of FIG. 8A taken through Section A-A of FIG. 8A.
Figure 8C:
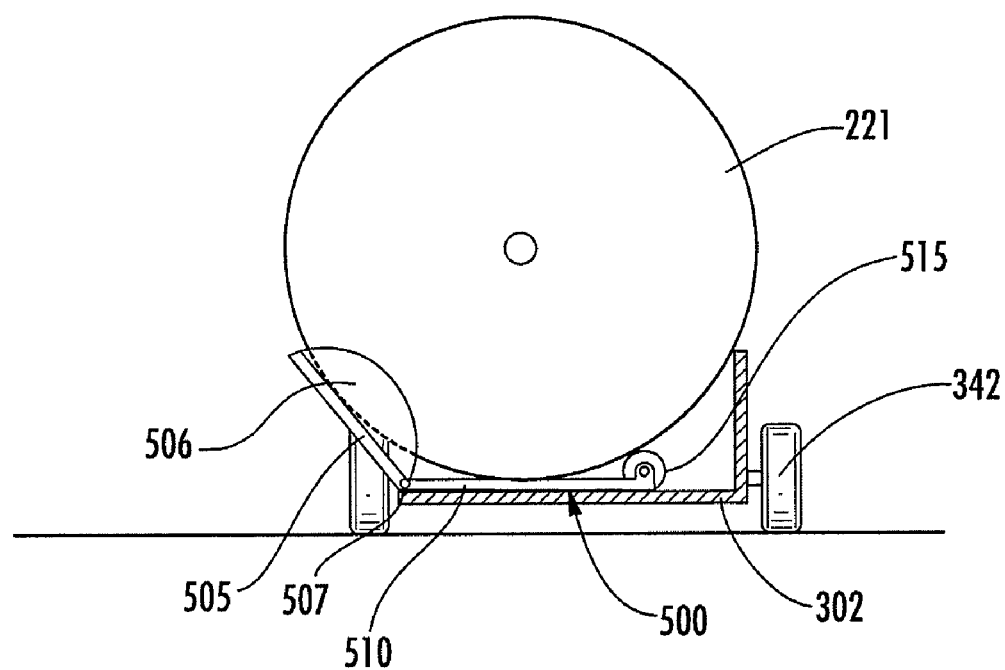

Embodiment of FIGS. 8A-8C

FIGS. 8A-8C show yet another embodiment of the wheel support mechanism. In this embodiment, the wheel support mechanism's first ramp member 500 has a structure that is similar to the first and second ramp members 320, 330 shown in FIGS. 2 and 3. In particular, the ramp member's ramp portion 505 is structurally the same as the ramp portion 321, 331 of the embodiment shown in FIGS. 2 and 3. However, in the embodiment shown in FIGS. 8A-8C, the first ramp member's first ramp lifting member 510 includes a substantially rectangular frame as shown in FIG. 8A.

More particularly, in this embodiment, the first ramp lifting member 510 includes two offset, substantially parallel elongated frame members 511, 512 and a roller support 513 that extends between the distal ends of the frame members 511, 512. In a particular embodiment, the roller support 513 has a substantially circular cross section and a substantially cylindrical roller 515 is rotatably mounted on the roller support 513 so that the roller 515 may rotate about the central axis of the roller support 513. In various embodiments, the roller 515 and the roller support 513 are substantially coaxial.

In particular embodiments, the frame members 511, 512 are spaced apart by a distance that is greater than the width a storage cartridge wheel that the wheel support mechanism 300 is adapted to support. In addition, in particular embodiments, the first ramp member 500 includes a pair of spaced-apart, substantially vertical guide walls 506, 508 disposed on opposite sides of the first ramp member's ramp portion 505. These vertical guide walls 506, 508 are preferably adapted for guiding the wheel of a storage cartridge as the wheel moves up the ramp 505.

To use the embodiment of the invention shown in FIGS. 8A-8C, a user first aligns a storage cartridge 200 so that its first fixed storage cartridge wheel 221 is aligned with the first ramp member's ramp portion 505, and so that its second fixed storage cartridge wheel is aligned with the second ramp member's ramp portion (not shown). The user then pushes the storage cartridge 200 toward the wheel support mechanism 300 until the storage cartridge's fixed wheels 221, 222 each roll respectively up one of the wheel support mechanism's ramp members and onto the wheel support mechanism 300.

FIGS. 8B and 8C show the movement of a storage cartridge's first fixed wheel 221 onto a wheel support mechanism 300 via a first ramp member 500. As may be understood from this figure, the first fixed wheel 221 is first urged onto the ramp portion 505 of the storage cartridge's first ramp member 500. The storage cartridge's first fixed wheel 221 is then moved toward the first ramp member's roller 515 until the storage cartridge wheel 221 engages the roller 515. Next, the storage cartridge's first fixed wheel 221 is urged further against the roller 515, which causes the first ramp member 500 to rotate about its axis of rotation 507 until: (1) the first ramp lifting member 510 is in a substantially horizontal position adjacent the surface of the base 302 of the wheel support mechanism 300; and (2) the ramp portion 505 extends upwardly from the base 302 of the wheel support mechanism 300.

In particular embodiments, the weight of the storage cartridge 200 on the first ramp lifting member 510 maintains the ramp portion 505 in a "ramp up" position, such as that shown in FIG. 8C. As may be understood from this figure, in various embodiments, when in the orientation shown in FIG. 8C, the ramp lifting member 510 and the frame of the wheel support mechanism 300 cooperate to maintain the storage cartridge wheel 221 in place on the wheel support mechanism 300 (e.g., by exerting forces on opposite sides of the wheel 221).

In various embodiments, the movement of the storage cartridge's second fixed wheel onto the wheel support mechanism 300 via a second ramp member occurs in substantially the same manner as that described above in regard to the storage cartridge's first fixed wheel 221.

Figure 9A:
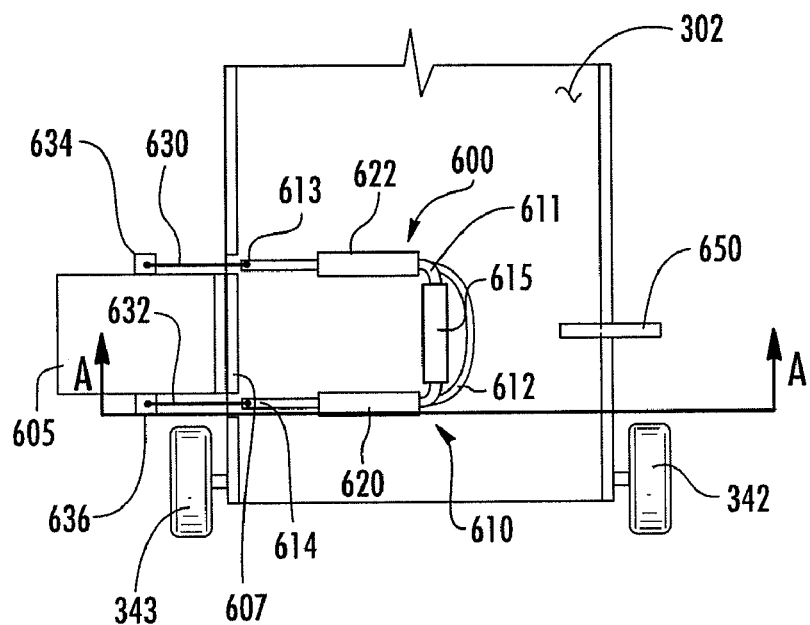
FIG. 9A is a top view of a wheel support mechanism according to a further embodiment of the invention.
Figure 9B:
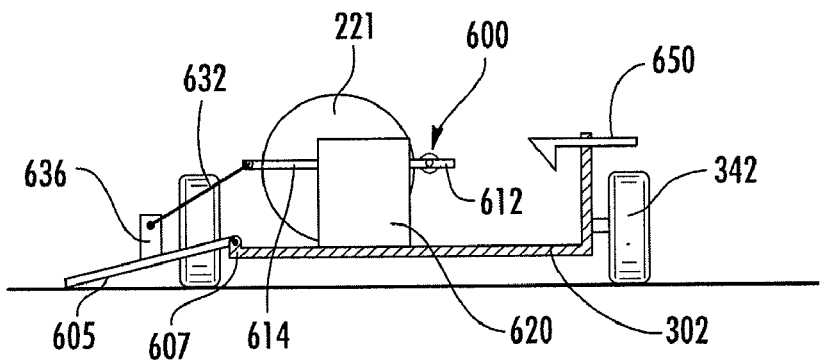
FIGS. 9B and 9C are side cross-sectional views of the wheel support mechanism of FIG. 9A taken through Section A-A of FIG. 9A.
Figure 9C:
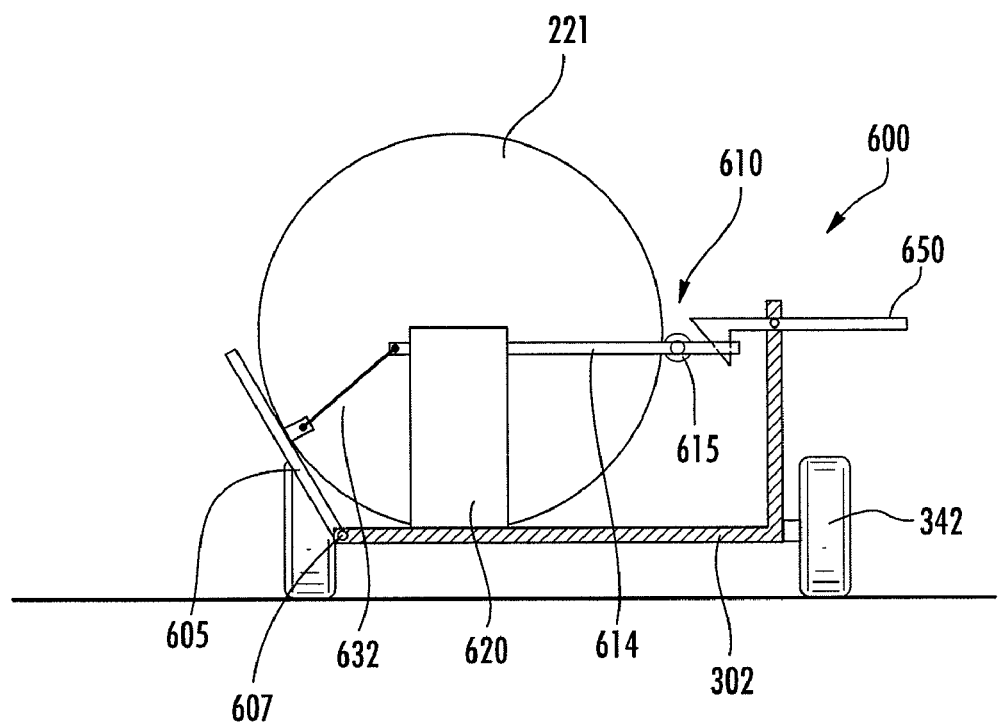

Embodiment of FIGS. 9A-9C

FIGS. 9A-9C show a further embodiment of the wheel support mechanism. In this embodiment, the wheel support mechanism's first ramp member 600 includes a first ramp portion 605 that has a structure that is similar to the first and second ramp portions 321, 331 shown in FIGS. 2 and 3. However, the ramp portion 605 includes a first cable support member 634 adjacent its first lateral side and a second cable support member 636 adjacent its second lateral side. In this embodiment, the first ramp member 600 further includes a ramp lifting assembly 610 that includes a substantially planar, substantially U-shaped first ramp lifting member 611 that is positioned so that it is in a substantially horizontal plane and so that its distal ends 613, 614 are positioned adjacent a pivot axis 607 of the first ramp portion 605 when the first ramp portion 605 is in a "ramp down" orientation.

As shown in FIG. 9A, in one embodiment, a first cable 630 extends between the first distal end 613 of the first ramp lifting member 611 and the first cable support member 634. Similarly, a second cable 632 extends between the second distal end 614 of the first ramp lifting member 611 and the second cable support member 636. In this configuration, when the first ramp lifting member 611 moves away from the first ramp portion 605, the first ramp lifting member's first and second distal ends 613, 614 exert upward forces on the first ramp portion 605 adjacent the first and second cable support members 634, 636. This, in turn, causes the first ramp portion 605 to rotate about the first ramp portion's axis of rotation 607 and into a "ramp up" orientation (see FIG. 9C).

In particular embodiments, the first ramp lifting member 611 is supported by a pair of supports 620, 622 as shown in FIGS. 9A-9C. In particular, in various embodiments, each respective elongated straight portion of the U-shaped ramp lifting member 611 (e.g., the portions of the ramp lifting member 611 that comprise its respective distal ends 613, 615) is mounted to slide adjacent a corresponding one of the supports 620, 622. For example, in the embodiment shown in FIG. 9A, each straight portion of the ramp lifting member 611 is mounted so that it extends through a passage defined by a corresponding support 620, 622. In this embodiment, the diameter of the passage preferably has about the same diameter (e.g., a slightly larger diameter) than the diameter of each straight portion. This allows the ramp lifting member 611 to slide laterally relative to the supports 620, 622, for example, between the "ramp down" position of FIG. 9B and the "ramp up" position of FIG. 9C. This also preferably serves to maintain the ramp lifting member 611 in a substantially horizontal orientation as the ramp lifting member 611 slides between the "ramp up" and "ramp down" positions.

In particular versions of the embodiment shown in FIGS. 9A-9C, the wheel support mechanism 300 includes a second ramp member (not shown) that has substantially the same structure as the first ramp member 600. In this embodiment, the first and second ramp members are preferably positioned in a configuration similar to the first and second ramp members 320, 330 shown in FIGS. 1A, 1B, and 2.

To use the embodiment of the invention shown in FIGS. 9A-9C, a user first aligns a storage cartridge 200 so that its first fixed storage cartridge wheel 221 is aligned with the first ramp member's ramp portion 605, and so that its second fixed storage cartridge wheel 224 is aligned with the second ramp member's ramp portion (not shown). The user then pushes the storage cartridge 200 toward the wheel support mechanism 300 until the storage cartridge's fixed wheels 221, 222 each roll respectively up one of the wheel support mechanism's ramp members and onto the wheel support mechanism 300.

FIGS. 9B and 9C show the movement of a storage cartridge's first fixed wheel 221 onto a wheel support mechanism 300 via a first ramp member 600. As may be understood from these figures, the first fixed wheel 221 is first urged onto the ramp portion 605 of the storage cartridge's first ramp member 600. The storage cartridge's first fixed wheel 221 is then moved toward the first ramp member's roller 615 until the storage cartridge wheel 221 engages the roller 615. Next, the storage cartridge's first fixed wheel 221 is urged further against the roller 515, The user then continues to urge the storage cartridge 200 against the roller 515, which causes the first ramp lifting member 611 to slide horizontally away from the first ramp portion 605. This causes the first ramp member's cables 630, 632 to rotate the first ramp member's first ramp portion 605 about its axis of rotation 607 until the first ramp portion 605 is angled upwardly and disposed adjacent the first fixed wheel 221.

The user then continues to urge the storage cartridge's first fixed wheel 221 toward the first ramp member's first locking portion 650 until the first locking portion 650 (e.g., a latch) lockably engages the first ramp lifting member's latching rod 612. This causes the first fixed wheel 221 to be locked in place between: (1) the first ramp member's ramp portion 605 (which is in an upright position and engages a rear portion of the first fixed wheel 221); and (2) the ramp lifting member 611 (which preferably engages a front or other portion of the fixed wheel).

As may be understood from FIGS. 9A-9C, in various embodiments, the first ramp lifting member roller 615 may be adapted to facilitate the rolling engagement of the first fixed wheel 221 with at least a portion of the ramp lifting member 611. For example, in the embodiment shown in FIGS. 9A-9C, the roller 615 may be rotatably attached adjacent (e.g., to) the ramp lifting member's curved central portion. In various embodiments, this roller 615 is adapted to rotate in response to a wheel rotatably engaging the roller 615. In various embodiments, this may prevent the wheel from exerting a downward force on the ramp lifting member 611 as the ramp lifting member 610 moves from a "ramp down" to a "ramp up" position.

Figure 10:
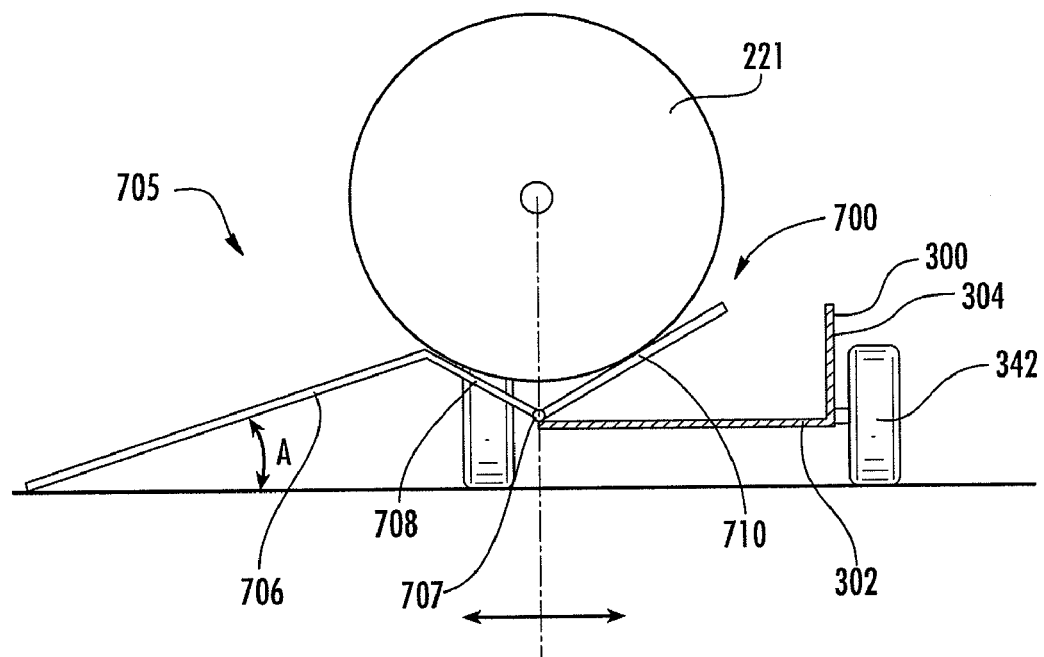
FIG. 10 is a side cross-sectional view of a wheel support mechanism that is similar to the wheel support mechanism of FIGS. 2-3 but that includes a first alternative ramp structure. This cross-sectional view is taken through a section that corresponds to Section A-A of FIG. 2.
Figure 11:
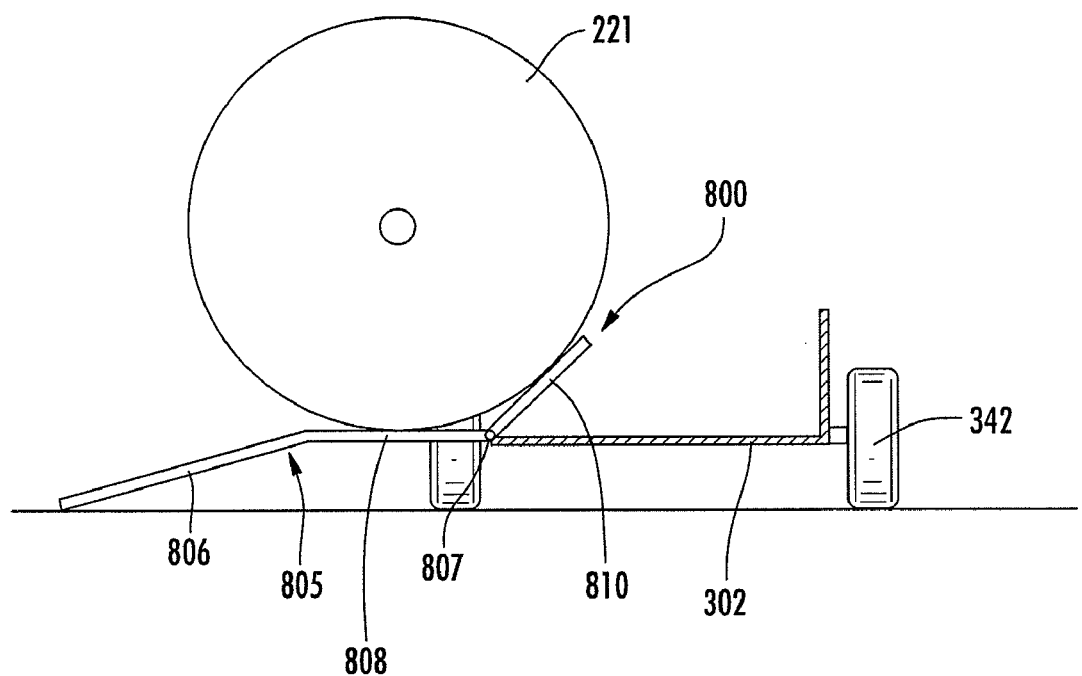
FIG. 11 is a side cross-sectional view of a wheel support mechanism that is similar to the wheel support mechanism of FIGS. 2-3, but that includes a second alternative ramp structure. This cross-sectional view is taken through a section that corresponds to Section A-A of FIG. 2.

Embodiment of FIGS. 10 and 11

Other exemplary embodiments of the ramp members are shown in FIGS. 10 and 11. In each of these arrangements, the first and second ramp members are positioned and hinged in a manner that is similar to the first and second ramp members shown in FIGS. 1A, 1B, and 2. However, the structural arrangement of the first and second ramp members (e.g., the structure of their respective ramp portions and ramp lifting members) is different from that of the first and second ramp members of FIG. 2.

Turning to the embodiment shown in FIG. 10, the ramp member's ramp portion 705 is generally in the form of a downwardly facing v-shaped member that includes a first substantially planar portion 706 and a second substantially planar portion 708. In a particular embodiment of the invention, the first and second substantially planar portions 706, 708 are attached to each other in an angled relationship along a common edge as shown in FIG. 10. In this embodiment, when the ramp portion 705 is in a "ramp down" orientation: (1) the first substantially planar portion 706 is angled upwardly in relation to the support surface supporting the wheel support mechanism 300; (2) the second substantially planar portion 708 is angled to extend downwardly from the inner end of the first substantially planar portion 706 to the pivot point 707 of the ramp member 700; and (3) the ramp lifting member 710 extends upwardly from the pivot point 707 of the ramp member 700, away from the second substantially planar portion 708.

In this embodiment, the angle A formed between the first substantially planar portion 706 and the support surface is preferably between about 5 and about 30 degrees. Also, in particular embodiments of the invention, the ramp member 700 is adapted so that when a wheel 221 of a storage cartridge 200 is supported by the second substantially planar portion 708 and the ramp lifting member 710 (as shown in FIG. 10), the wheel's axis of rotation is disposed within substantially the same vertical plane as the ramp member's pivot point 707.

A method of using the ramp member 700 of FIG. 10 will now be described in regard to using the ramp member 700 to facilitate the movement of a first fixed wheel 221 of a storage cartridge onto a wheel support mechanism 300. It should be understood that this same method may be used to roll a second fixed wheel 222 of a storage cartridge (e.g., substantially simultaneously with the first fixed wheel 221) onto the wheel support mechanism 300 via a second ramp member (not shown).

Turning to FIG. 10, to use the ramp member 700, a user first aligns the first wheel 221 of a storage cartridge with the first ramp member 700. The user then pushes the storage cartridge up the first substantially planar portion 706 and over the peak formed by the first and second substantially planar portions 706, 708. The user then continues to push the storage cartridge toward the wheel support mechanism 300 until: (1) the first wheel 221 is supported by and between the second substantially planar portion 708 and the ramp lifting member 710; and (2) the axis of rotation of the first wheel 221 is substantially in vertical alignment with the pivot point 707 of the ramp member 700. The user then continues to push the storage cartridge toward the wheel support mechanism 300, which causes the ramp member 700 rotate about its pivot point 707 until the ramp member 700 is in a "ramp up" position.

In particular embodiments, when the ramp member 700 is in a "ramp up" position, the ramp lifting member 710 is in a substantially horizontal orientation adjacent the base 302 of the wheel support mechanism 300. In particular embodiments, the weight of the storage cartridge on the ramp lifting member 710 serves to maintain the ramp member 700 in the "ramp up" position until a user pulls the storage cartridge 300 outwardly away from the wheel support mechanism 300. In particular embodiments, when the first wheel 221 is in place on the wheel support mechanism 300 and the ramp member 700 is in a "ramp up" position, the second ramp portion 708 and a side wall portion 304 of the wheel support mechanism 700 engage opposite sides of the wheel 221 and thereby maintain the wheel 221 in a substantially fixed position relative to the base 302 of the wheel support mechanism 300.

In one embodiment, to remove the cartridge's fixed wheels 221, 222 from the wheel support mechanism, the user simply pulls the cartridge away from the wheel support mechanism 300. In response, the ramp member 700 rotates from a "ramp up" to a "ramp down" position, which allows the storage cartridge's fixed wheels 221, 222 to roll up the second substantially planar portion 708, down the first substantially planar portion 706, and off of the wheel support mechanism 300.

A further alternative embodiment of the ramp member 700 is shown in FIG. 11. In this embodiment, the ramp member 800 is structurally and functionally similar to the ramp member 700 of FIG. 10 except that the angle formed between the substantially planar portion 806 and the second substantially planar portion 808 is selected so that the second substantially planar portion 808 is disposed in a substantially horizontal position when the ramp member 800 is in the "ramp down" orientation shown in FIG. 11. In addition, in preferred embodiments of the invention, the ramp member 800 is constructed so that the angle formed between the second substantially planar portion 805 and the ramp lifting member 810 is greater than about 90 degrees.

Wheel Support Mechanism Integrated with Scale or Dispenser Housing

In some situations, it may be desirable to structurally integrate the wheel support mechanism 300 with other portions of the dispenser 10. This may be useful, for example, in maintaining the wheel support mechanism 300 in a stable position as the wheels of a storage cartridge 200 are rolled onto the wheel support mechanism 300. This may also be useful in preventing the unwanted removal (e.g., theft) of the wheel support mechanism 300.

FIGS. 12-16 show an embodiment of the invention in which the wheel support mechanism 1100 is structurally integrated with the dispenser's scale 1000. As may be understood from FIG. 12, the overall structure of the wheel support mechanism 1100 is similar to the structure of the wheel support mechanism 300 of FIG. 2, except that, in the embodiment shown in FIGS. 12-16, the wheel support mechanism 1100 is supported by: (1) a pair of wheels 1142, 1143 that are disposed adjacent (and preferably attached to) opposite lateral sides of the wheel support mechanism's outer end; and (2) a pair of rollers 1140, 1145 that are disposed adjacent (and preferably attached to) opposite lateral sides of the wheel support mechanism's inner end. In the embodiment shown in FIG. 12, the wheel support mechanism's first roller 1140 is adapted to roll (e.g., substantially horizontally) along a first substantially horizontal, substantially planar track 1015 that is disposed adjacent a first lateral side of the scale's first wheel support 1005. Similarly, the wheel support mechanism's second roller 1145 is adapted to roll (e.g., substantially horizontally) along a second substantially horizontal, substantially planar track 1020 that is disposed adjacent a second lateral side of the scale's first wheel support 1005.

Figure 12:
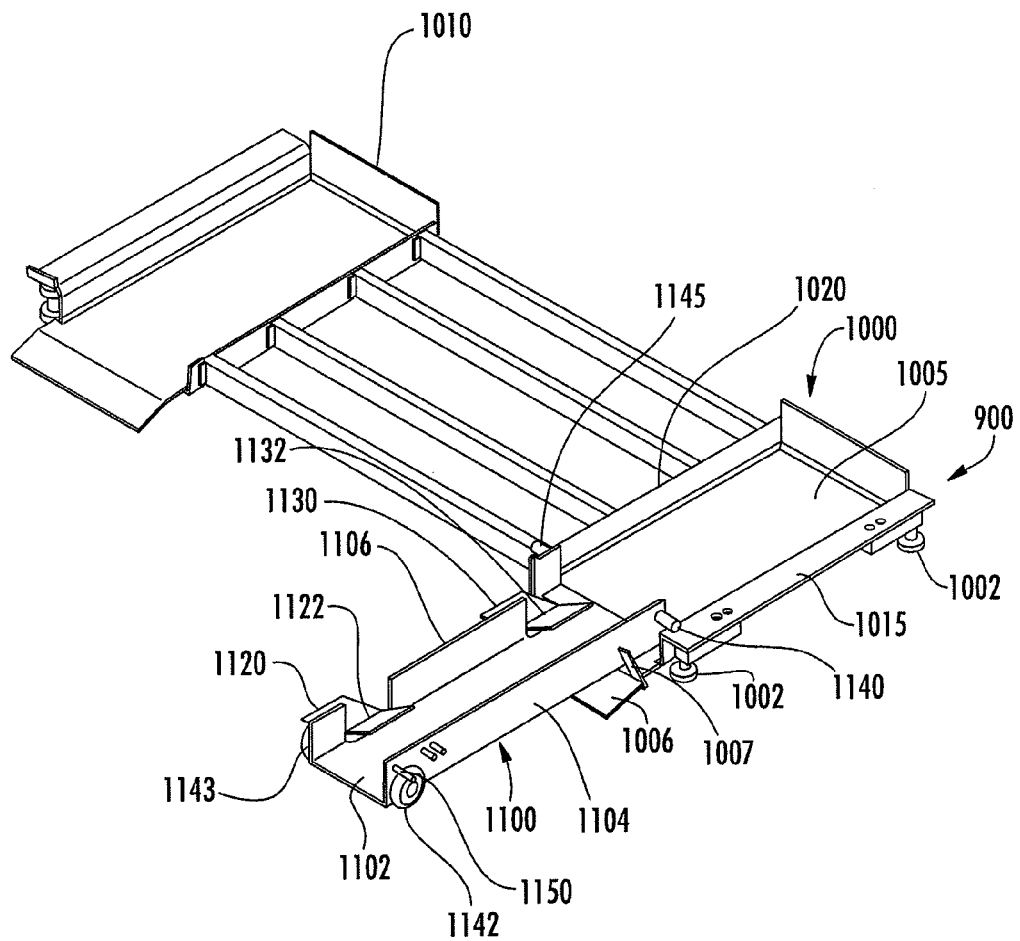
FIG. 12 is a perspective view of a wheel support mechanism that is structurally integrated with a scale.

In various embodiments, a ramp 1006 is provided adjacent the outer side of the first wheel support 1005 to facilitate the movement of the wheel support mechanism 1100 onto the first wheel support 1005. In various embodiments, this ramp 1006 is pivotably mounted adjacent the first wheel support 1005 so that the ramp 1006 may be pivoted between: (1) a "ramp down" position in which the ramp's distal end engages a support surface supporting the wheel support mechanism 1100; and (2) a "ramp up" position in which the ramp's distal end is spaced apart from and positioned above the support surface. As shown in FIG. 12, in particular embodiments, a ramp activation member 1007 extends upwardly from the ramp 1006 and is positioned in the path of a ramp actuator 1150 that is disposed adjacent a lateral side of the wheel support mechanism 1100.

In the embodiment shown in FIG. 12, the ramp activation member 1007 is adapted so that, when the ramp 1006 is in the "ramp down" position, rotating the ramp activation member 1007 toward the first wheel support 1005 causes the ramp 1006 to rotate into the "ramp up" position. Accordingly, the ramp activation member 1007 may be used to control the position of the ramp 1006.

Figure 13:
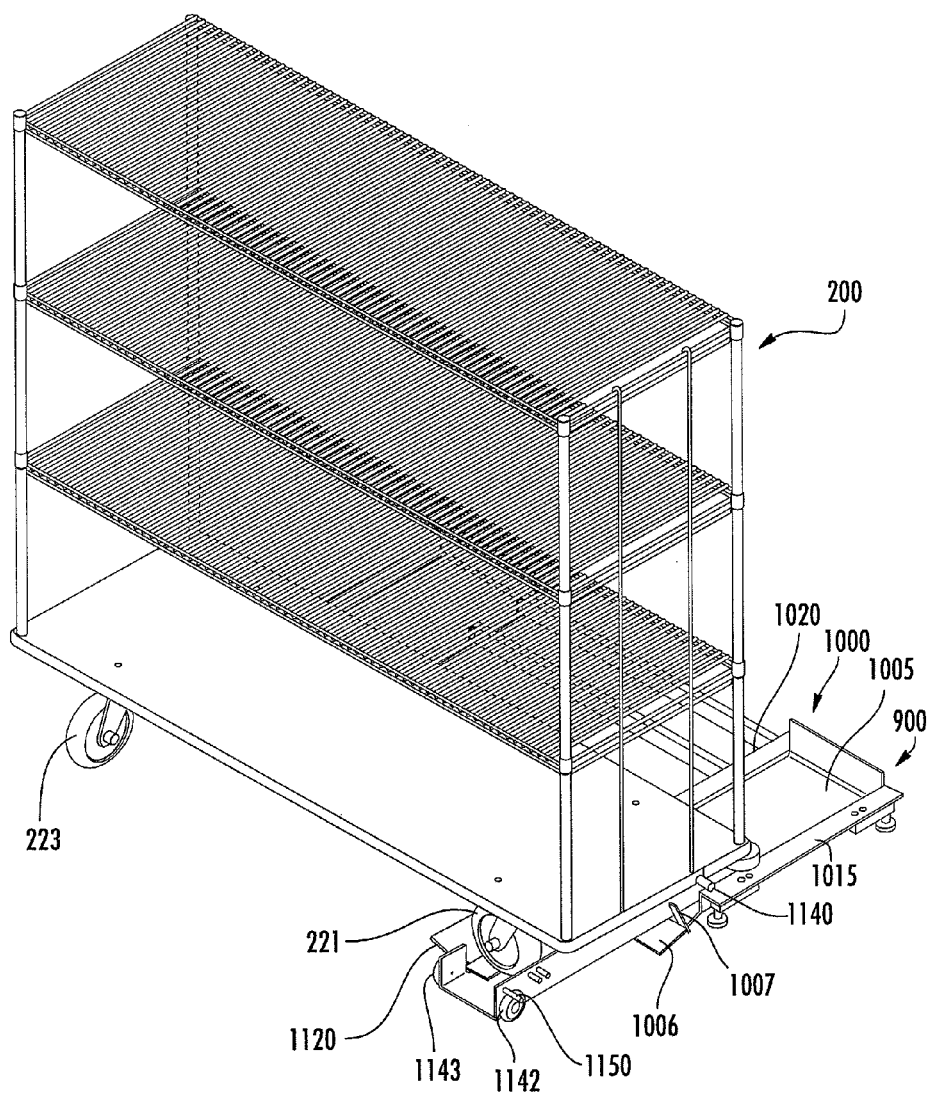
FIG. 13 is a perspective view of the wheel support mechanism of FIG. 12, in which a storage cartridge is shown in engagement with the wheel support mechanism, and in an "off-scale" position.
Figure 14:
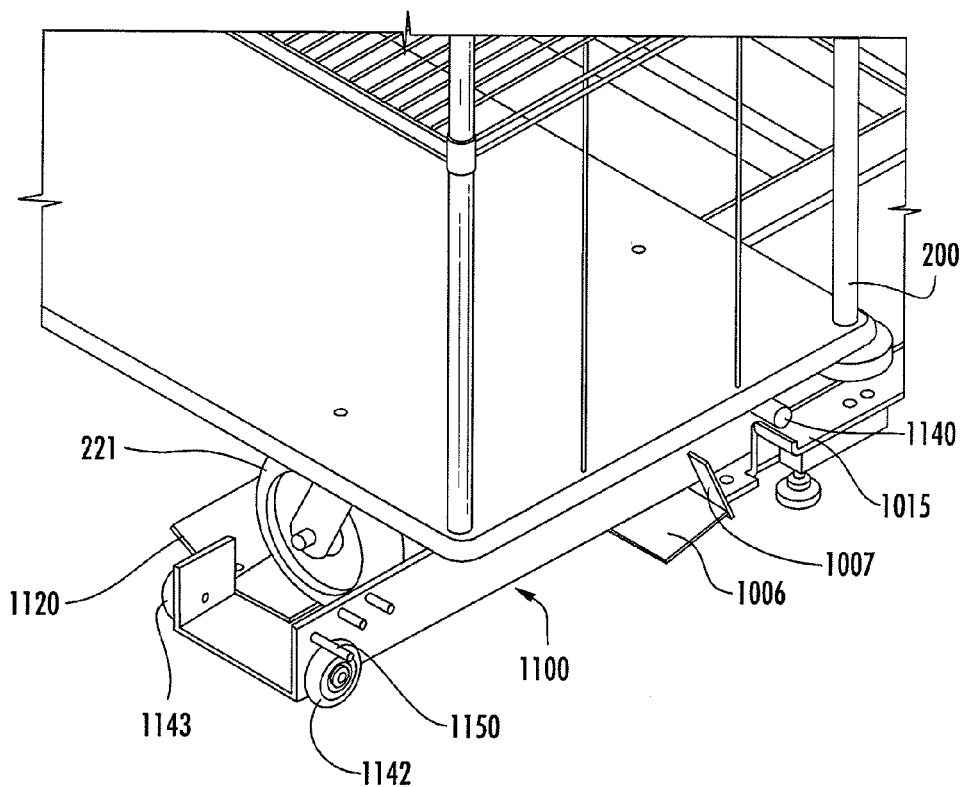
FIG. 14 is a close-up view of the lower right-hand portion of FIG. 13.
Figure 15:
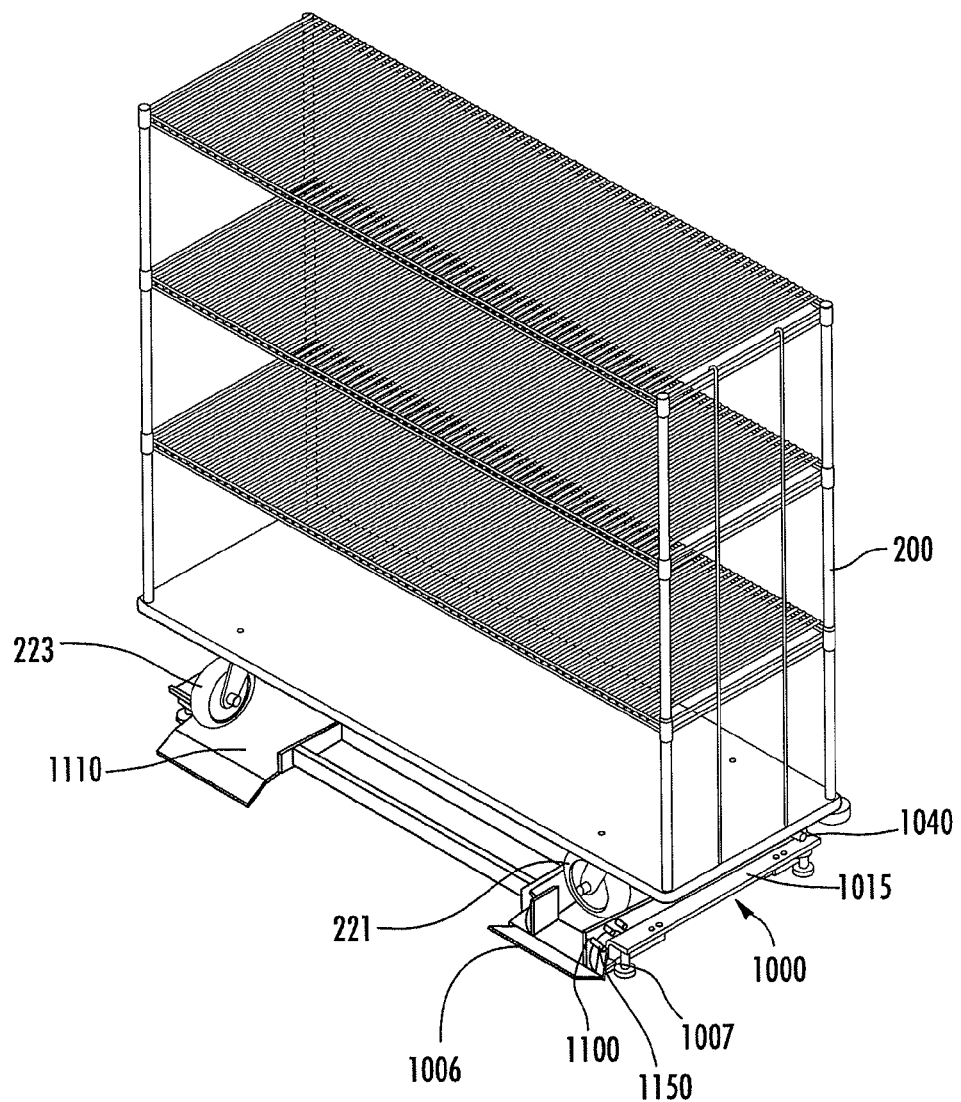
FIG. 15 is a perspective view of the wheel support mechanism and storage cartridge of FIG. 13 in which the storage cartridge is shown in an "on-scale" position.
Figure 16:
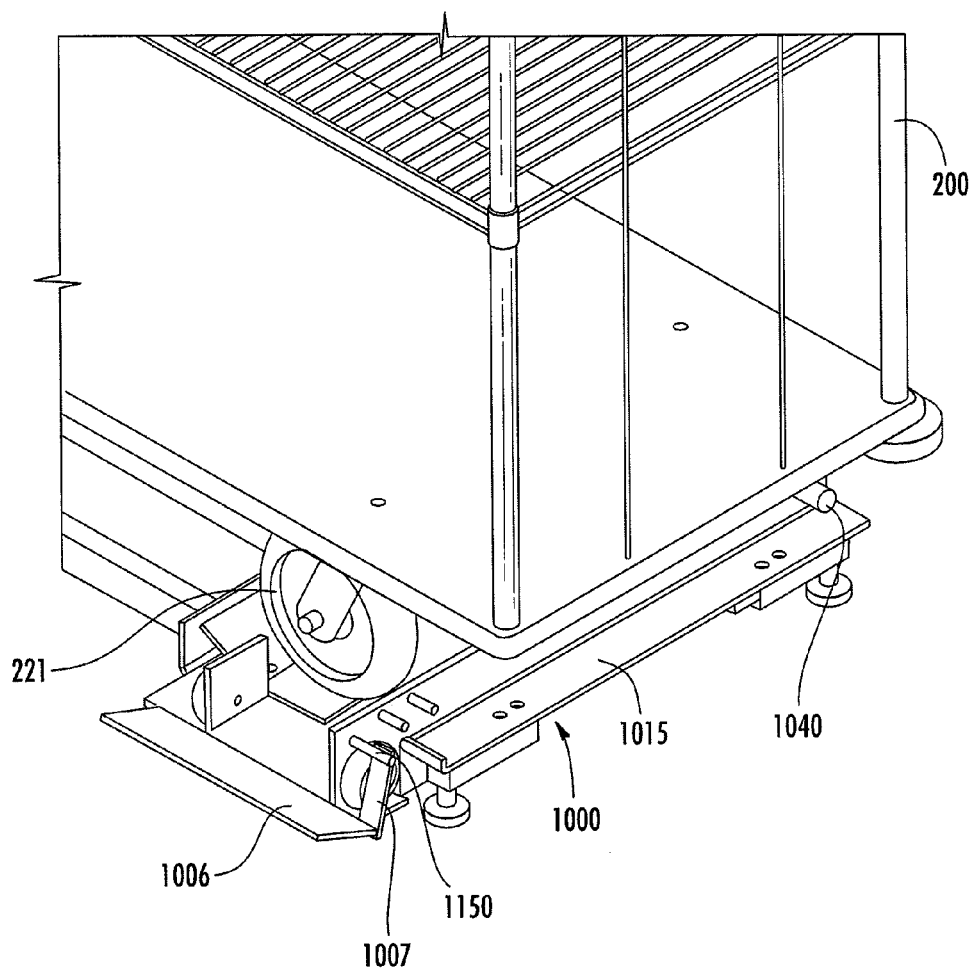
FIG. 16 is a close-up view of the lower right-hand portion of FIG. 15.

To use the embodiment of the invention shown in FIG. 12, a user first aligns the fixed wheels of a storage cartridge 200 with the wheel support mechanism's first and second ramp members 1120, 1130 (which may be, for example, in the form of any suitable ramp member, such as those described above) and then pushes the storage cartridge 200 toward the wheel support mechanism 1100 until, as shown in FIG. 13: (1) the storage cartridge's fixed wheels (e.g., the first fixed wheel 221) are supported by the wheel support mechanism 1100; and (2) the wheel support mechanism's first and second ramp members 1120, 1130 are in a "ramp up" position. In various embodiments, when the storage cartridge 200 is in this position, the storage cartridge's swiveled wheels (e.g., swiveled wheel 223) are generally in-line with the second wheel support 1010 of the dispenser's scale.

Next, with the storage cartridge's fixed wheels locked in place on the wheel support mechanism 1100, the user pushes the storage cartridge 200 toward the dispenser's scale 1000. As may be understood from FIGS. 14 and 15, as the outer end of the storage cartridge 200 moves past the ramp 1006 and onto the scale's first wheel support 1005, the wheel support mechanism's ramp actuator 1150 engages the ramp actuation member 1007 causing the ramp actuation member 1007 to rotate toward the dispenser's scale 1000. This, in turn, causes the ramp 1006 to rotate from the "ramp down" to the "ramp up" position.

The user then continues pushing the storage cartridge 200 toward the rear portion of the scale 1000 until: (1) the wheel support mechanism 1100 is disposed entirely on (e.g., is fully supported by) the scale's first wheel support 1005; and (2) the storage cartridge's swiveled wheels (e.g., swiveled wheel 223) are disposed entirely on (e.g., are fully supported by) the scale's second wheel support 1010. In this configuration, the storage cartridge 200 is preferably supported substantially entirely by the dispenser's scale 1000, which allows the scale 1000 to measure the weight of the storage cartridge 200 and any items stored on the storage cartridge's shelves. In various preferred embodiments, the dispenser 10 is dimensioned so that: (1) the storage cartridge 200 is disposed entirely within the dispenser's interior when the storage cartridge 200 is in this position; and (2) the dispenser's access door 112 can be selectively opened and closed when the storage cartridge 200 is in this position.

To remove the storage cartridge 200 from the dispenser's housing 100, the user pulls the storage cartridge 200 away from the dispenser's housing (e.g., toward the user), which causes the wheel support mechanism 1100 to exert an outward force on the inner surface of the ramp 1006 while the ramp actuator 1150 moves away from the ramp activation member 1007. This causes the ramp 1006 and the ramp activation member 1007 to rotate from the "ramp up" position to the "ramp down" position. The user then continues pulling the storage cartridge 200 away from the dispenser's housing 10 until the wheel support mechanism 1100 is fully extended. The user then pulls the storage cartridge 200 off of the wheel support mechanism 1100 as discussed above.

Figure 17:
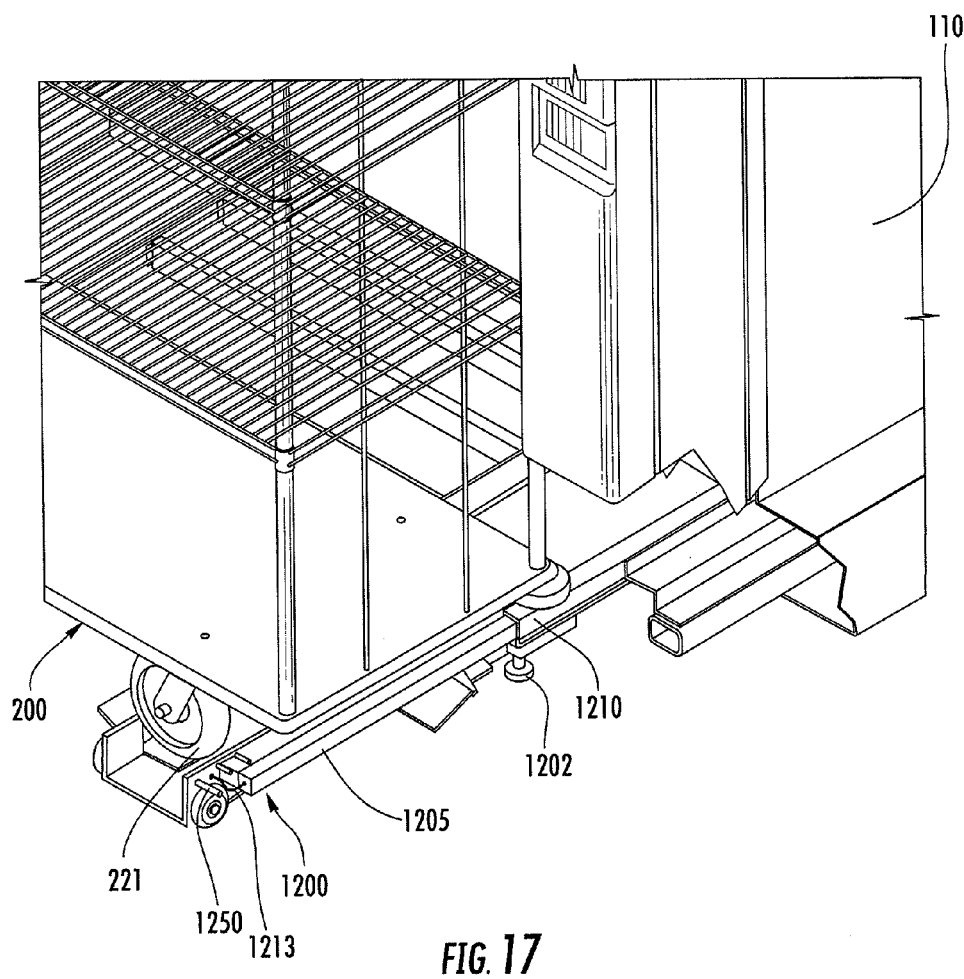
FIG. 17 is a perspective view of a dispenser in which a wheel support mechanism is structurally integrated with the dispenser, and in which the storage cartridge is in an "off scale position".
Figure 18:
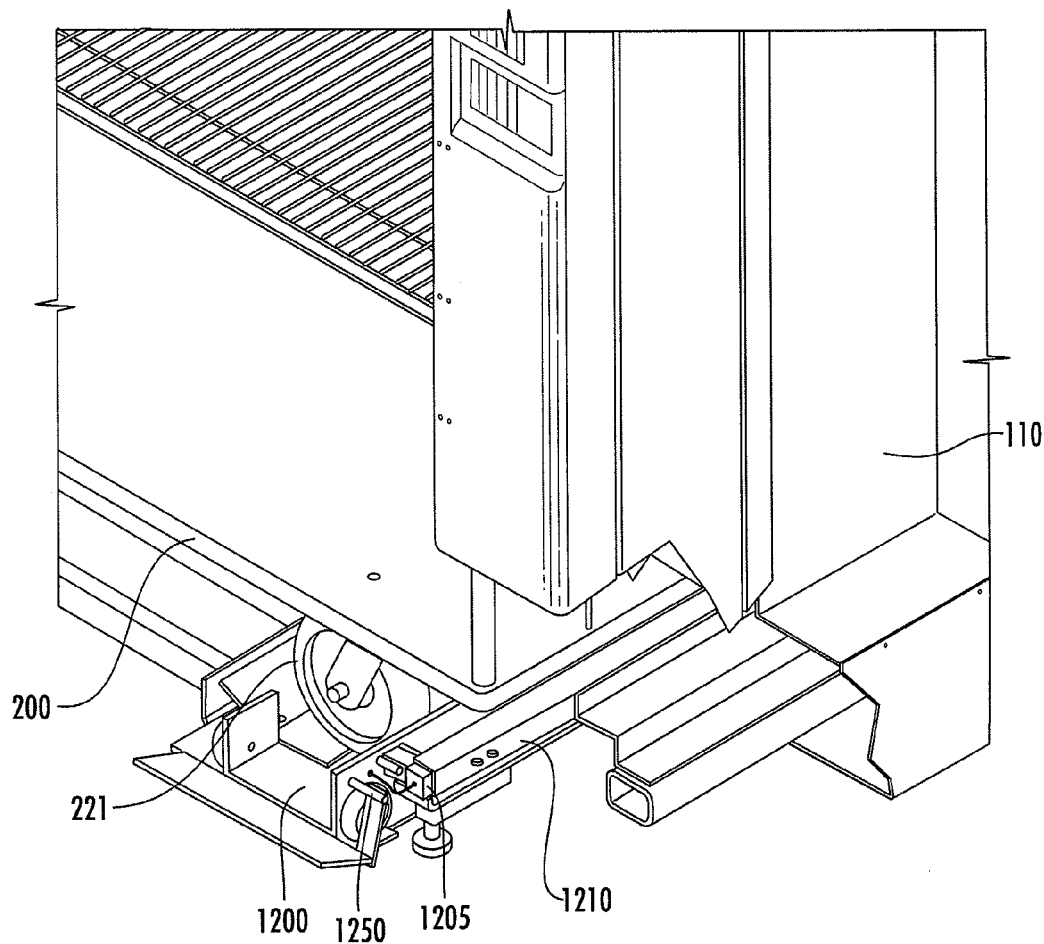
FIG. 18 is a perspective view of the dispenser of FIG. 17 in which the wheel support mechanism is in an "on scale position".

Embodiment of FIGS. 17-18

In alternative embodiments of the invention, an example of which is shown in FIGS. 17-18, the wheel support mechanism is integrated with the body 110 of the dispenser 10. In the embodiment shown in FIGS. 17-18, the dispenser 10 includes a substantially horizontal rod sleeve 1210 that is disposed adjacent an outer lateral side of the scale's first wheel support. A guide rod 1205 is disposed in a telescoping arrangement with the rod sleeve 1210 so that the guide rod 1205 can slide (e.g., substantially horizontally) between: (1) a first position in which a particular portion of the guide rod 1205 is within an interior portion of the rod sleeve 1210; and (2) a second position in which that particular portion of the guide rod 1205 is disposed outside of the interior portion of the rod sleeve 1210.

In this embodiment, the wheel support mechanism 1200 is similar in structure and operation to the wheel support mechanism 1100 shown in FIGS. 12-16. However, the guide rod 1205/rod sleeve 1210 arrangement described above is positioned adjacent the wheel support mechanism's outer lateral side edge so that when the guide rod 1205 and wheel support mechanism 1200 are both fully extended: (1) the guide rod 1205 is adjacent, substantially parallel to, and offset from, the wheel support mechanism's outer lateral side edge; and (2) the outer end of the guide rod 1205 is disposed adjacent the outer end of the wheel support mechanism 1200.

In particular embodiments of the invention, the distal end of the guide rod 1205 is attached to the wheel support mechanism's outer lateral side edge via a piece of lightweight flexible material 1213 (such as a lightweight string or cable). This causes the guide rod 1205 to: (1) extend in response to the wheel support mechanism 1200 being extended (e.g., out of the interior of the dispenser); and (2) retract into the rod sleeve 1210 in response to the wheel support mechanism 1200 being retracted (e.g., into the interior of the dispenser). In various embodiments of the invention, the lightweight piece of flexible material 1213 is advantageous because it adds only a negligible amount of weight to the total amount of weight measured by the dispenser's scale 1000 when the storage cartridge 200 and wheel support mechanism 1200 are stored on the scale 1000.

It should be understood that, in various embodiments of the invention, the piece of lightweight flexible material 1213 may be replaced by any other suitable mechanism for attaching the guide rod 1205 to the rod sleeve 1210.

In particular embodiments of the invention, a roller ball (not shown) may be positioned between the guide rod 1205 and the outer portion of the wheel support mechanism 1200 that is immediately adjacent the guide rod 1205. In various embodiments, this roller ball may be attached adjacent (e.g., to) the surface of the guide rod 1205 that co-faces the wheel support mechanism 1200. This roller ball may serve to reduce the friction between the wheel support mechanism 1200 and the guide rod 1205. As will be understood by one skilled in the relevant field in light of this disclosure, any other suitable friction-reducing device or material may also be used for this purpose.

In various embodiments of the invention, at least a portion of the wheel support mechanism 1200 is mounted directly to the dispenser's scale 1000. For example, in particular embodiments, the rod sleeve 1210 is attached directly to the dispenser's scale 1000. In such embodiments, the scale 1000 may be calibrated to take the weight associated with the wheel support mechanism 1200 into account when determining the weight of items positioned on the scale 1000.

Slide Plate as Wheel Support Mechanism

Figure 19:
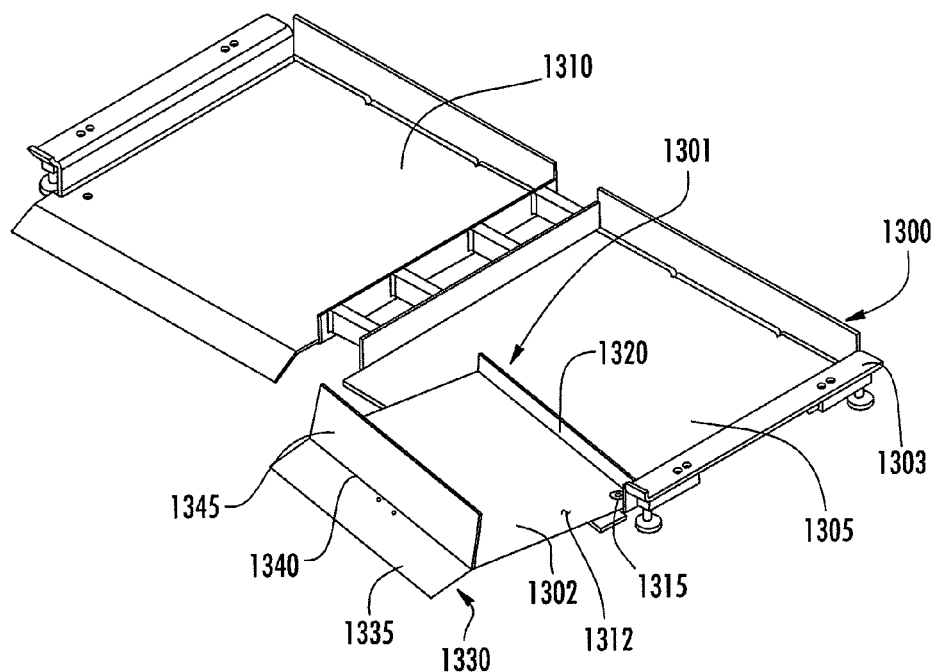
FIG. 19 is a perspective view of an alternative embodiment of a wheel support mechanism and scale combination.
Figure 20:
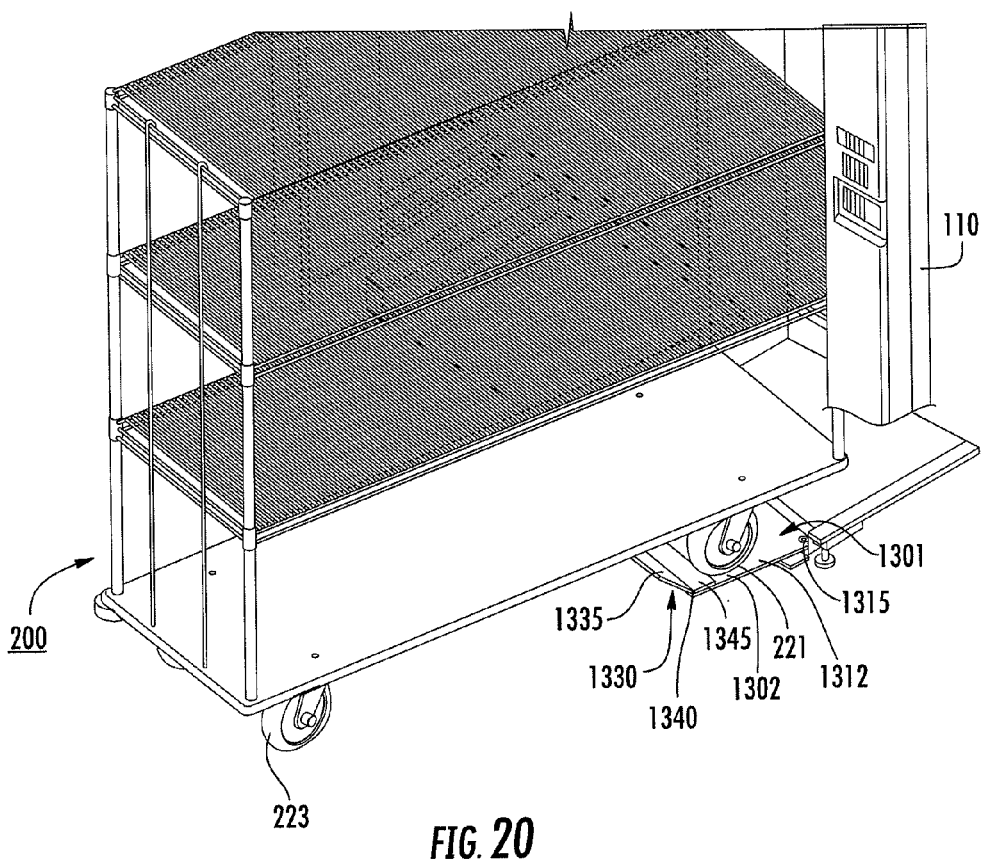
FIG. 20 is a perspective view of the wheel support mechanism and scale combination of FIG. 19 in which a storage cartridge is shown in engagement with the wheel support mechanism and in an "off-scale" position.
Figure 21:
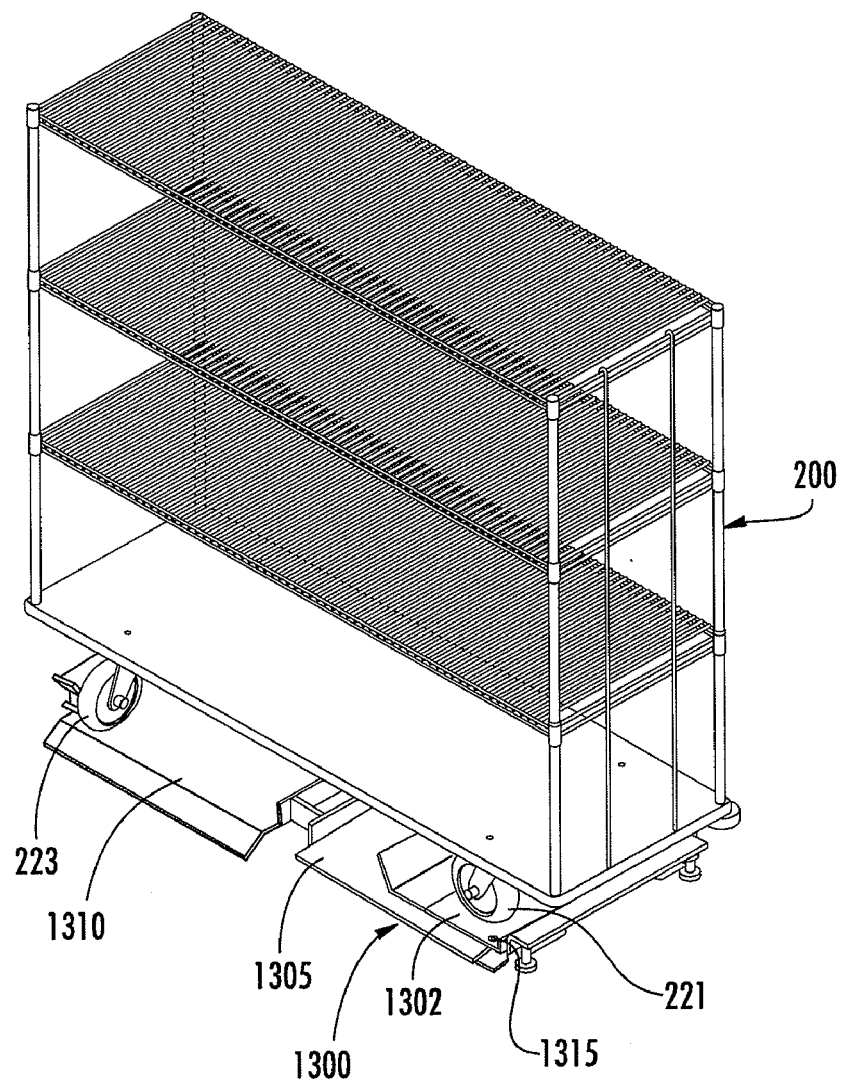
FIG. 21 is a perspective view of the wheel support mechanism and scale combination of FIG. 19 in which a storage cartridge is shown in engagement with the wheel support mechanism and in an "on-scale" position.

FIGS. 19-21 show a wheel support mechanism 1301 according to yet another embodiment of the invention. As may be understood from FIG. 19, this wheel support mechanism 1301 includes a substantially rectangular slide plate 1302 that is mounted to slideably pivot about a pivot point 1315 that is located on an outer lateral corner of the scale's first wheel support 1305. As shown in FIG. 19, in this embodiment, the slide plate 1302 is mounted so that the pivot point 1315 extends through a particular corner of the slide plate 1302.

As shown in FIGS. 20 and 21, the slide plate 1302 is configured to pivotably slide between: (1) a first position in which the slide plate 1302 extends out of the interior of a dispenser (e.g., through the dispenser's access opening 116); and (2) a second position in which the slide plate 1302 is disposed substantially entirely within the interior portion of the dispenser's body 114, and is supported substantially entirely by the scale's first wheel support 1305.

In a particular embodiment, the wheel support mechanism 1301 includes an elongated ramp member 1330 that has a V-shaped cross section and that is mounted to pivot about an axis of rotation 1340 that is disposed adjacent the base of the ramp member's V-shaped cross section as shown in FIG. 19. In particular embodiments of the invention, this axis of rotation 1340 lies substantially on and/or adjacent an outer side edge of the slide plate 1302.

In particular embodiments of the invention, to use the embodiment of the invention shown in FIG. 19, a user preferably positions a storage cartridge 200 so that the storage cartridge's fixed wheels 221, 222 align with the wheel support mechanism's ramp member 1330. The user then pushes the storage cartridge 200 toward the ramp member 1330 until the storage cartridge's fixed wheels 221, 222 roll up the ramp portion 1335 of the ramp member 1330 and engage the ramp member's ramp lifting member 1345. The user then urges the storage cartridge 200 against the ramp lifting member 1345, which causes the ramp member 1330 to rotate about its axis of rotation 1340 until, as shown in FIG. 20: (1) the ramp lifting member 1345 is in a substantially horizontal position adjacent the upper surface 1312 of the slide plate 1302; and (2) the ramp portion 1335 extends upwardly and away from the slide plate's upper surface 1312. The user then positions the storage cartridge 200 so that the storage cartridge's fixed wheels 221, 222 are between the front and rear edges of the slide plate 1302. In various embodiments, the user then positions the storage cartridge 200 so that the storage cartridge's fixed wheels 221, 222 engage a wheel stop 1320 (see FIG. 19) that is disposed adjacent a rear edge of the slide plate 1302.

Next, the user pushes the end of the storage cartridge 200 adjacent which the storage cartridge's swiveled wheels 223, 224 are attached toward the dispenser's scale 1000 until the storage cartridge's swiveled wheels 223, 224 are positioned on the scale's second wheel support 1010 (See FIG. 21). During this rotational movement of the storage cartridge 200, the cart's fixed wheels 221, 222 exert an inward force on the slide plate's wheel stop 1320, which causes the slide plate 1302 to rotate about the slide plate's pivot point 1315 until the slide plate 1302 is supported by (and, in particular embodiments, disposed adjacent a top surface of) the scale's first wheel support 1005. As shown in FIG. 21, in various embodiments, after the storage cartridge 200 is moved into this orientation: (1) the lateral sides of the slide plate 1302 are positioned substantially parallel to the rear surface of the dispenser's housing 110; (2) the dispenser's fixed wheels 221, 222 are positioned so that they are supported by the scale's first wheel support 1005; and (3) the dispenser's swiveled wheels 223, 224 are positioned so that they are supported by the scale's second wheel support 1010. Accordingly, when the storage cartridge 200 is in this "on scale" configuration, substantially the entire weight of the storage cartridge 200 and its contents are measured by the scale 1000.

Figure 22:
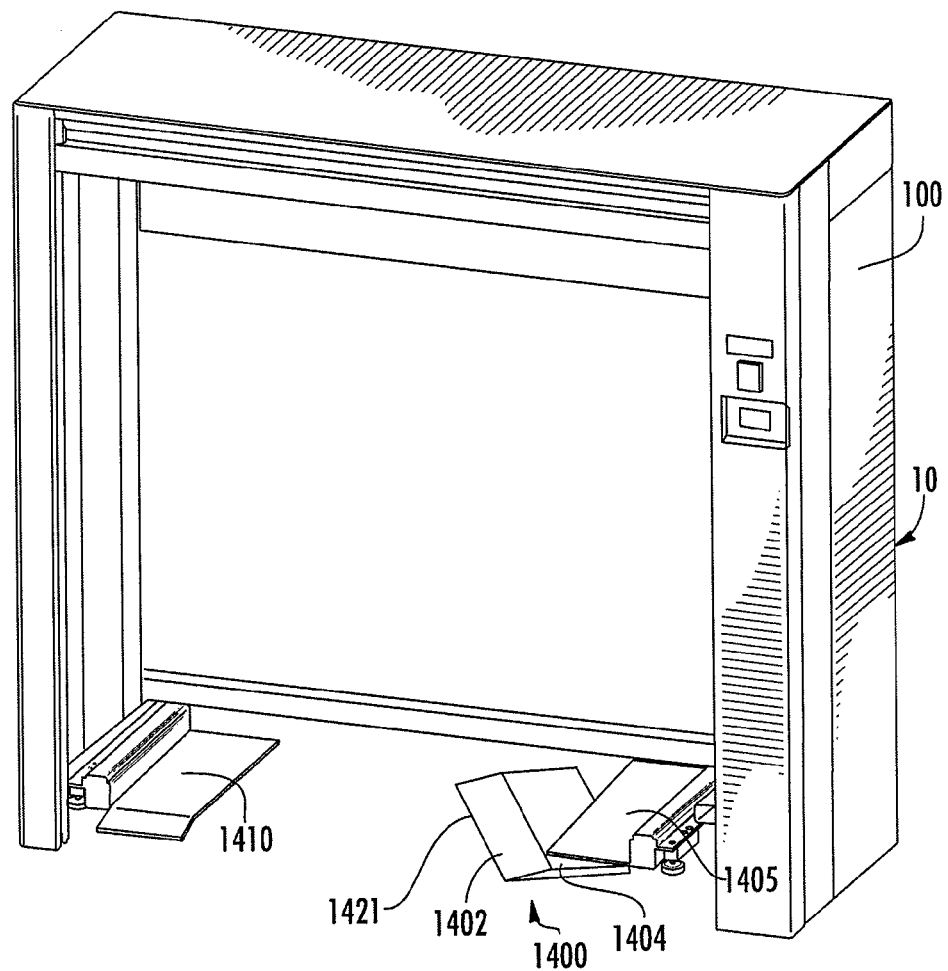
FIG. 22 is a front perspective view of a dispenser having an angled ramp that is adapted for facilitating the movement of a storage cartridge onto a scale within the interior of the dispenser.
Figure 23A:
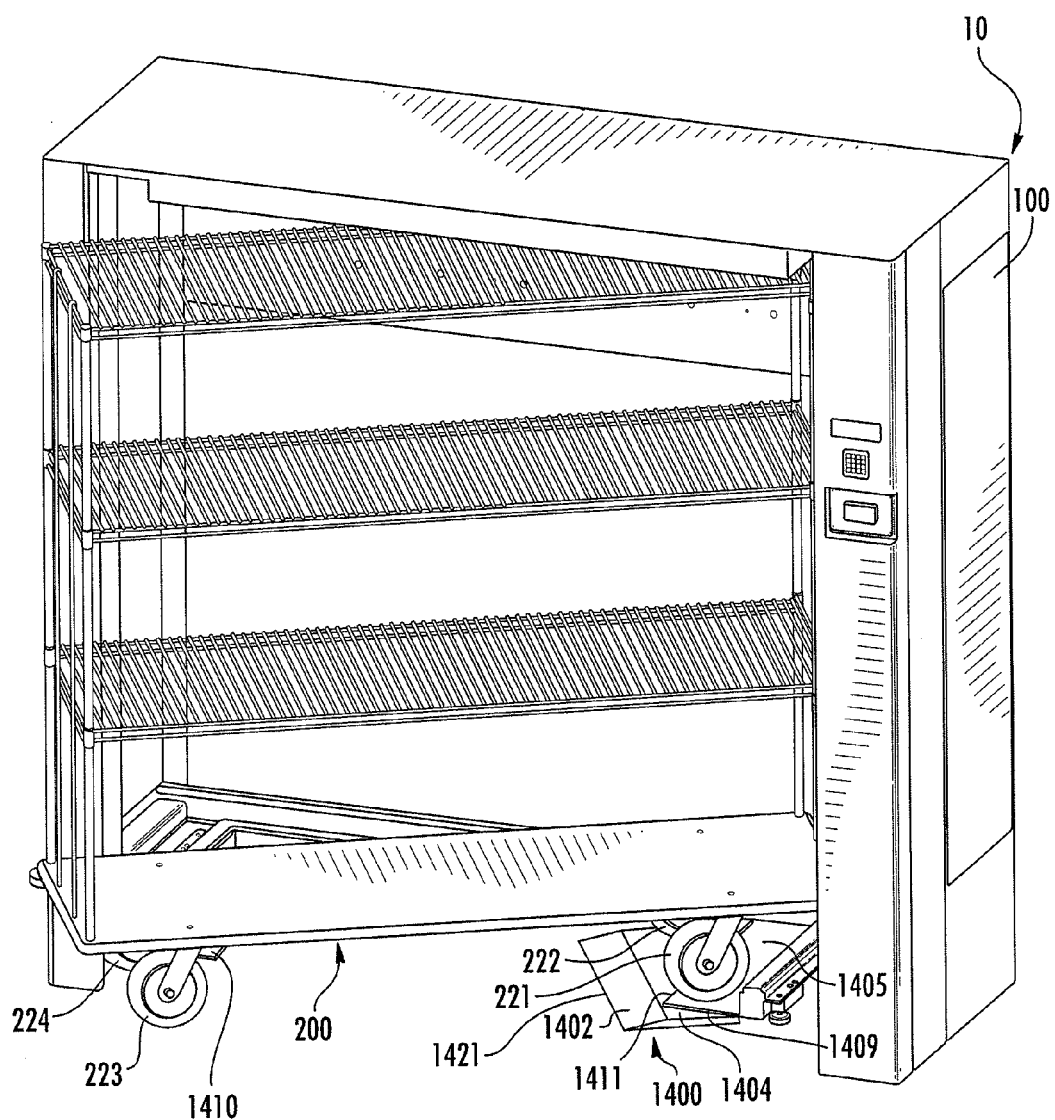
FIG. 23A is a front perspective view of the dispenser of FIG. 22 in which the storage cartridge is shown being wheeled onto the dispenser's scale.
Figure 23B:
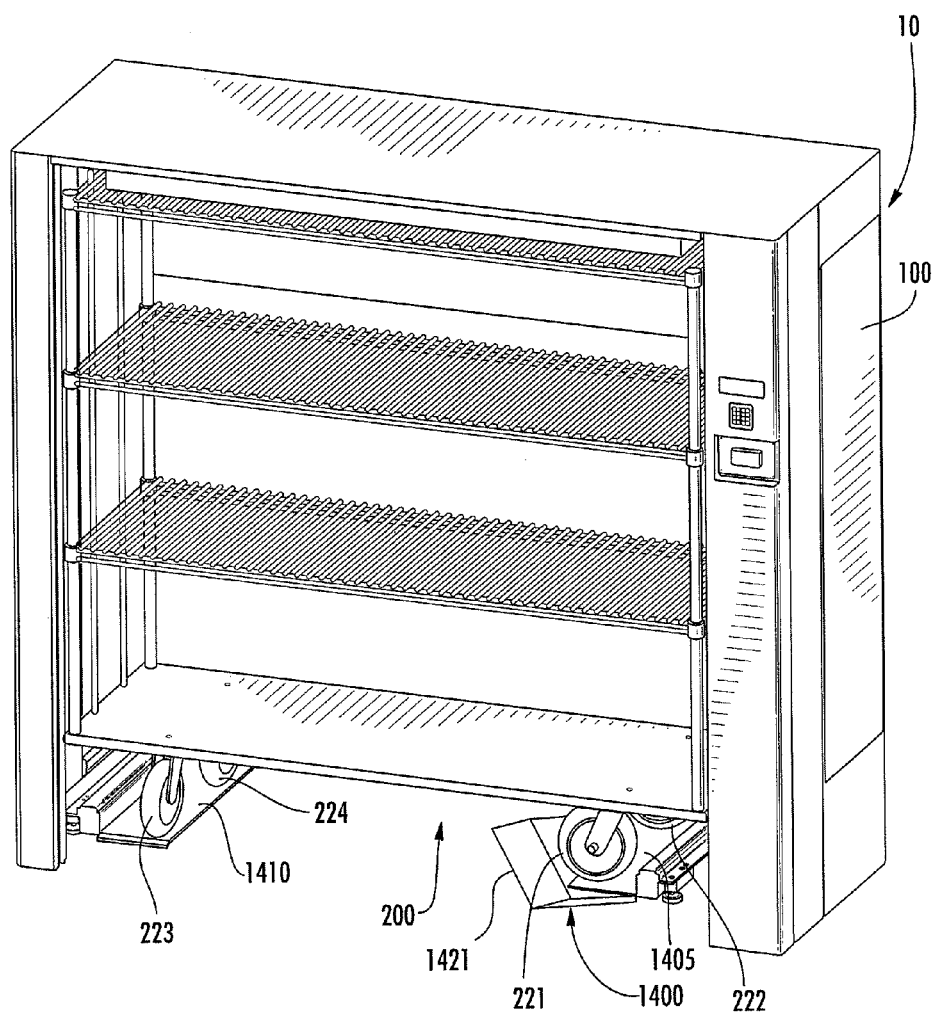
FIG. 23B is a front perspective view of the dispenser of FIG. 22 in which the storage cartridge is shown in an "on-scale" position.

FIGS. 22-23 show a further embodiment of a dispenser having a scale that includes two separate wheel supports 1405, 1410 and that is adapted for weighing items that are supported by the two wheel supports 1405, 1410. In this embodiment, the dispenser further includes a ramp 1400 that is disposed adjacent the scale's first wheel support 1405. In this embodiment, the ramp 1400 preferably includes a substantially planar ramp portion 1402 that is upwardly angled relative to the support surface upon which the dispenser 10 is supported. In addition, in particular embodiments, the ramp 1400, comprises a substantially planar, substantially horizontal upper support surface 1404 at least a portion of which is disposed adjacent, and at substantially the same vertical level, as the upper surface of the scale's first wheel support 1405. Also, in the embodiment shown in FIGS. 22, 23A and 23B: (1) the scale's first wheel support 1405 defines a front edge 1409 and an interior side edge 1411; and (2) the portion of the substantially horizontal upper support surface 1404 that is adjacent the scale's first wheel support 1405 conforms substantially to the shape of the front edge 1409 and the interior side edge 1411 of the scale's first wheel support 1405.

Similarly, in other embodiments of the invention in which the ramp 1400 and the scale's first wheel support 1405 are in different structural configurations, at least a portion of the outer perimeter of the ramp 1400 may be shaped to conform substantially to the shape of the outer perimeter of the scale's first wheel support 1405. In particular embodiments, the ramp 1400 and the scale may cooperate to form a substantially planar horizontal surface having a first substantially planar wheel support portion that is adapted for supporting the fixed wheels of a storage cartridge 200. The scale may further include a second, substantially planar wheel support portion 1410 that is adapted for supporting the fixed wheels of a storage cartridge 200. As noted above, the scale is preferably adapted for measuring the weight of items supported on the scale's first and second wheel supports 1405, 1410. The dispenser 10 shown in FIGS. 22 and 23 is a specific example of such an embodiment.

As may be understood from the embodiment of FIG. 22, the ramp 1400 may be positioned so that the front side edge 1421 of the ramp 1400 forms an angle of between 10 and 50 degrees with: (1) the dispenser's access door 112; (2) the dispenser's rear surface; and/or (3) the front edge of the dispenser's first wheel support portion 1405. This may serve to facilitate the smooth positioning of the storage cartridge 200 into the dispenser's interior.

In the embodiment of the invention shown in FIGS. 23A and 23B, in order to insert the storage cartridge 200 into the dispenser's housing 100, the user first aligns the storage cartridge's fixed wheels 221, 222 so that the fixed wheels' respective paths of travel cross the ramp's ramp portion 1402. The user then pushes the storage cartridge 200 toward the ramp 1400 until the storage cartridge's fixed wheels 221, 222 roll up the ramp's ramp portion 1402, onto the ramp's planar support portion 1404, and onto the scale's first wheel support 1405.

The user then pushes the end of the storage cartridge 200 adjacent which the swiveled wheels 223, 224 are attached toward the scale until the storage cartridge's swiveled wheels 223, 224 are positioned on the scale's second wheel support 1410. As shown in FIG. 23B, in various embodiments, after the storage cartridge 200 is moved into this orientation: (1) the dispenser's fixed wheels 221, 222 are positioned so that they are supported by the scale's first wheel support 1405; and (2) the dispenser's swiveled wheels 223, 224 are positioned so that they are supported by the scale's second wheel support 1410. Accordingly, when the storage cartridge 200 is in this "on scale" configuration, substantially the entire weight of the storage cartridge 200 and its contents are measured by the scale.

Figure 24:
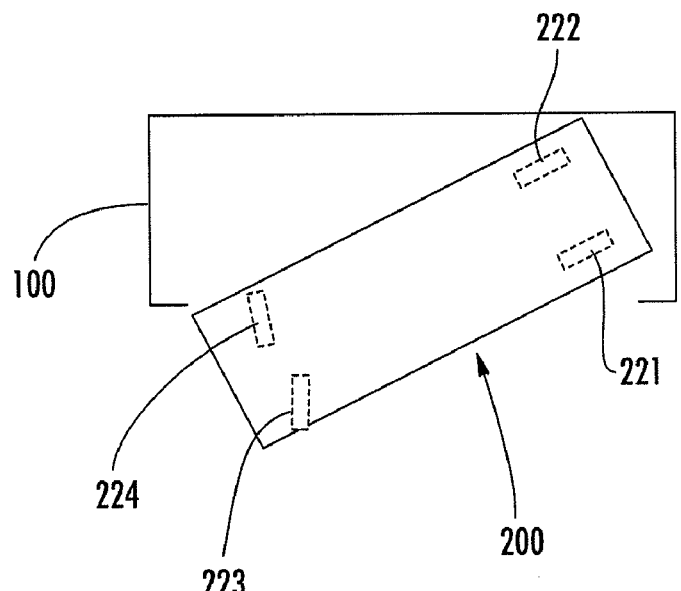
FIG. 24 is a top schematic view showing the orientation of the wheels of the storage cartridge of FIGS. 22 and 23 as the storage cartridge is in an intermediate loading position, partially within the dispenser.
Figure 25:
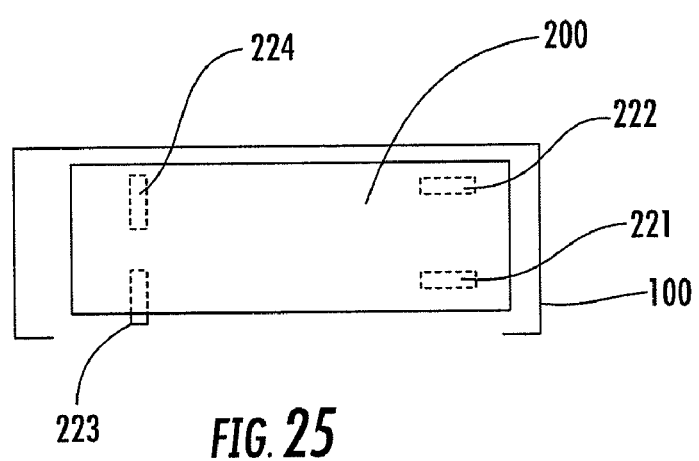
FIG. 25 is a top schematic view showing the orientation of the wheels of the storage cartridge of FIGS. 22 and 23 when as the storage cartridge is in a final loaded position within the dispenser.

For further clarification of the storage cartridge insertion process described above, FIGS. 24 and 25 show the position and orientation of a storage cartridge 200 and its fixed wheels 221, 222 and swiveled wheels 223, 224: (1) as the storage cartridge 200 is being moved into the dispenser housing 100 (see FIG. 24); and (2) as the storage cartridge 200 is stored within the dispenser (see FIG. 25).

Wheeled Jack Embodiment

Figure 26:
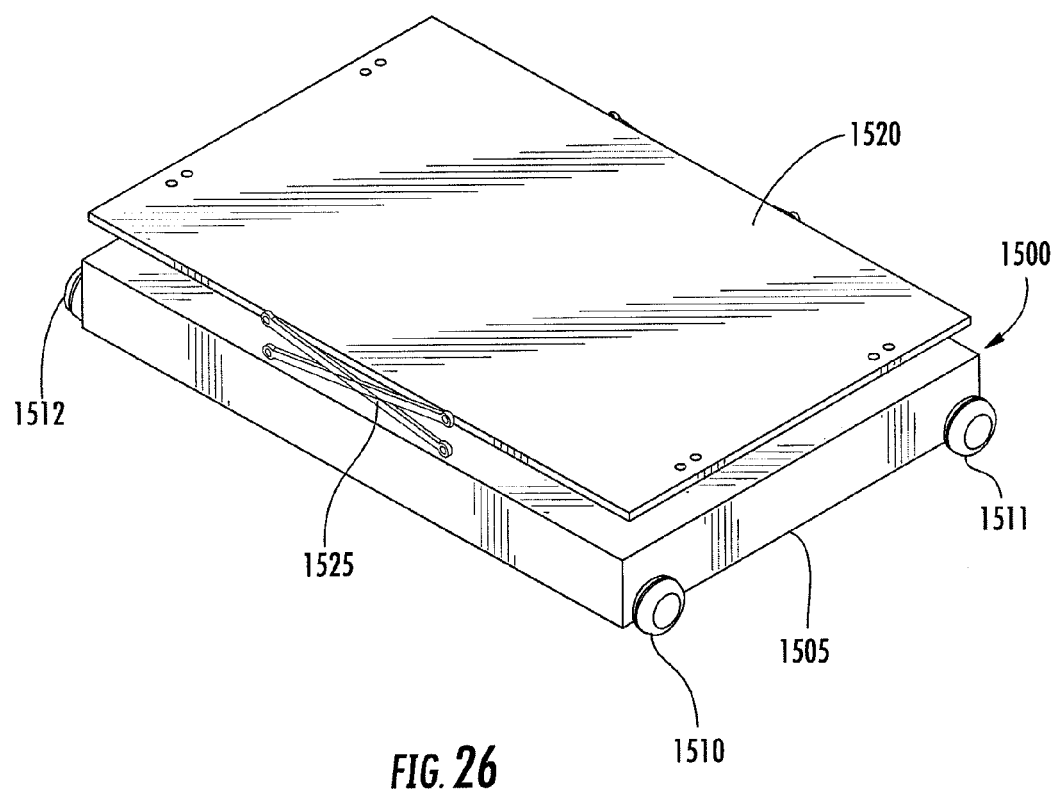
FIG. 26 is a front perspective view of a wheeled storage cartridge jack according to a particular embodiment of the invention.
Figure 27:
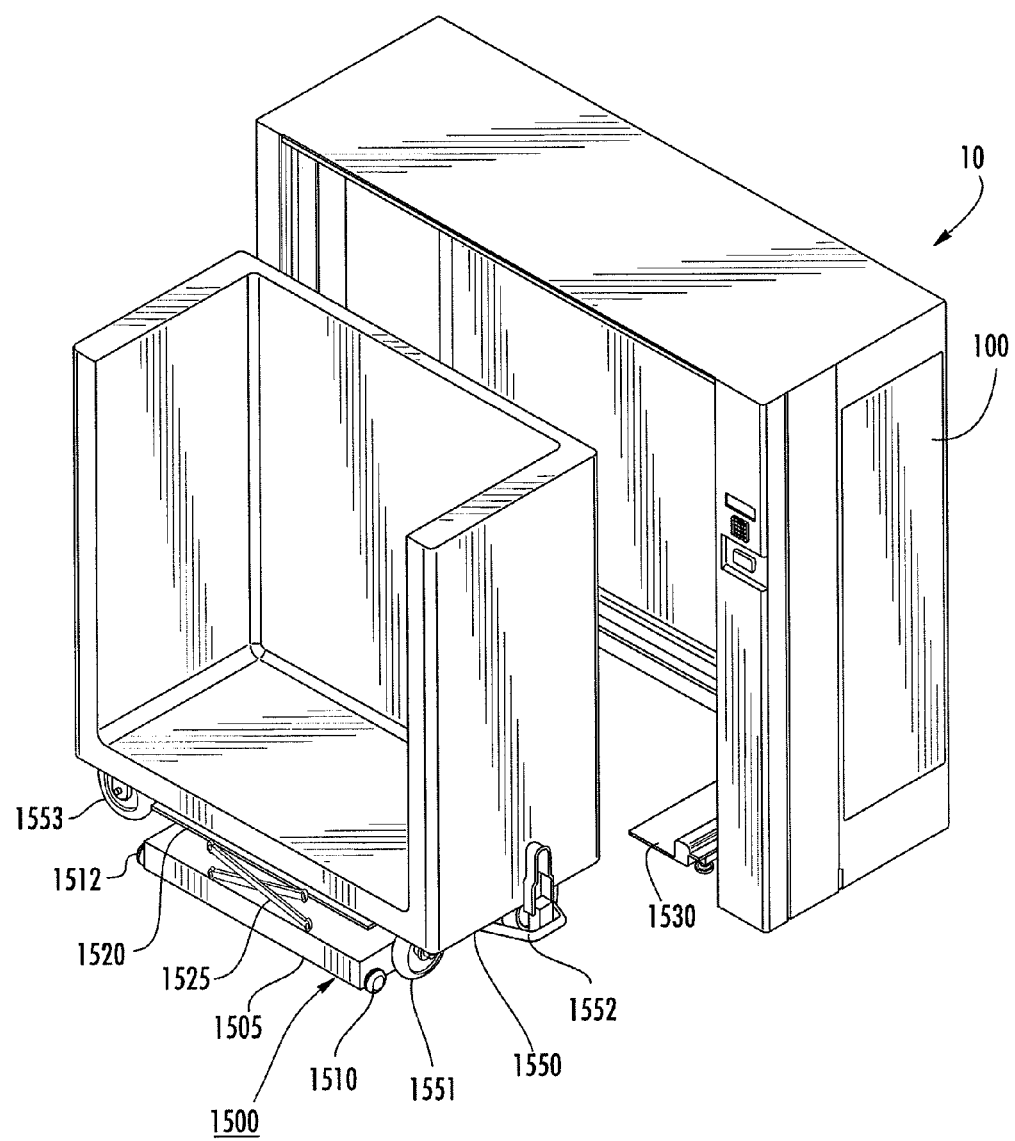
FIG. 27 is a front perspective view of the wheeled storage cartridge jack of FIG. 26 in which the wheeled storage cartridge jack is being used to support the weight of a storage cartridge and to wheel the storage cartridge into the interior of a dispenser.
Figure 28:
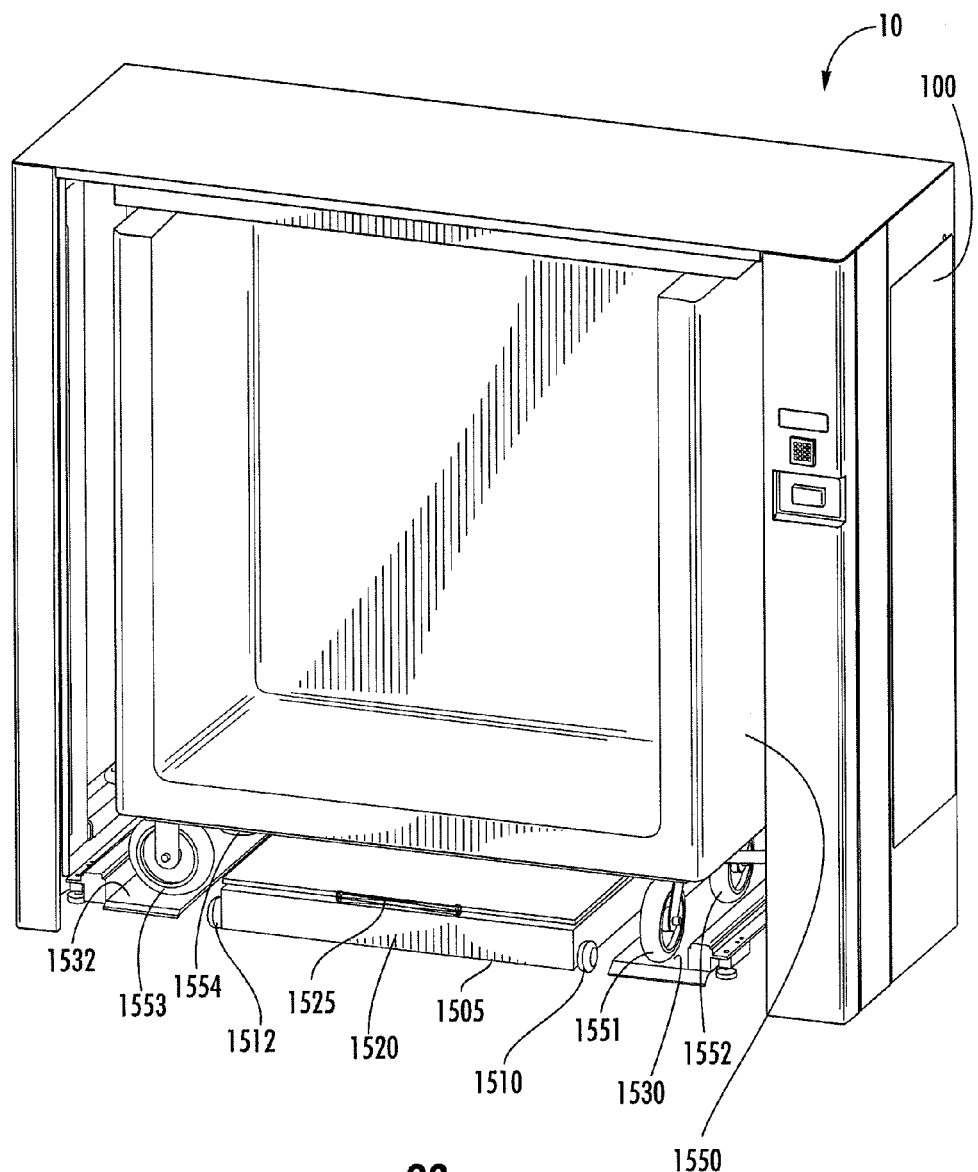
FIG. 28 is a front perspective view of the wheeled storage cartridge jack of FIG. 26 in which the wheeled storage cartridge jack is in a retracted position adjacent a storage cartridge. In this figure, the wheeled storage cartridge jack has been positioned on a dispenser's scale by the storage cartridge jack.

FIGS. 26-28 show yet another embodiment of the invention that may be used to facilitate the movement of a storage cartridge 1550 (e.g., a hospital cart having both fixed and swiveled wheels) into the interior of a dispenser 10. As may be understood from these figures, this embodiment includes a wheeled jack 1500 that is adapted to: (1) lift the storage cartridge 1550 and; (2) while supporting the storage cartridge 1550 in an elevated position, facilitate the rolling movement of the storage cartridge 1550 into the dispenser's housing 100.

As may be understood from FIG. 26, in a particular embodiment of the invention, the wheeled jack 1500 includes a base portion 1505 that is mounted on one or more rolling mechanisms (e.g., wheels 1510, 1511, 1512) so that the wheeled jack 1500 may be selectively rolled adjacent a support surface (e.g., a floor supporting the wheeled jack 1500). For example, in the embodiment of FIG. 26, the wheeled jack 1500 comprises: (1) a substantially rectangular base portion 1505; (2) a first pair of wheels 1510, 1511 that are mounted adjacent a first lateral side of the rectangular base portion 1505 (e.g., adjacent the respective ends of the base portion's first lateral side); and (3) a second pair of wheels 1512 (second wheel not shown) that are mounted adjacent a second lateral side of the rectangular base portion 1505 (e.g., adjacent the respective ends of the base portion's second lateral side).

In particular embodiments, the wheeled jack 1500 further includes a support member 1520 (which may be, for example, in the form of a substantially rectangular, substantially horizontal plate) that is adapted for selectively engaging a storage cartridge 1550 and for exerting support forces on the storage cartridge 1550 that are sufficient to lift the storage cartridge 1550 off the ground and to then maintain the storage cartridge 1550 in an elevated position.

In various embodiments, the wheeled jack 1500 further includes a lifting mechanism 1525 for selectively moving the support member 1520 vertically (e.g., upwardly and/or downwardly) relative to a support surface supporting the wheeled jack 1500. In various embodiments, this lifting mechanism may include, for example: (1) a scissors lift (as shown in FIG. 26); (2) one or more pneumatic cylinders; (3) one or more screw mechanisms; (4) one or more hydraulic cylinders; and/or (5) any other suitable lifting mechanism.

In particular embodiments, to use the wheeled jack 1500 to insert a storage cartridge 1550 into a dispenser 10, a user first positions the storage cartridge 200 so that the storage cartridge's rear surface is generally parallel to the front surface of the dispenser 10 and so that the storage cartridge 200 is generally laterally aligned with the dispenser's access opening (as shown in FIG. 27). The user then positions the wheeled jack 1500 underneath the storage cartridge 1550 so that: (1) the wheeled jack 1500 is positioned laterally between the storage cartridge's fixed wheels 1553 and swiveled wheels 1551, 1552; (2) the wheeled jack's wheels (which may be, for example, fixed wheels) are positioned to guide the wheeled jack 1500 into the dispenser's interior (e.g., along a path that is substantially perpendicular to the dispenser's front surface); and (3) the wheeled jack's support member 1520 is spaced apart from (e.g., the bottom surface of) the storage cartridge 1550.

Next, the user activates the wheeled jack's lifting mechanism 1525 to move in an upward direction so that the lifting mechanism 1525 moves the wheeled jack's support member 1520 substantially vertically upwardly until the support member 1520: (1) engages the bottom surface of the storage cartridge 1550; and (2) after engaging the bottom surface of the storage cartridge 1550, lifts the storage cartridge 1550 off the ground and into an elevated position as shown in FIG. 27. While the storage cartridge 1550 is in this elevated position, the user then rolls the wheeled jack 1500 toward and into the dispenser's interior until the storage cartridge's wheels are positioned on the wheel support portions 1530, 1532 of the dispenser's scale. (For example, until: (1) the storage cartridge's fixed wheels 1553, 1554 are positioned on the scale's first wheel support 1532; and (2) the storage cartridge's swiveled wheels 1551, 1552 are positioned on the scale's second wheel support 1530.)

Finally, the user activates the wheeled jack's lifting mechanism 1525 to move in a downward direction until the storage cartridge 1550 is at least substantially supported by (e.g., entirely supported by) the dispenser's scale. In particular embodiments of the invention, in this position, which is shown in FIG. 28: (1) the storage cartridge's fixed wheels 1553, 1554 are positioned on and supported by the scale's first wheel support 1532; and (2) the storage cartridge's swiveled wheels 1551, 1552 are positioned on and supported by the scale's second wheel support 1530. The dispenser 10 may then be used to dispense items from the storage cartridge 1550 as described above (e.g., with the dispenser's scale at least substantially continuously monitoring the storage cartridge's weight in real time). To remove the storage cartridge 1550 from the interior of the dispenser, the user may simply reverse the steps described above.

Figure 29:
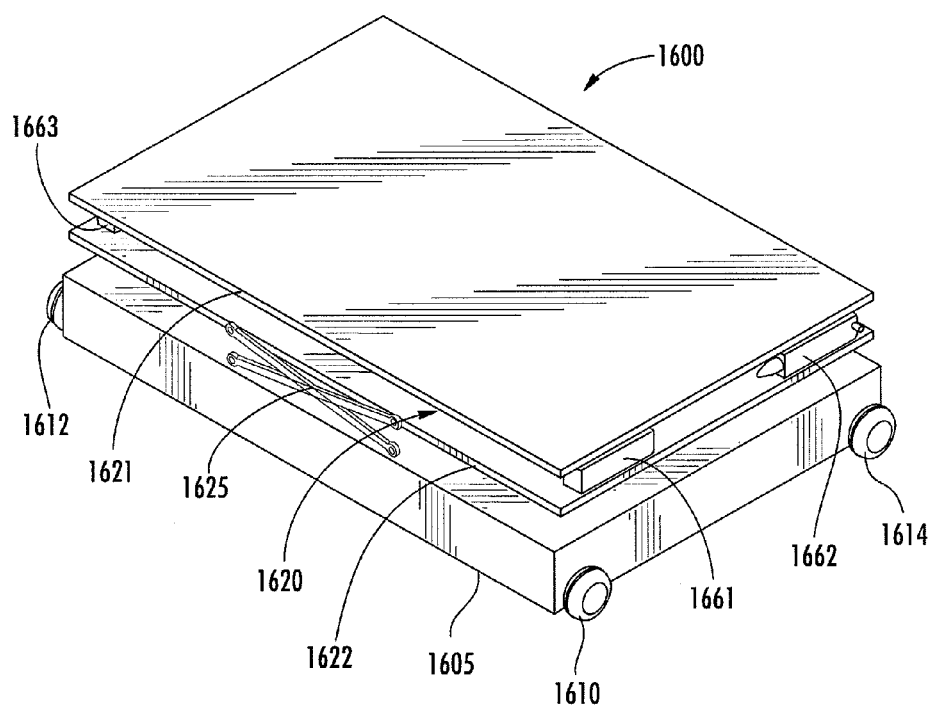
FIG. 29 is a perspective view of an alternative embodiment of a wheeled storage cartridge jack according to various embodiments of the invention.
Figure 30:
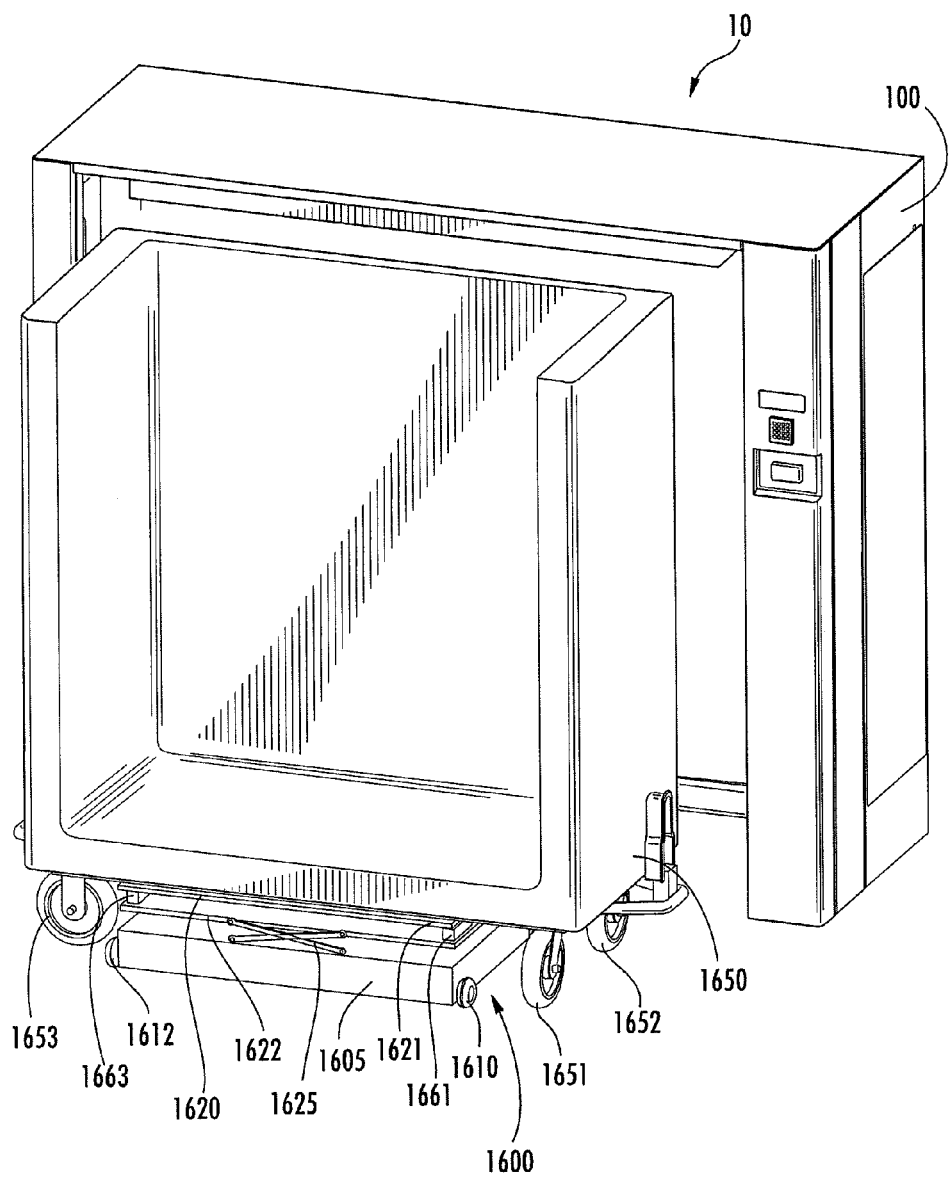
FIG. 30 is a perspective view of the wheeled storage cartridge jack of FIG. 29 in which the cartridge jack is shown maintaining a storage cartridge in an elevated position and the storage cartridge is positioned outside of the dispenser's housing.
Figure 31:
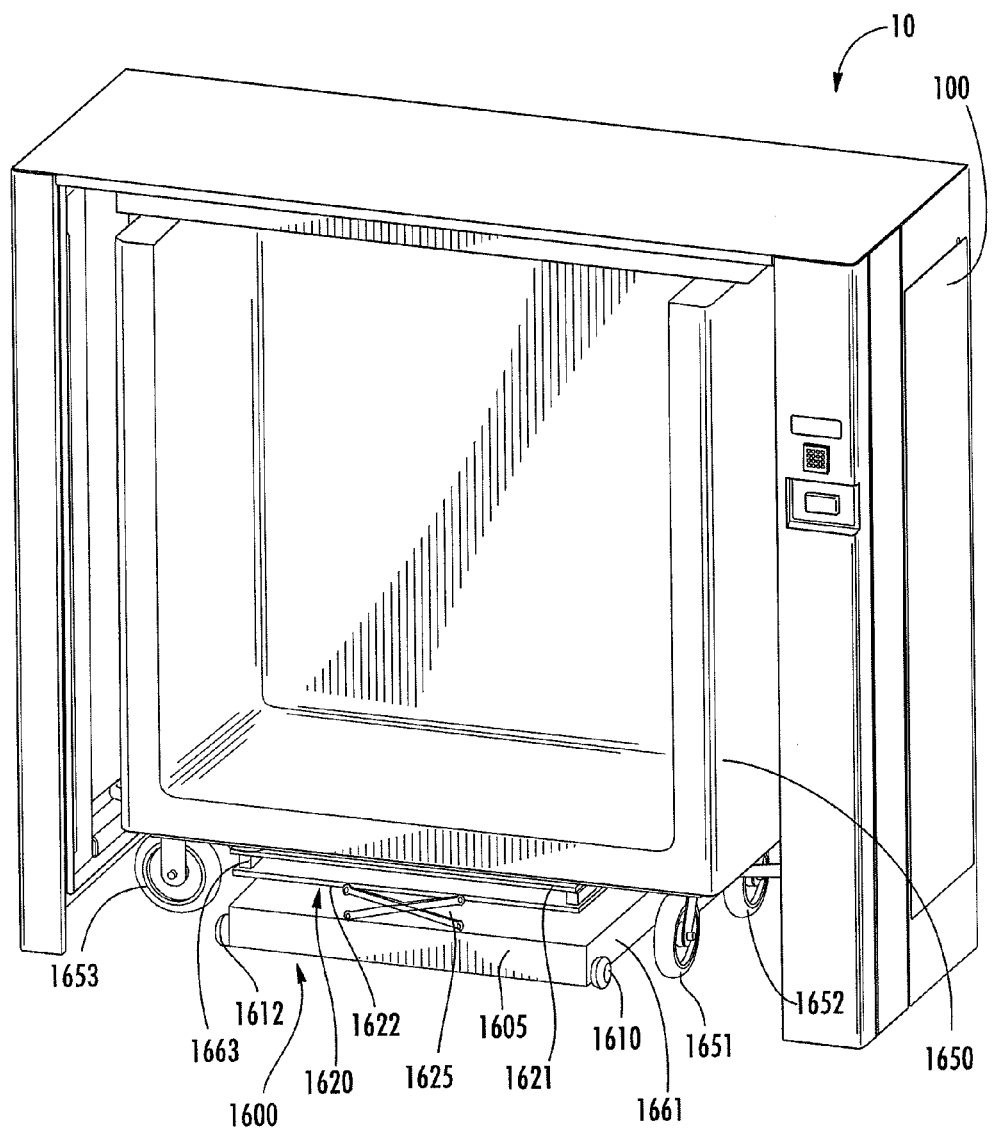
FIG. 31 is a perspective view of the wheeled storage cartridge jack of FIG. 29 in which the cartridge jack is shown maintaining a storage cartridge in an elevated position and the storage cartridge is positioned within the dispenser's housing.

FIGS. 29-31 depict an alternative version of a "wheeled jack" embodiment of the invention. In this embodiment, a scale is integrated into the wheeled jack 1600 and used to weigh the storage cartridge 1650 when the storage cartridge 1650 is supported by the wheeled jack 1600. For example, in the embodiment shown in FIGS. 29-31, a scale is integrated into the wheeled jack's support member 1620. More particularly, in this embodiment, the support member 1620 includes two substantially horizontal plates 1621, 1622 that are spaced vertically apart from each other. These plates 1621, 1622 are separated by one or more weight measurement devices 1661-1663 that are positioned, respectively, adjacent opposite lateral ends of the support member 1620.

In particular embodiments, to use the wheeled jack 1600 to insert a storage cartridge 1650 into a dispenser 10, a user first positions the storage cartridge 1650 so that its rear surface is generally parallel to the front surface of the dispenser 10 and so that the storage cartridge 1650 is generally laterally aligned with the dispenser's access opening. The user then positions the wheeled jack 1600 underneath the storage cartridge 1650 so that: (1) the wheeled jack 1600 is positioned between the storage cartridge's fixed wheels 1653 and swiveled wheels 1651, 1652; (2) the wheeled jack's wheels (1610, 1612, 1614) (which may be, for example, fixed wheels) are positioned to guide the wheeled jack 1600 into the dispenser's interior (e.g., along a path that is substantially perpendicular to the dispenser's front surface); and (3) the wheeled jack's support member 1620 is spaced apart from (e.g., the bottom surface of) the storage cartridge 1650.

Next, the user activates the wheeled jack's lifting mechanism 1625 to move in an upward direction so that the lifting mechanism 1625 moves the wheeled jack's support member 1620 substantially vertically upwardly until the support member 1620: (1) engages the bottom of the storage cartridge 1650; and (2) after engaging the bottom surface of the storage cartridge 1650, lifts the storage cartridge 1650 off the ground and into an elevated position as shown in FIG. 30. While the storage cartridge 1650 is in this elevated position, the user then rolls the wheeled jack 1600 towards and into the dispenser's interior until the storage cartridge 1650 is positioned entirely within the dispenser's interior. In various embodiments, the wheeled jack 1600 maintains the storage cartridge 1650 in an elevated position (e.g., so that the wheeled jack's scales can continuously measure the weight of the storage cartridge 1650) while the dispenser is in operation as described above.

Exemplary Operation of Dispenser's Display

In various embodiments of the invention, the dispenser 10 is adapted to display information to users, for example, via a display screen located on or adjacent the dispenser 10. This information may be provided, for example, via a computer that is internal or external to the dispenser 10. In particular embodiments, the information may reflect data derived (either directly or indirectly) from information measured by the dispenser's scale.

For example, in various embodiments, the dispenser 10 may be adapted so that, in response to a user removing items (e.g., hospital linens) from the dispenser 10, the dispenser 10 displays the weight of the items removed from the dispenser 10. This information may be displayed, for example, immediately upon the user removing the items from the dispenser 10, or after the dispenser's access door 112 is closed. As an example, in particular embodiments, in response to a user removing six pounds of hospital linens from a dispenser 10, after the dispenser's access door 112 closes, the dispenser 10 will display an indication to the user (e.g., on a display screen associated with the dispenser 10), that the user removed six pounds of hospital linens from the dispenser 10. This information may help the user manage their overall use of linens.

As another example, the dispenser may be configured to display the average weight of particular items that other, similar users have been using under similar circumstances. For example, in the context of a particular nurse removing hospital linens from the dispenser 10, the dispenser 10 may be configured to display (e.g., simultaneously display): (1) the weight of linen that the particular nurse has been using; and (2) the weight of linen that other nurses in the same hospital have been using under similar circumstances. This information may include, for example, the weight of linen that the nurse and other nurses have been using: (1) per hour; (2) per shift; (3) per day; (4) per patient; (5) per patient day; and/or (6) any other suitable unit of time. This may serve as an ongoing reminder to hospital staff to keep their linen usage within proper limits.

In particular embodiments of the invention, the dispenser 10 may be configured to display (e.g., simultaneously display along with one or more of the items of information referenced above), the cost associated with using the linens that the user has removed from the dispenser during the current dispenser transaction, and/or during previous dispenser transactions. In particular embodiments, this cost may include a cost that a laundry facility would charge for laundering the linens.

Exemplary Reporting Features

In particular embodiments, the dispenser and/or computer systems associated with the dispenser may be adapted to generate one or more reports that reflect data obtained from the dispenser (e.g., the dispenser's scale). In various embodiments, such reports may include: (1) one or more reports that indicate item usage (e.g., linen usage) of each user within a particular department; and/or (2) one or more reports that specifically identify users that are using excessive amounts of a particular item (e.g., hospital linens) relative to their peers.

Such reports may be helpful in identifying users who are not complying with predetermined item usage guidelines.

In further embodiments, the reports may indicate the usage of items (e.g., linen) by each user within a particular department. Such reports may be used to bill each particular department for the items (e.g., linen) removed by the members of that particular department. This may, for example, serve to make a particular department manager directly responsible for the use of items (e.g., linen) within their department.

Description of Wheel Guide Apparatus

Figure 32:
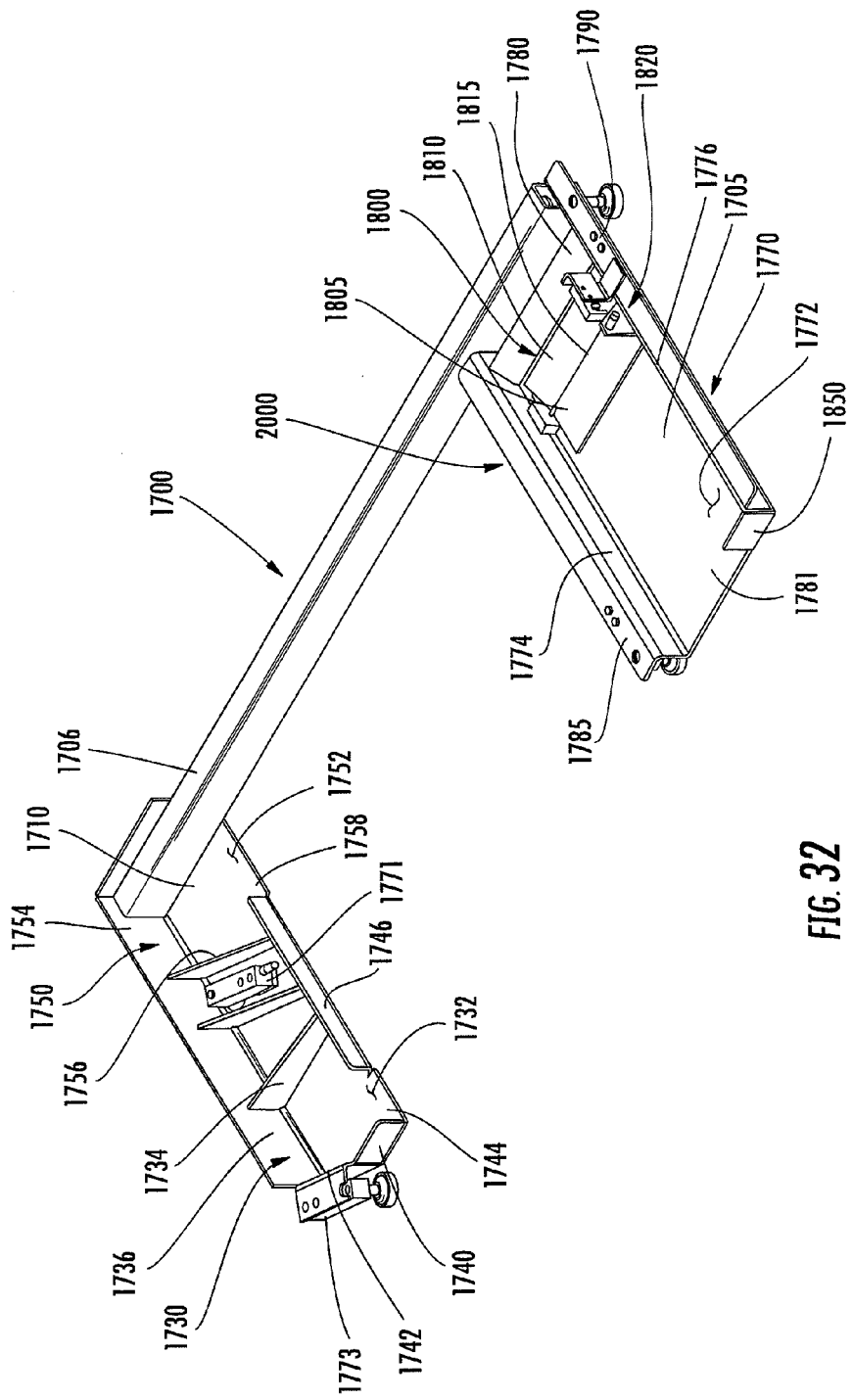
FIG. 32 is a perspective view of a wheel guide apparatus according to a particular embodiment of the invention.

In various embodiments, a wheel guide apparatus is used to guide a cart into a desired position (e.g., a position on a scale) within a dispenser or other enclosure. A wheel guide apparatus 1700 according to a particular embodiment of the invention is shown in FIG. 32. As may be understood from this figure, in this embodiment, the wheel guide apparatus 1700 includes a first wheel support 1705, and a second wheel support 1710 that is spaced apart from the first wheel support 1705. In the embodiment shown in FIG. 32, the first wheel support 1705 is connected to the second wheel support 1710 by a support bar 1706 that extends between the respective rear portions of the first and second wheel supports 1705, 1710.

In particular embodiments of the invention, the first and second wheel supports 1705, 1710 are each supported by one or more load cells 1771, 1773, 1785, 1790. For example, in the embodiment shown in FIG. 32, the second wheel support 1710 is supported by first and second load cells 1771, 1773 that are adapted to cooperate to weigh items that are supported by the second wheel support 1710. Similarly, in the embodiment shown in FIG. 32, the first wheel support 1705 is supported by third and fourth load cells 1785, 1790 that are adapted to cooperate to weigh items that are supported by the first wheel support 1705. Accordingly, in the embodiment shown in FIG. 32, the first through fourth load cells 1771, 1773, 1785, 1790 cooperate to weigh items that are supported by the first and second wheel supports 1705, 1710.

In a particular embodiment, the second wheel support 1710 includes a first front wheel enclosure 1730 adjacent an outer end of the second wheel support 1710. For example, in the embodiment shown in FIG. 32, the second wheel support 1710 includes a first wheel enclosure 1730 that includes a plurality of walls 1734, 1736, 1740, 1742, 1746 that cooperate to form a substantially enclosed area. This substantially enclosed area preferably includes a floor portion 1732 that, for example, may extend between the base portions of the respective walls 1734, 1736, 1740, 1742, 1746 that define the first wheel enclosure 1730.

In the embodiment shown in FIG. 32, the first front wheel enclosure 1730 includes a gap 1744 between at least two of the walls 1734, 1736, 1740, 1742, 1746 that define the first front wheel enclosure 1730. The width of this gap 1744 is preferably longer than the width of an outer front wheel of a cart with which the wheel guide apparatus 1700 is configured to be used. For example, in particular embodiments, the gap 1744 is greater than about 25% longer than the width of an outer front wheel of a cart with which the wheel guide apparatus 1700 is configured to be used. In particular embodiments, this allows the outer front wheel of the cart to selectively pass through the gap 1744 and onto the first front wheel enclosure's floor portion 1732 so that the wheel is: (1) supported by this floor portion 1732; and (2) substantially surrounded by the walls 1734, 1736, 1740, 1742, 1746 that define the first front wheel enclosure 1730.

In particular embodiments, at least one, and preferably all, of the walls 1734, 1736, 1740, 1742, 1746 that define the first front wheel enclosure 1730 are at least about 25% of the height of an outer front wheel of a cart with which the wheel guide apparatus 1700 is configured to be used. In particular embodiments, the first front wheel enclosure's walls 1734, 1736, 1740, 1742, 1746 cooperate to restrict (and preferably prevent) the rolling movement of a cart wheel (e.g., the outer front wheel of a cart) from: (1) a first position in which the first front wheel enclosure's walls 1734, 1736, 1740, 1742, 1746 substantially surround the wheel; to (2) a second position in which the first front wheel enclosure's walls 1734, 1736, 1740, 1742, 1746 do not substantially surround the wheel. In particular embodiments, the wheel guide apparatus 1700 is adapted to only allow a wheel to roll between these first and second positions by rolling through the gap 1744 defined by the first front wheel enclosure's walls 1734, 1736, 1740, 1742, 1746.

In a particular embodiment, the second wheel support 1710 includes a second front wheel enclosure 1750 adjacent an inner end of the second wheel support 1710. For example, in the embodiment shown in FIG. 32, the second wheel support 1710 includes a second wheel enclosure 1750 that includes a plurality of walls 1746, 1754, 1756, 1706 that cooperate to form a substantially enclosed area. This substantially enclosed area preferably includes a floor portion 1752 that, for example, may extend between the base portions of the respective walls 1746, 1754, 1756, 1706 that define the second front wheel enclosure 1750.

In the embodiment shown in FIG. 32, the second wheel enclosure 1750 includes a gap 1758 between at least two of the walls 1746, 1754, 1756, 1706 that define the second front wheel enclosure 1750. The width of this gap 1758 is preferably longer than the width of an inner front wheel of a cart with which the wheel guide apparatus 1700 is configured to be used. For example, in particular embodiments, the gap 1758 is at least 25% longer than the width of a wheel of a cart with which the wheel guide apparatus 1700 is configured to be used. In particular embodiments, this allows a wheel of the cart to selectively pass through the gap 1758 and onto the floor portion 1752 of the second front wheel enclosure 1750 so that the wheel is: (1) supported by this floor portion 1752; and (2) substantially surrounded by the walls 1746, 1754, 1756, 1706 that define the second front wheel enclosure 1750.

In particular embodiments, at least one, and preferably all, of the walls 1746, 1754, 1756, 1706 that define the second front wheel enclosure 1750 are at least about 25% of the height of an inner front wheel of a cart with which the wheel guide apparatus 1700 is configured to be used. In particular embodiments, the second front wheel enclosure's walls 1746, 1754, 1756, 1706 cooperate to restrict (and preferably prevent) the rolling movement of a cart wheel from: (1) a first position in which the second front wheel enclosure's walls 1746, 1754, 1756, 1706 substantially surround the wheel; to (2) a second position in which the second front wheel enclosure's walls 1746, 1754, 1756, 1706 do not substantially surround the wheel. In particular embodiments, the wheel guide apparatus 1700 is adapted to only allow a wheel to roll between these first and second positions by rolling through the gap 1758 between the second front wheel enclosure's walls 1746, 1754, 1756, 1706.

In various embodiments, the wheel guide apparatus 1700 further includes a rear wheel enclosure 1770. In the exemplary embodiment shown in FIG. 32, this rear wheel enclosure 1770 includes a first side wall 1774, and a second side wall 1776 that is spaced apart from, and positioned substantially parallel to, the first side wall 1774. Accordingly, the first and second side walls 1774, 1776 cooperate to define a path that may be traveled by one or more of the rear wheels (e.g., rear swivel wheels) of a cart with which the wheel guide apparatus 1700 is adapted to be used. The rear wheel enclosure 1770 may further include a floor surface 1772 that extends between the bottom edges of the first and second side walls 1774, 1776.

In the embodiment shown in FIG. 32, the rear wheel enclosure 1770 further includes a wheel stop 1780 that is adapted for stopping the inner rear wheel of a cart when the inner rear wheel of the cart is adjacent a desired target position (e.g., which may occur when the cart is in a desired "loaded" position adjacent the wheel guide apparatus 1700). As shown in FIG. 32, in various embodiments, the rear wheel enclosure 1770 further includes a wheel lock 1800 for maintaining a cart's inner rear wheel in this target position. In particular embodiments, this wheel lock 1800 is in substantially the same general physical configuration as the wheel locking mechanism shown in FIGS. 7A and 7B.

In various embodiments, the wheel lock 1800 includes a locking mechanism 1820 that is adapted for selectively maintaining the wheel lock 1800 in a locked orientation. It should be understood that any suitable wheel locking mechanism may be used for this purpose. For example, the locking mechanism 1820 shown in FIG. 32 includes a latching mechanism for selectively maintaining the wheel lock 1800 in a locked orientation. In the embodiment shown in FIG. 33, the locking mechanism 1820 is mechanically linked (e.g., via a bicycle brake cable 1825) to a foot pedal 1835 that may be used to selectively unlock the wheel lock 1800 (e.g., by selectively unlatching the latching mechanism).

In particular embodiments, the rear wheel enclosure's first and second side walls 1774, 1776 each define an outer end, and a gate 1850 is pivotably mounted adjacent the outer end of the second side wall 1776. In various embodiments, the gate 1850 is a one-way gate that is pivotably mounted so that it may swing outwardly away from the second side wall 1776, but not inwardly toward the second side wall 1776. In various embodiments, the gate 1850 is positioned so that, when the gate 1850 is in a neutral position: (1) the gate 1850 is substantially perpendicular to the second side wall 1776; and (2) the gate 1850 extends adjacent a threshold of the rear wheel enclosure 1770. In particular embodiments, the gate 1850 extends between about 10% and 20% of the distance between the outer ends of the first and second walls 1774, 1776.

Figure 38:
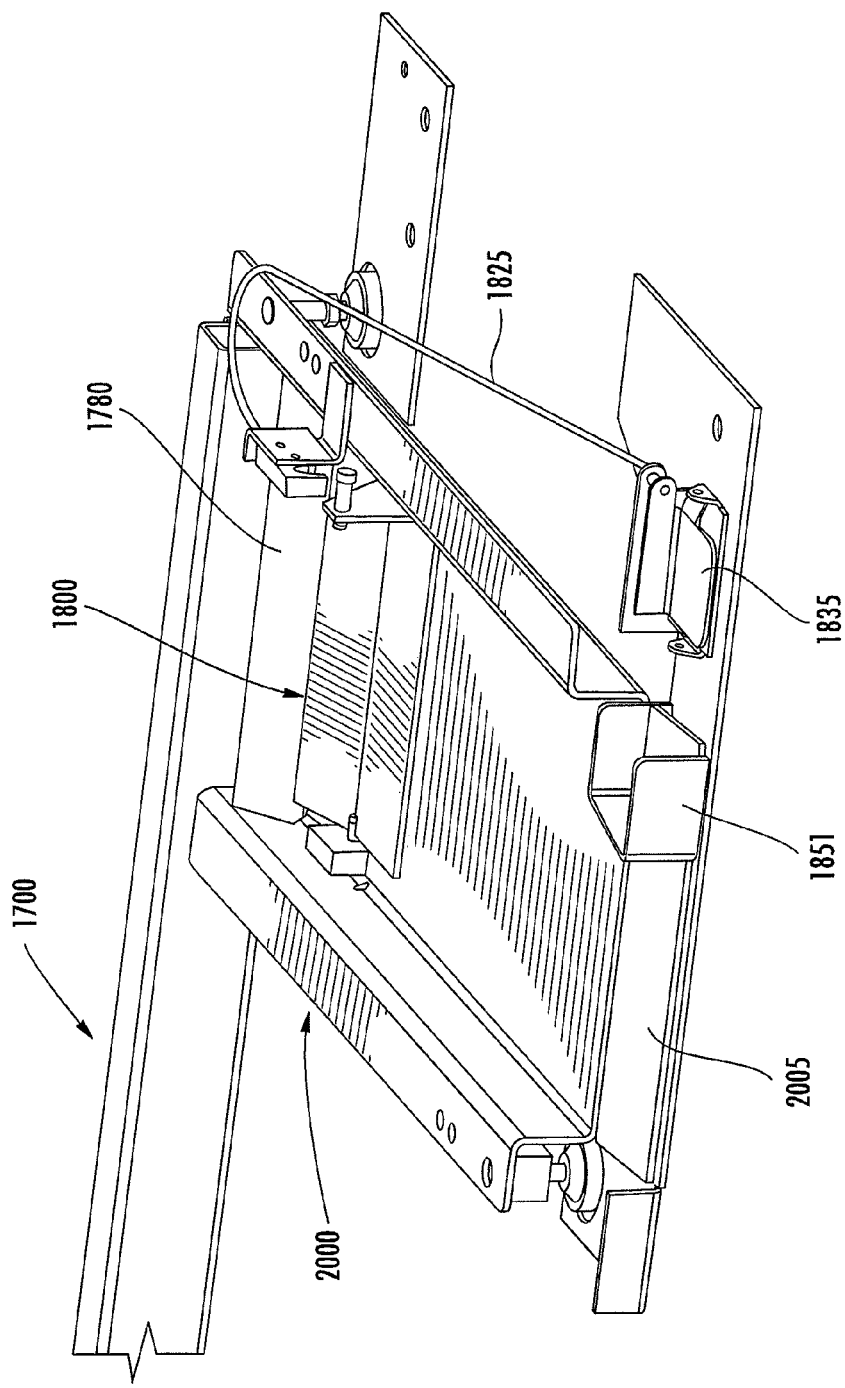
FIG. 38 is a perspective view of a rear wheel enclosure of a wheel guide apparatus according to a particular embodiment of the invention.

In various embodiments, rather than a gate, the wheel guide apparatus 1700 includes a fixed barrier 1851 (See FIG. 38) for obstructing the entry of a wheel into the rear wheel enclosure.

Ramps and Wheel Guides

Figure 33:
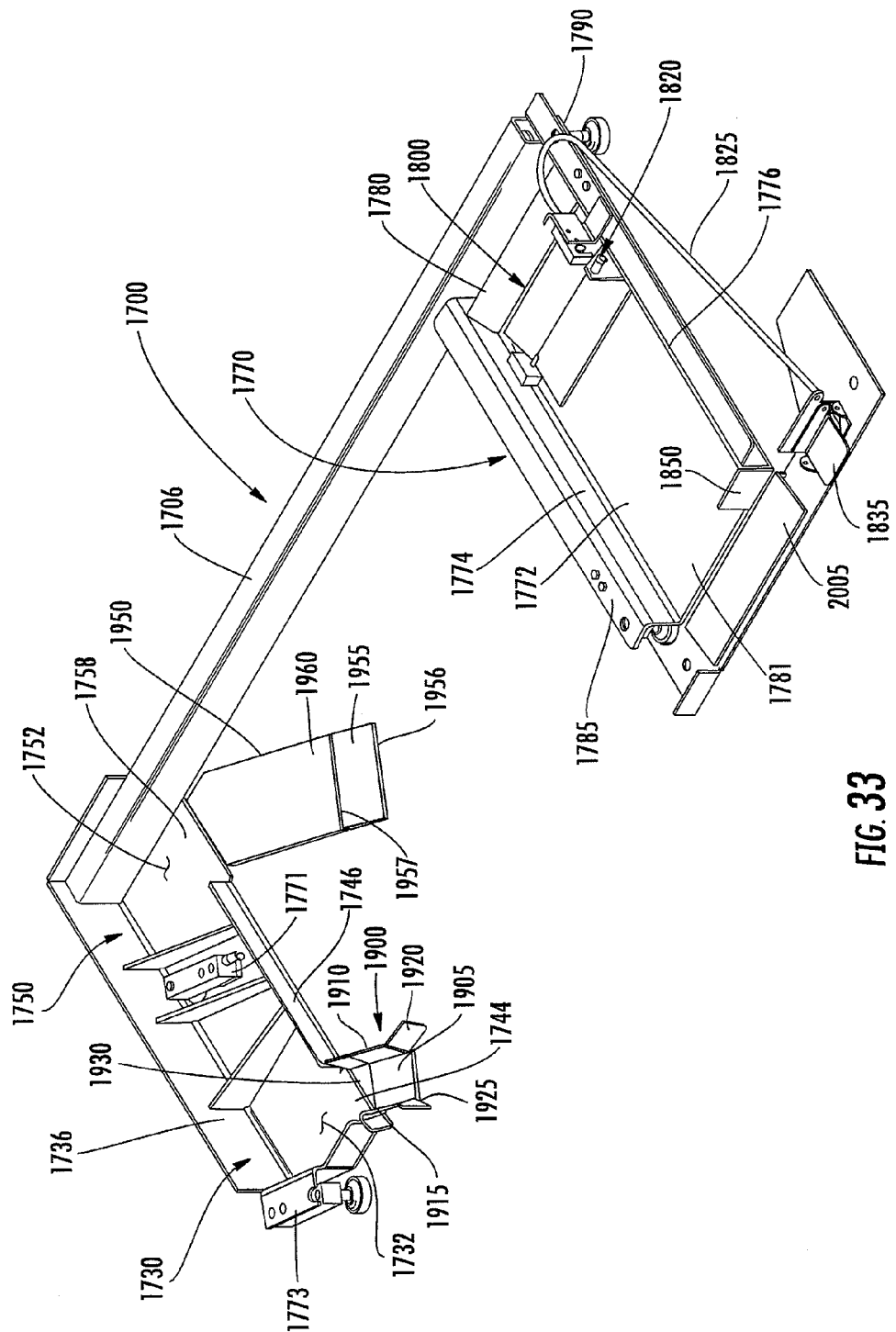
FIG. 33 is a perspective view of the wheel guide apparatus of FIG. 32 in which the wheel guide apparatus further includes various wheel guides and ramps, and a foot-pedal controlled mechanism for releasing the wheel guide apparatus' wheel lock.
Figure 34:
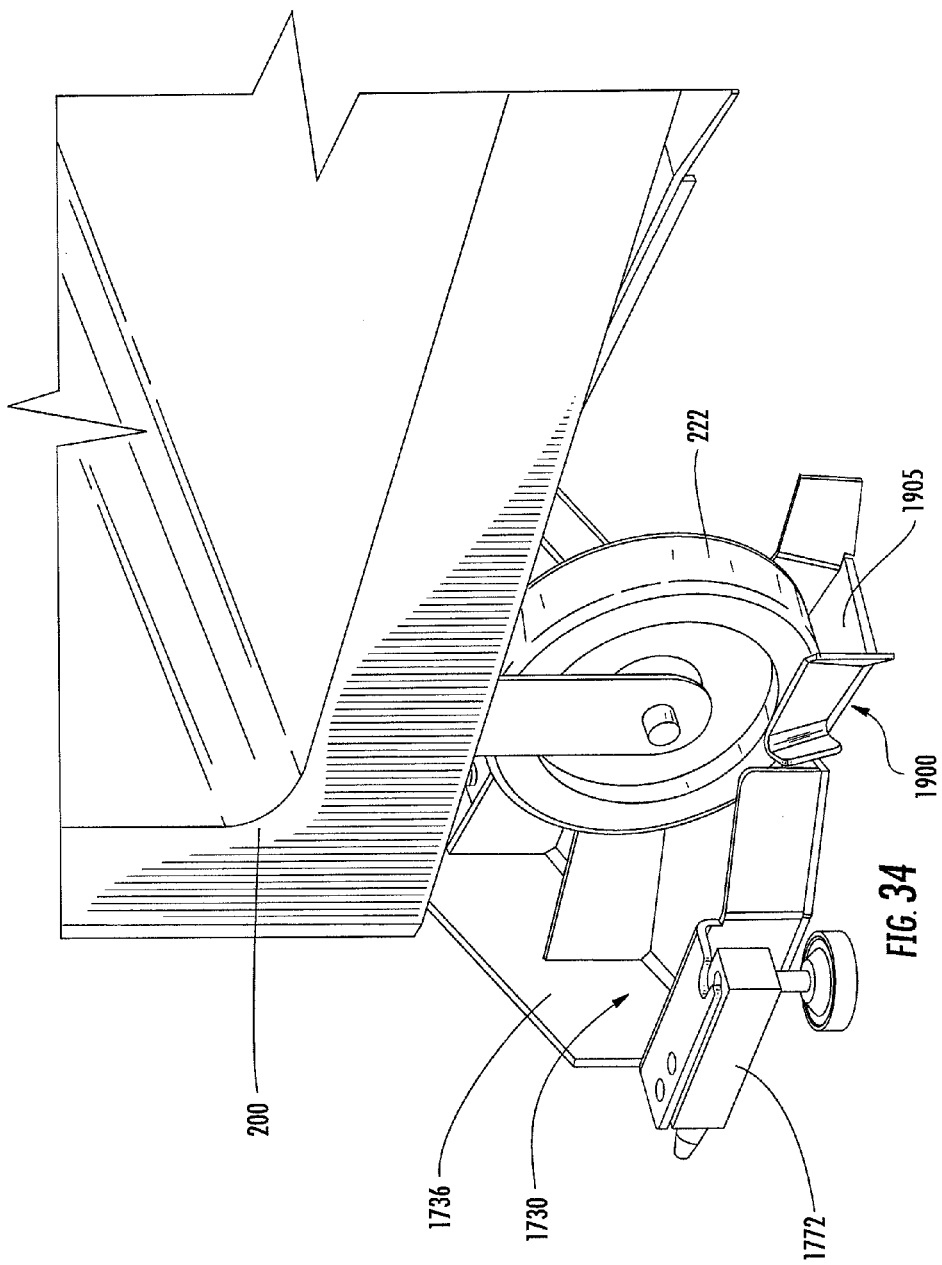
FIG. 34 is a perspective view of the first wheel enclosure of the wheel guide apparatus of FIG. 33.
Figure 35:
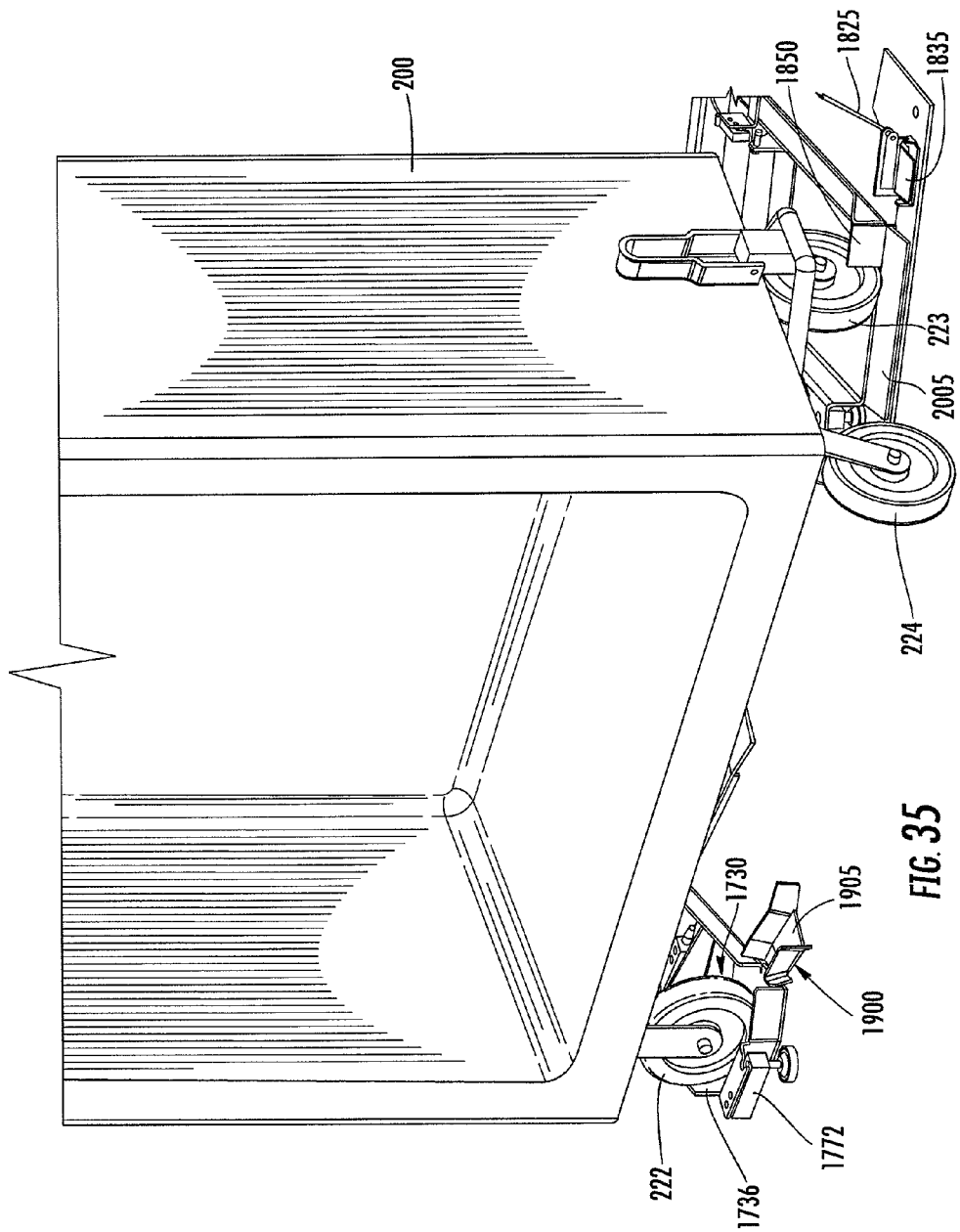
FIG. 35 is a perspective view of the wheel guide apparatus of FIG. 33 and a cart that is being positioned adjacent the wheel guide apparatus.
Figure 36:
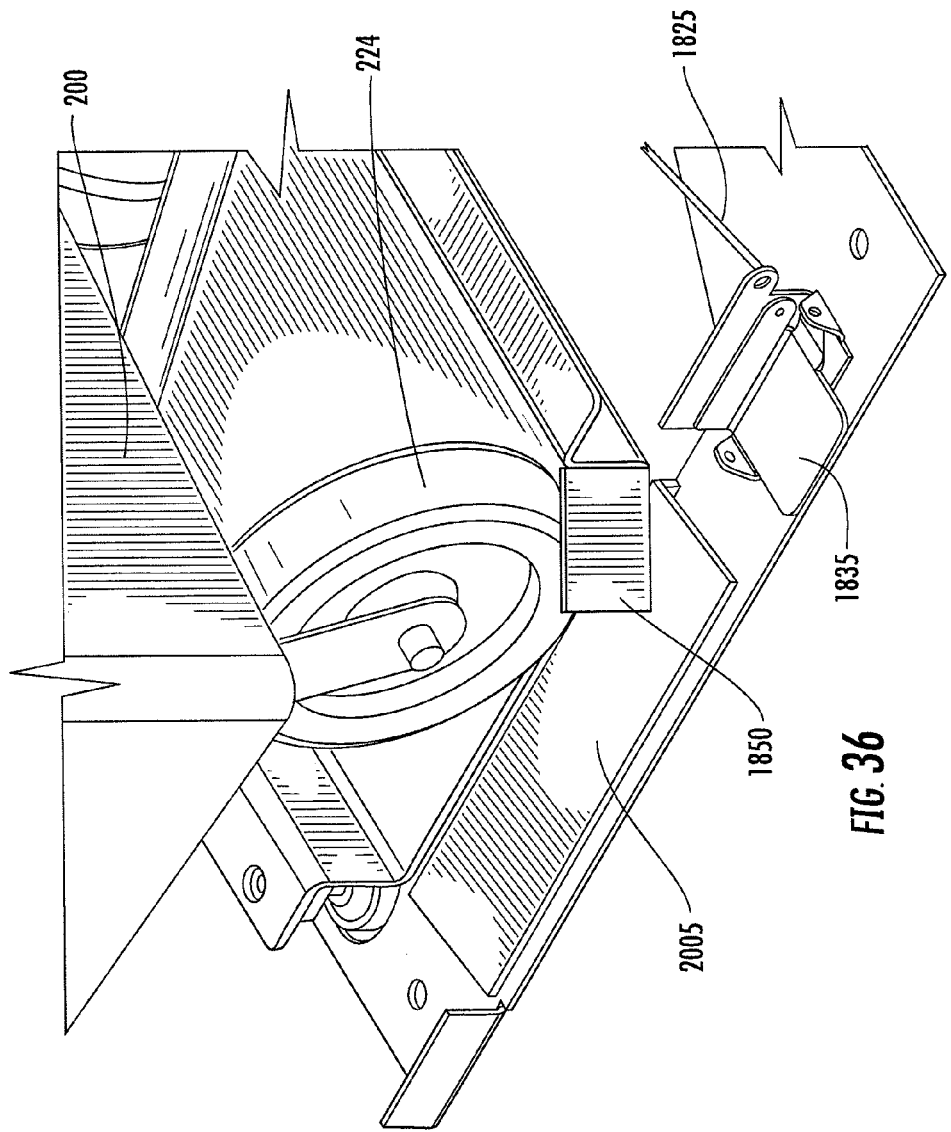
FIG. 36 is a perspective view of the front portion of the rear wheel enclosure of the wheel guide apparatus of FIG. 33.
Figure 37:
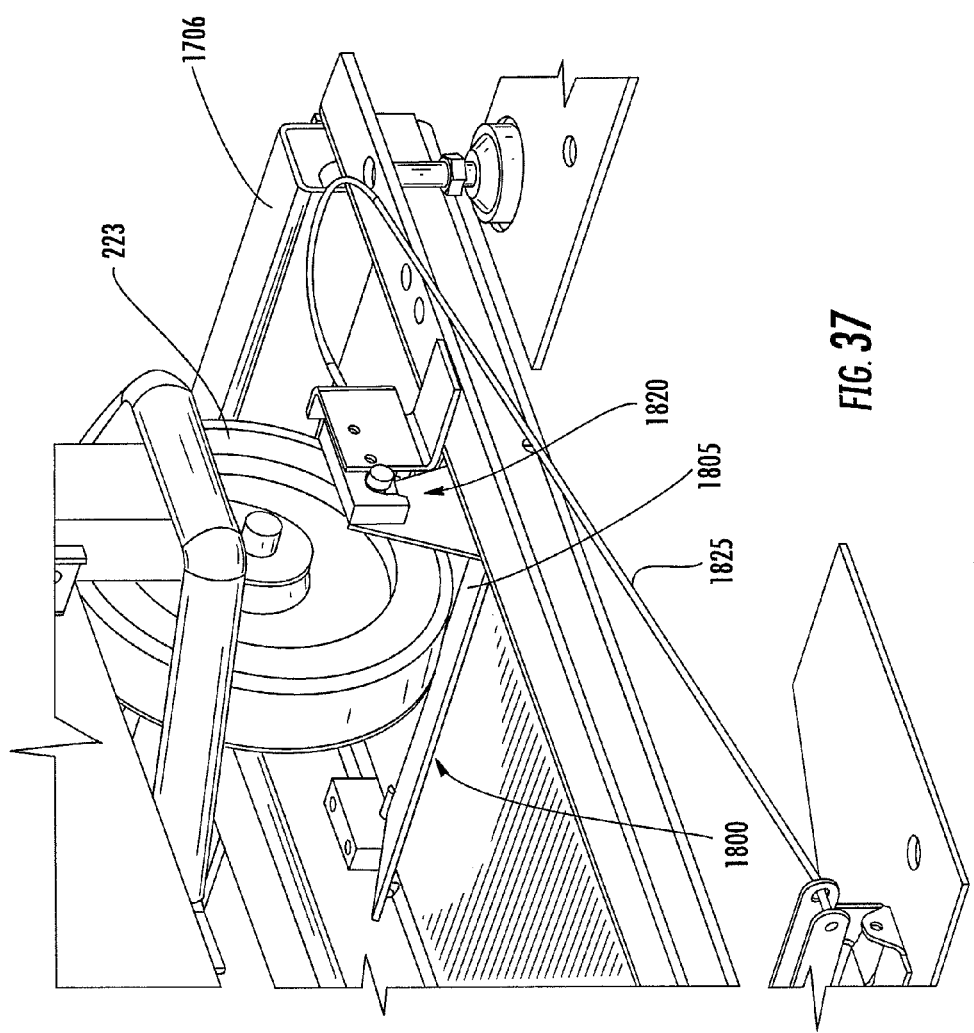
FIG. 37 is a perspective view of the wheel lock of the wheel guide apparatus of FIG. 33.

As shown in FIG. 33, in various embodiments of the invention, the wheel guide apparatus 1700 includes: (1) a first front wheel guide 1900 that is adapted for guiding the outer front wheel of a cart into the first front wheel enclosure 1730; (2) a second front wheel guide 1950 that is adapted for guiding the inner front wheel of the cart into the second wheel enclosure 1750; and (3) a rear wheel guide 2005 that is adapted for facilitating the movement of the cart's rear wheels into the rear wheel enclosure 1770. The first and second front wheel guides 1900, 1950, and the rear wheel guide 2005 are described in greater detail below.

First Front Wheel Guide

In particular embodiments of the invention, the first front wheel guide 1900 includes: (1) a first, substantially vertical side wall 1910; (2) a second, substantially vertical side wall 1915 that is spaced apart from, and substantially parallel to, the first side wall 1910; and (3) a floor portion 1905 that extends between the respective bottom edges of the first and second side walls 1910, 1915. In particular embodiments, such as the embodiment of FIG. 33, the floor portion 1905 is in the form of a ramp, and the first and second side walls 1910, 1915 are positioned adjacent opposite lateral sides of the ramp 1906 to prevent a cart wheel from rolling off of the ramp as it rolls from a lower end of the ramp to an upper end of the ramp.

In particular embodiments, the first side wall 1910 is spaced apart from the second side wall 1915 by a distance that is equal to between about 100% and about 150% (and preferably between about 110% and about 130%) of the width of an outer front wheel of a cart with which the wheel guide apparatus 1700 is adapted to be used. This may serve to prevent the wheel from moving laterally adjacent the first front wheel guide 1900 as the wheel moves up the ramp.

In particular embodiments, the upper end of the first front wheel guide 1900 is positioned adjacent the gap 1744 in the walls that define the first wheel enclosure 1730, and the lower end of the first front wheel guide 1900 is positioned adjacent a floor that is supporting the wheel guide apparatus 1700.

In various embodiments, such as the embodiment shown in FIG. 33, the first front wheel guide 1900 includes a staging platform 1930 (e.g., a substantially horizontal staging platform) that extends between the upper end of the ramp and the threshold of the gap 1744 in the walls that define the first wheel enclosure 1730. In particular embodiments, this staging platform 1930 is sufficiently wide to support a cart wheel (e.g., the outer front wheel of a cart) before the cart wheel rolls into the first front wheel enclosure 1730.

In particular embodiments, the first wheel guide includes an inner threshold that is adjacent an inner end of said first wheel guide (e.g., immediately adjacent the gap 1744 in the walls that define the first wheel enclosure 1730). In particular embodiments, this inner threshold is spaced apart from an inner lateral edge of the wheel guide apparatus' gate 1850 (See FIG. 33) by a distance that is about equal to, or less than, the distance between: (a) an axis of rotation of the cart's outer front wheel 222; and (b) a swivel axis of the cart's outer rear wheel 224 (and/or inner rear wheel 222). Similarly, in an embodiment such as the embodiment shown in FIG. 38, the first wheel guide includes an inner threshold that is adjacent an inner end of the first wheel guide (e.g., immediately adjacent the gap 1744 in the walls that define the first wheel enclosure 1730) that is spaced apart from an inner lateral edge of the wheel guide apparatus' wheel barrier 1851 by a distance that is about equal to, or less than, the distance between: (a) an axis of rotation of the cart's outer front wheel 222; and (b) a swivel axis of the cart's outer rear wheel 224 (and/or inner rear wheel 222).

Second Front Wheel Guide

In particular embodiments of the invention, the second front wheel guide 1950 includes: (1) a ramp 1955; and (2) a support platform 1960. In particular embodiments, such as the embodiment of FIG. 33, the second front wheel guide's ramp 1955 defines: (1) a lower edge 1956 that is disposed adjacent a support surface supporting the wheel guide apparatus 1700; and (2) an upper edge 1957 that is at about the same vertical height as the height of the floor 1752 of the second front wheel enclosure 1750. In particular embodiments, the support platform 1960 defines a substantially horizontal upper support surface that extends from at least about the upper edge 1957 of the ramp 1955 to at least about the threshold of the gap 1758 defined by the walls of the second front wheel enclosure 1750. In a particular embodiment, the central axis of the second front wheel guide 1950 forms an angle of between 30 and 60 degrees with the wheel guide apparatus' support bar 1706.

Rear Wheel Guide

In particular embodiments, such as the embodiment of FIGS. 32 and 33, the rear wheel guide comprises a ramp 2005 that defines: (1) a lower edge that is disposed adjacent a support surface supporting the wheel guide apparatus 1700; and (2) an upper edge that is disposed adjacent an outer edge of the rear wheel enclosure 1770 at about the same vertical height as the height of the floor 1772 of the rear wheel enclosure 1770. In particular embodiments, the ramp is about the same width as the opening 1781 in the rear wheel enclosure 1770.

Operation of the Wheel Guide Apparatus

An example of the general operation of the wheel guide apparatus 1700 of FIGS. 32-37 will now be described. This example pertains to the use of the wheel guide apparatus 1700 with a cart that has two at least substantially fixed (e.g., non-swiveled) front wheels, and two swiveled rear wheels. However, it should be understood that similar techniques may be used in conjunction with carts having other combinations and types of wheels (e.g., two front swiveled wheels, and two rear swiveled wheels).

Figure 39:
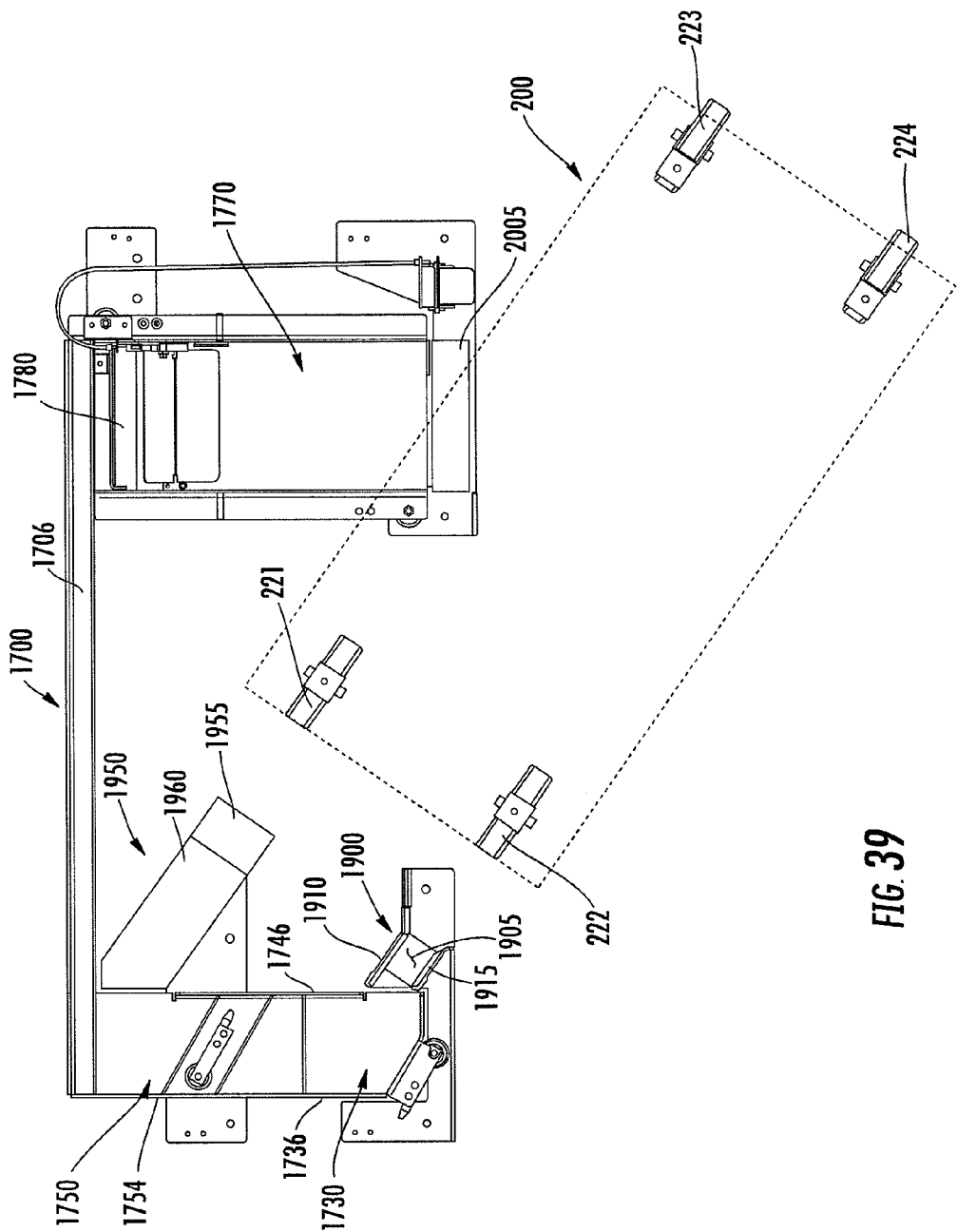
FIGS. 39-43 are top views of the wheel guide apparatus of FIG. 33. These figures show the process of using the wheel guide apparatus to position a cart onto a scale. For purposes of clarity, the cart's body is represented as a transparent dashed rectangle.
Figure 40:
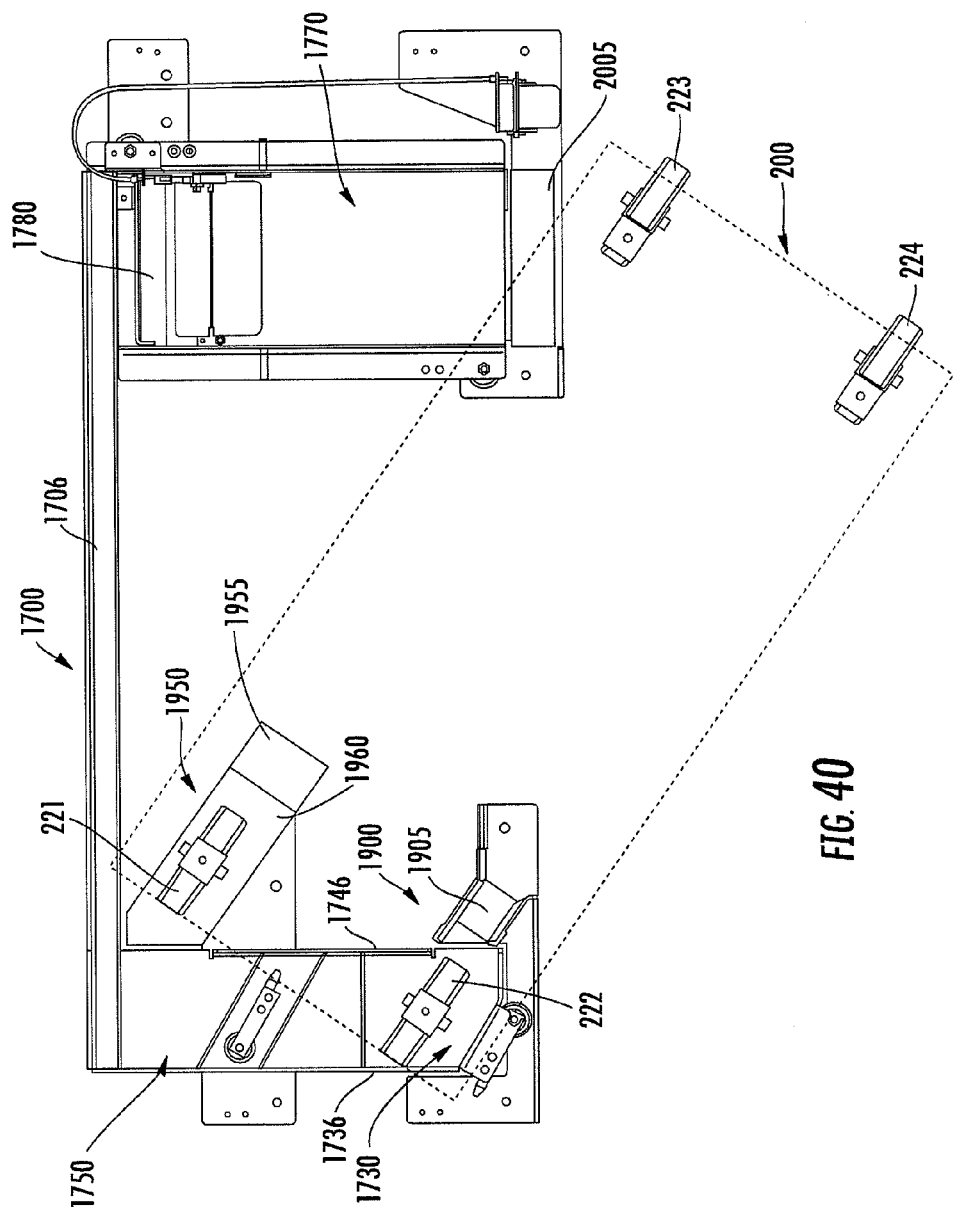

To use one embodiment of the invention, a user first positions the cart 200, as shown in FIG. 39, so that: (1) the cart's outer front (e.g., fixed) wheel 222 is in-line with the lower front edge of the first front wheel guide 1900 (e.g., so that the outer front wheel 222 is oriented to roll between the first wheel guide's first and second vertical walls 1910, 1915); and (2) the cart's inner front (e.g., fixed) wheel 221 is in-line with the lower front edge of the second wheel guide 1950 (e.g., so that the inner front wheel is oriented to roll onto the second wheel guide's ramp 1955). The user then pushes the cart 200 toward the first and second wheel enclosures 1730, 1750 so that, as shown in FIGS. 39 and 40: (1) the outer front wheel 222 rolls up the ramp defined by the first wheel guide's floor portion 1905; and (2) the inner front wheel 221 rolls up the second wheel guide's ramp 1955 and onto the second wheel guide's support platform 1960.

Figure 41:
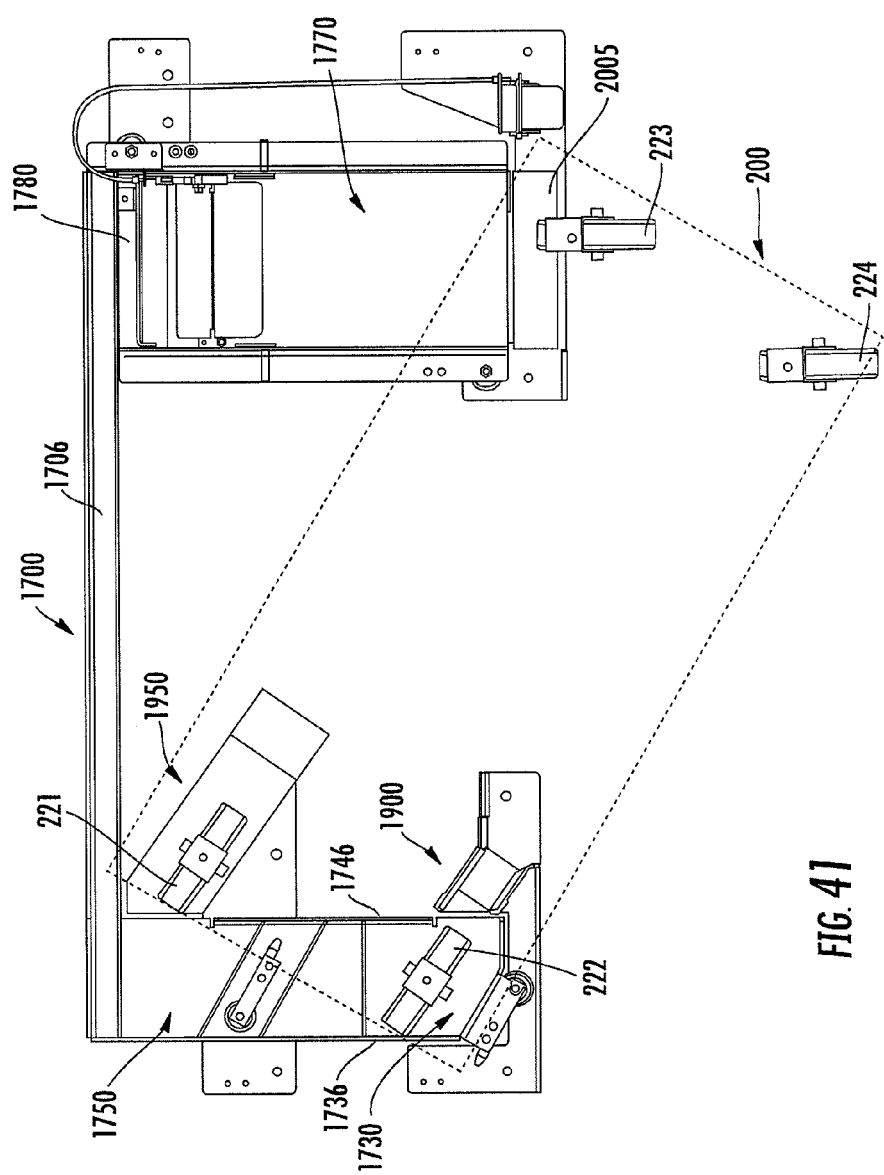

The user then continues pushing the cart 200 toward the first and second wheel enclosures 1730, 1750 until the outer front wheel 222 (e.g., an outer edge of the outer front wheel 222) engages a wheel stop portion of one of the walls (e.g., an outside wall 1736) that defines the first wheel enclosure 1730. For example, as shown in FIG. 41, the user continues pushing the cart 200 toward the first and second wheel enclosures 1730, 1750 until the outer edge of the outer front wheel 222 engages an inner surface of a first wall 1736 of the first wheel enclosure 1730 that is substantially parallel to, and offset from, a second wall 1746 of the first wheel enclosure 1730 by a distance of between about 100% and about 125% of the diameter of the outer front wheel 222. In a preferred embodiment, the first wall 1736 of the first wheel enclosure 1730 is offset from the second wall 1746 of the first wheel enclosure 1730 by a distance that is about equal to the diameter of the cart's outer front wheel 222.

Next, the user pushes the rear end of the cart 200 toward the rear wheel enclosure 1770, which causes the cart's rear wheels 223, 224 to rotate from: (1) a first orientation in which the cart's rear wheels 223, 224 are substantially parallel to the cart's front wheels 221, 222 (see FIG. 40); to (2) a second orientation in which the cart's rear wheels 223, 224 are oriented to travel onto the upper surface of the rear wheel enclosure 1770. In particular embodiments, when the cart's rear wheels 223, 224 are in this orientation, the cart's rear wheels 223, 224 are substantially perpendicular to the wheel guide apparatus' support bar 1706.

The user then continues pushing the rear end of the cart 200 toward the second wheel stop 1780, which, as shown in FIG. 41, causes: (1) the cart's rear wheels 223, 224 to move toward the lower front edge of the ramp defined by the floor of the rear wheel guide 2005; (2) the cart's outer front wheel 222 to rotate about a vertical axis that extends through the center of the cart's outer front wheel 222; and (3) the cart's inner front wheel 221 to move further along the second wheel guide 1950 toward the second wheel enclosure 1750.

Figure 42:
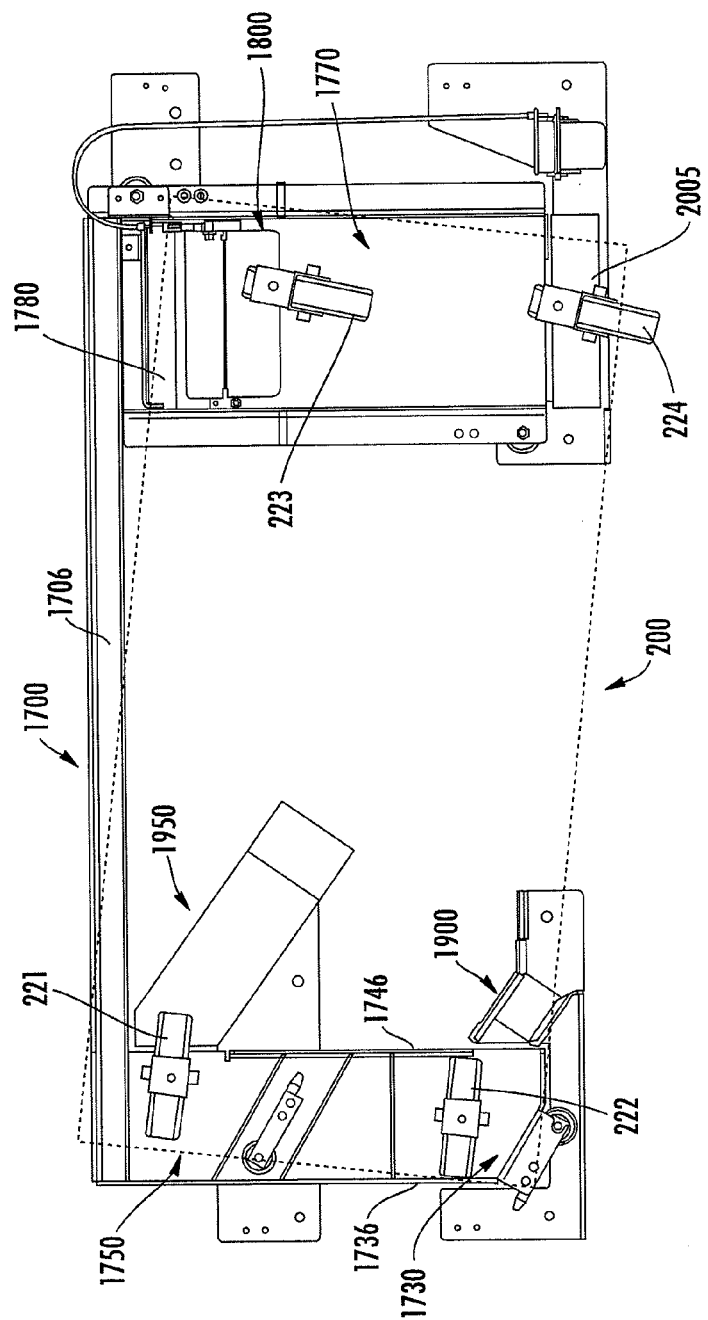

Next, the user continues pushing the rear end of the cart 200 toward the second wheel stop 1780, which, as shown in FIG. 42, causes: (1) the cart's inner rear wheel 223 to roll up the rear wheel guide 2005 and into the rear wheel enclosure 1770; and (2) the cart's inner front wheel 221 to roll into the second wheel enclosure 1750.

Figure 43:
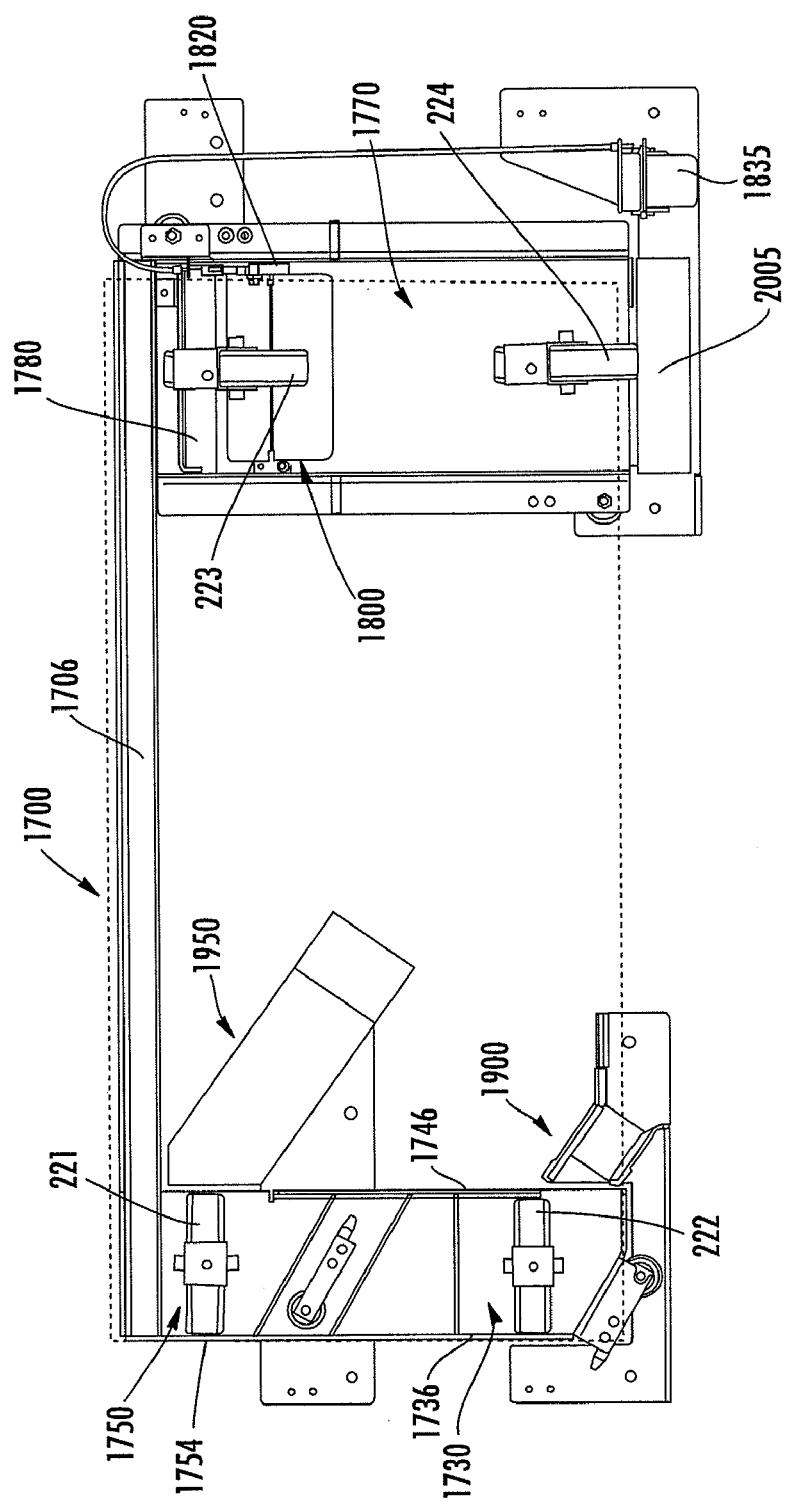

The user then continues pushing the rear end of the cart 200 toward the second wheel stop 1780, which, as shown in FIG. 43, causes: (1) the inner rear wheel 223 to: (a) roll onto the wheel lock 1800, causing the wheel locking mechanism 1820 to lock the wheel lock 1800 in place; and (b) engage the second wheel stop 1780 (in various embodiments, the second wheel stop 1780 and the wheel lock 1800 cooperate to lock the inner rear wheel 223 in a "locked" position adjacent the second wheel stop 1780); (2) the outer rear wheel 224 to move into the rear wheel enclosure 1770; (3) the inner front wheel 221 to engage a wall 1754 of the second wheel enclosure 1750; and (4) the outer front wheel 222 to rotate into a particular "locked" position in which it is disposed between: (a) the first wall 1736 of the first wheel enclosure 1730, and (b) the second wall 1746 of the first wheel enclosure 1730.

In particular embodiments, when the outer front wheel 222 is in this particular "locked" position, a first end of the outer front wheel 222 is disposed immediately adjacent the first wall 1736 of the first wheel enclosure 1730 and a second end of the outer front wheel 222 is disposed immediately adjacent the second wall 1746 of the first wheel enclosure 1730. In various embodiments, when the outer front wheel 222 is in this particular "locked" position: (1) the first end of the outer front wheel 222 engages the first wall 1736 of the first wheel enclosure 1730; and (2) the second end of the outer front wheel 222 engages the second wall 1746 of the first wheel enclosure 1730.

In various embodiments, when the outer front wheel 222 and the inner rear wheel 223 are in their respective "locked" positions noted above: (1) the outer front wheel 222 is prevented from moving laterally in relation to the wheel guide apparatus 1700 by the first wheel enclosure's first and second walls 1736, 1746; and (2) the inner rear wheel 223 is prevented from moving away from the second wheel stop 1780 by the wheel locking mechanism 1800. As a result, the cart 200 is in a "locked" orientation in which the cart 200 is locked in at least a substantially fixed (e.g., a fixed) position relative to the wheel guide apparatus 1700.

As an aside, in particular embodiments, when the outer front wheel 222 and the inner rear wheel 223 are in their respective "locked" positions noted above, the cart's front wheels 221, 222 are substantially perpendicular to (e.g., perpendicular to) the cart's rear wheels 223, 224.

To remove the cart 200 from the wheel guide, a user first unlocks the wheel lock 1800 by, for example, stepping on a brake release pedal 1835 adjacent the wheel guide apparatus 1700. After the wheel lock 1800 is unlocked, the user pulls the rear end of the cart 200 away from the second wheel stop 1780, which causes the cart's rear wheels 223, 224 to swivel about 180 degrees and then roll away from the second wheel stop 1780. This causes the cart 200 to rotate about a vertical axis that extends through the center of the cart's outer front wheel 222 until: (1) the cart's inner front wheel 221 is disposed on the second wheel guide 1950; and (2) the outer front wheel 222 is aligned to roll onto the first wheel guide 1900. The user then pulls the cart 200 away from the first and second wheel enclosures 1730, 1750, which causes: (1) the cart's outer front wheel 222 to roll down and off of the first wheel guide 1900; and (2) the cart's inner front wheel 221 to roll down and off of the second wheel guide 1950. The user may then roll the cart 200 away from the wheel guide apparatus 1700.

Cart Guide Using a Cart's Body to Guide the Cart's Wheels

In other embodiments of the invention, a cart guide may be used to guide a cart into a desired target position by engaging the cart's body and thereby guiding the movement of the cart's body as the cart rolls into a target position. In a particular embodiment, the cart guide first engages the body of the cart and restricts the movement of the cart to a particular, substantially linear, path. Next, while the cart guide continues to engage the cart, the user then moves the cart along the particular substantially linear path until: (1) the cart's outer front wheel—which is preferably a substantially fixed (e.g., fixed) wheel—is in a particular first staging position; (2) the cart's inner front wheel—which is also preferably a substantially fixed (e.g., fixed) wheel—is in a particular second staging position; and (3) the cart guide is in a "rotation only" mode, in which the cart guide restricts the movement of the cart to rotating about a particular axis of rotation. The user then rotates the cart about this particular axis of rotation until the cart is in the target position.

A cart guide 2200 according to a particular embodiment of the invention is shown in FIGS. 44-49. This cart guide 2200 includes a substantially U-Shaped cart bracket 2220 that is adapted for engaging and restricting the movement of a cart, a cart bracket support 2227 that is adapted for supporting the cart bracket 2220, and a cart bracket support guide 2207 for guiding the movement of the cart bracket 2220 along one or more particular paths. The structure and operation of these components is described in greater detail below.

Cart Bracket

Figure 44:
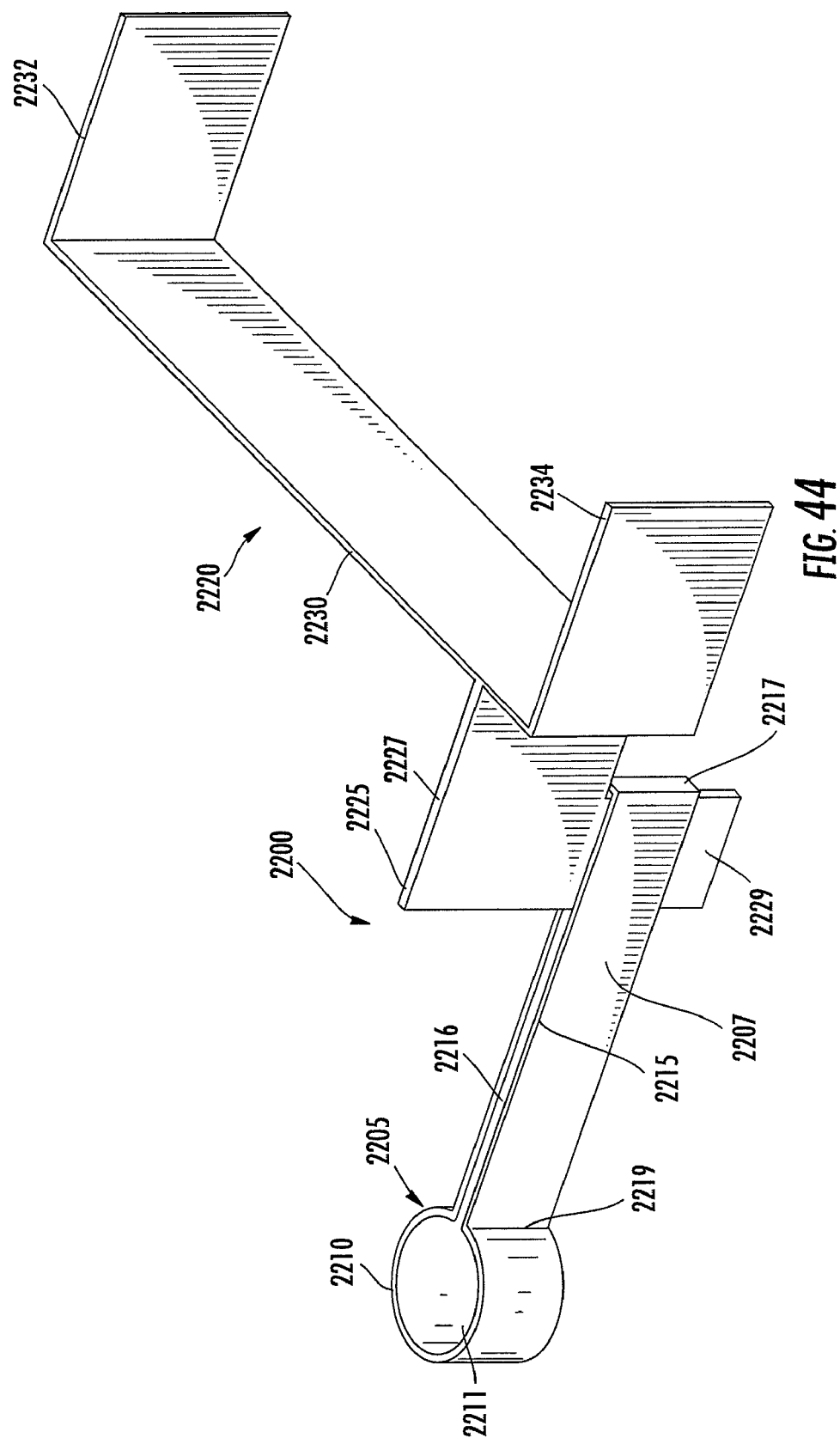
FIGS. 44-46 are perspective views of a cart guide according to particular embodiments of the invention.

As may be understood from FIG. 44, in particular embodiments, the cart bracket 2220 is substantially U-shaped and includes: (1) a substantially planar base portion 2230; (2) a substantially planar first side member 2232 that extends outwardly from a first end of the base portion 2230; and (3) a substantially planar second side member 2234 that extends outwardly from a second end of the base portion 2230. In particular embodiments, the first and second side members 2232, 2234 are substantially parallel to and spaced apart from one another adjacent the base portion 2230 by a distance that is preferably about equal to the width of the front portion of a cart with which the cart bracket 2220 is adapted to be used. In various embodiments, the first and second side members 2232, 2234 each extend outwardly from a front surface of the cart bracket's base portion 2230.

Cart Bracket Support

In the embodiment shown in FIG. 44, the cart guide 2200 includes a substantially planar, L-shaped cart bracket support 2227 for supporting the cart bracket 2220. In this embodiment, the cart bracket support 2227 comprises a substantially planar base portion 2225 that extends outwardly from a rear surface of the cart bracket's base portion 2230. In particular embodiments, the base portion 2225 of the cart bracket support 2227 is substantially perpendicular to the rear surface of the cart bracket's base portion 2230.

In various embodiments, such as the embodiment of FIG. 44, the cart bracket support 2227 further includes a substantially planar guide interface member 2229 that cooperates with the cart bracket support's base portion 2225 to form a substantially planar, substantially L-shaped structure. In various embodiments, the cart bracket support 2227 is attached adjacent a rear surface of the cart bracket's base portion 2230 so that the cart bracket support 2227 is in a substantially vertical orientation, and so that the guide interface member 2229 extends downwardly from a rear bottom edge of the cart bracket support's base portion 2225.

Cart Bracket Support Guide

An exemplary cart bracket support guide 2207 is shown in FIG. 44. In this embodiment, the cart bracket support guide 2207 includes: (1) an elongate linear guide portion 2215 that is adapted for guiding the cart bracket support 2227 (and also the cart bracket 2220) along a pre-determined linear path, and (2) a substantially circular rotational guide portion 2205 that is adapted for guiding the cart bracket support 2227 (and also the cart bracket 2220) along a substantially circular rotational path.

In the embodiment shown in FIG. 44, the elongate linear guide portion 2215 defines an elongate guide opening 2216 having a width that is about equal to the thickness of the cart bracket support's guide interface member 2229. Accordingly, the linear guide portion 2215 is adapted to receive the guide interface member 2229 within its guide opening 2216 so that the cart bracket support 2227 (and also the cart bracket 2220) are free to slide adjacent the linear guide portion along a pre-determined linear path defined by the guide opening 2216.

Figure 45:
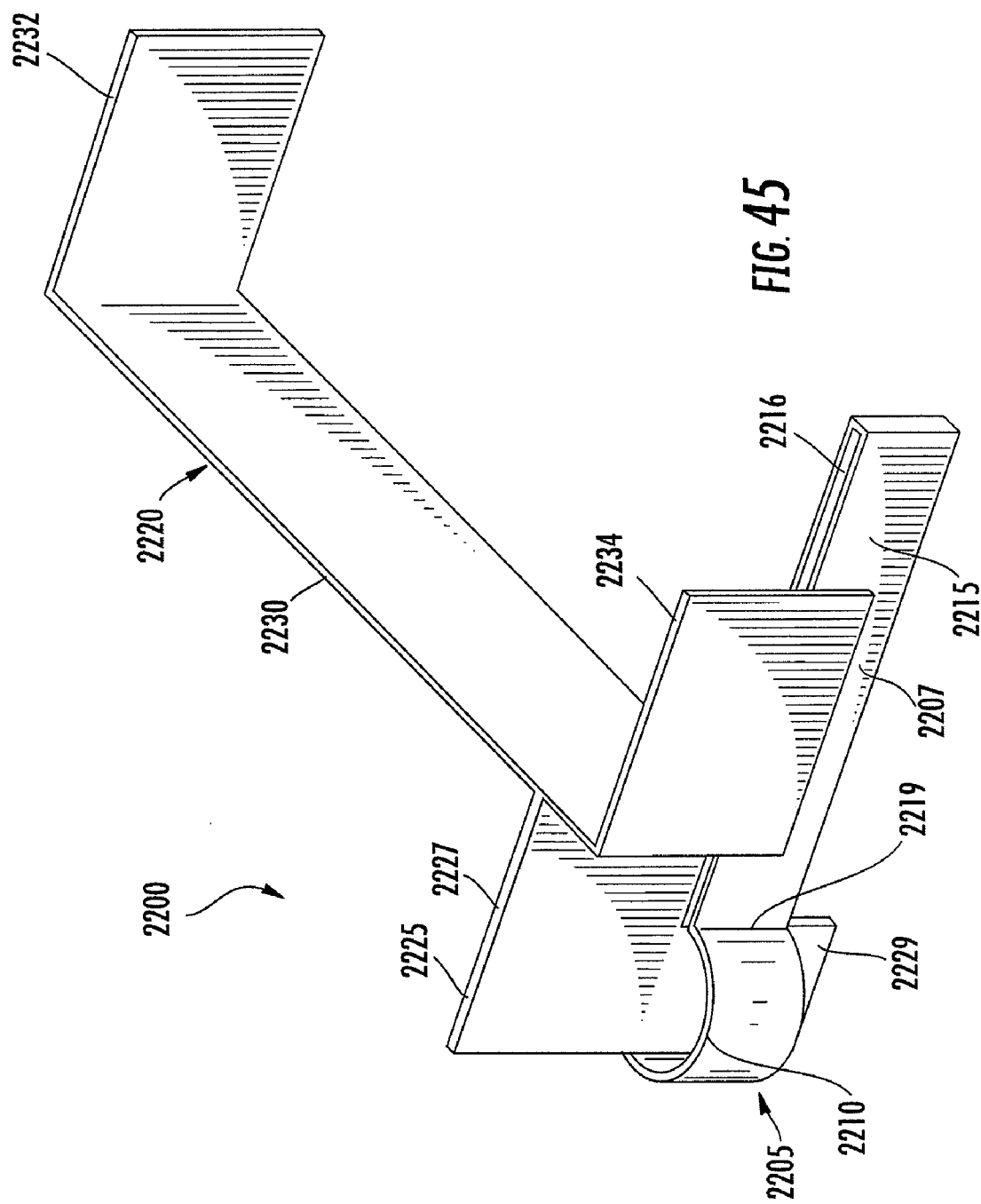

In the embodiment shown in FIG. 44, the substantially circular rotational guide portion 2205 defines a substantially circular guide opening 2211 having a diameter that is about equal to a lateral width of the cart bracket support's guide interface member 2229. In particular embodiments, the substantially circular guide opening 2211 is in communication with the elongate guide opening 2216. As shown in FIGS. 44 and 45, this allows the cart bracket support 2227 (and also the cart bracket 2220) to slide along the upper surface of the linear guide portion 2215 until the guide interface member 2229 moves from within the elongate guide opening 2216 and into the substantially circular guide opening 2211. After the guide interface member 2229 moves entirely out of the elongate guide opening 2216 and into the substantially circular guide opening 2211 (e.g., so that the lateral sides of the guide interface member 2229 are adjacent opposite inner surfaces of the rotational guide portion 2205), the cart bracket support 2227 (and also the cart bracket 2220) may rotate adjacent the rotational guide portion 2205 about the center of the circular guide opening 2211. This is depicted in FIGS. 45 and 46.

Figure 47:
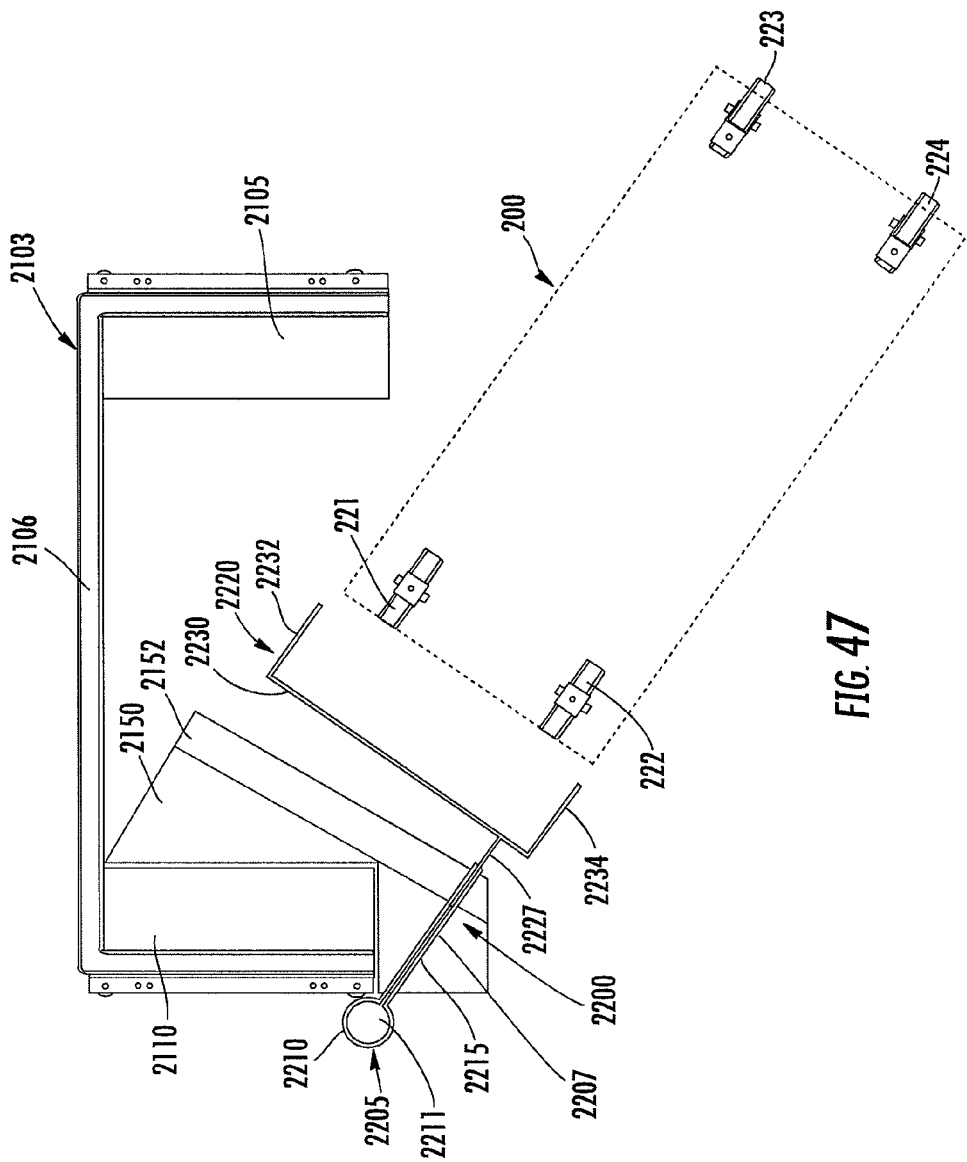
FIGS. 47-49 are top views of the cart guide of FIGS. 44-46. These figures show the process of using the cart guide to position a cart onto a scale. For purposes of clarity, the cart's body is represented as a transparent dashed rectangle.

In particular embodiments, the cart bracket support guide 2207 is mounted (e.g., substantially fixedly mounted), as shown in FIG. 47, so that the linear guide portion 2215 of the cart bracket support guide 2207 forms a pre-determined angle (e.g., of between 20 and 45 degrees) with the support bar 2106 that extends between the rear surfaces of the scale's first and second support surfaces 2105, 2110. Any suitable mechanism may be used for mounting the cart bracket support guide 2207.

Operation of the Cart Guide

Figure 46:
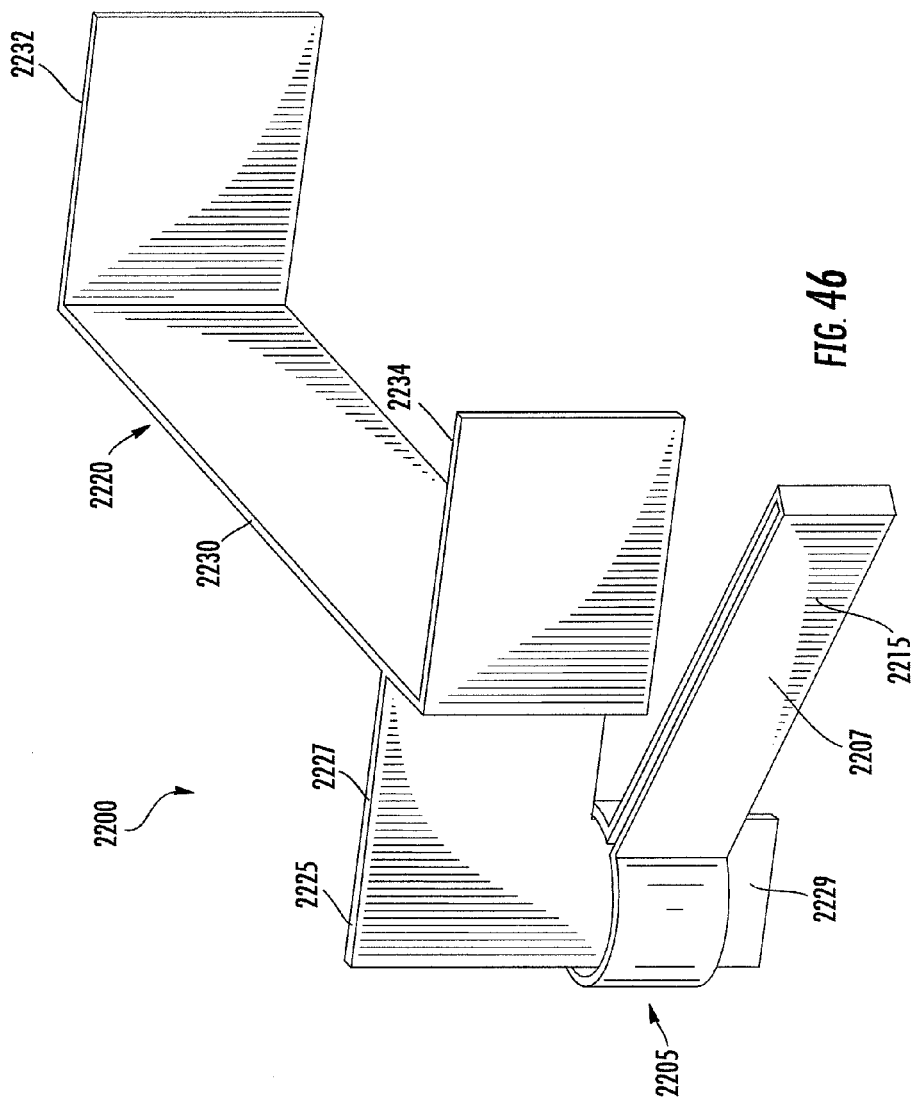
Figure 48:
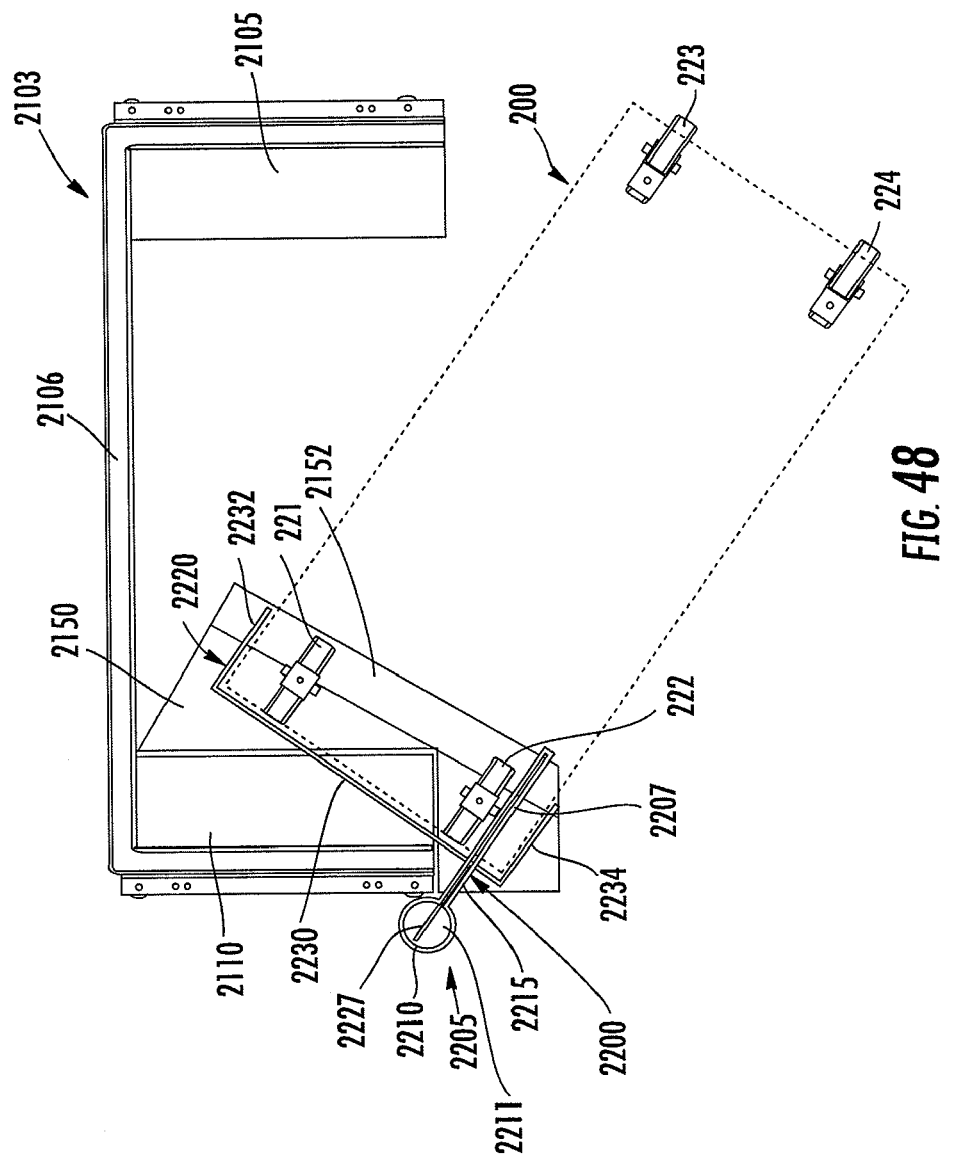
Figure 49:
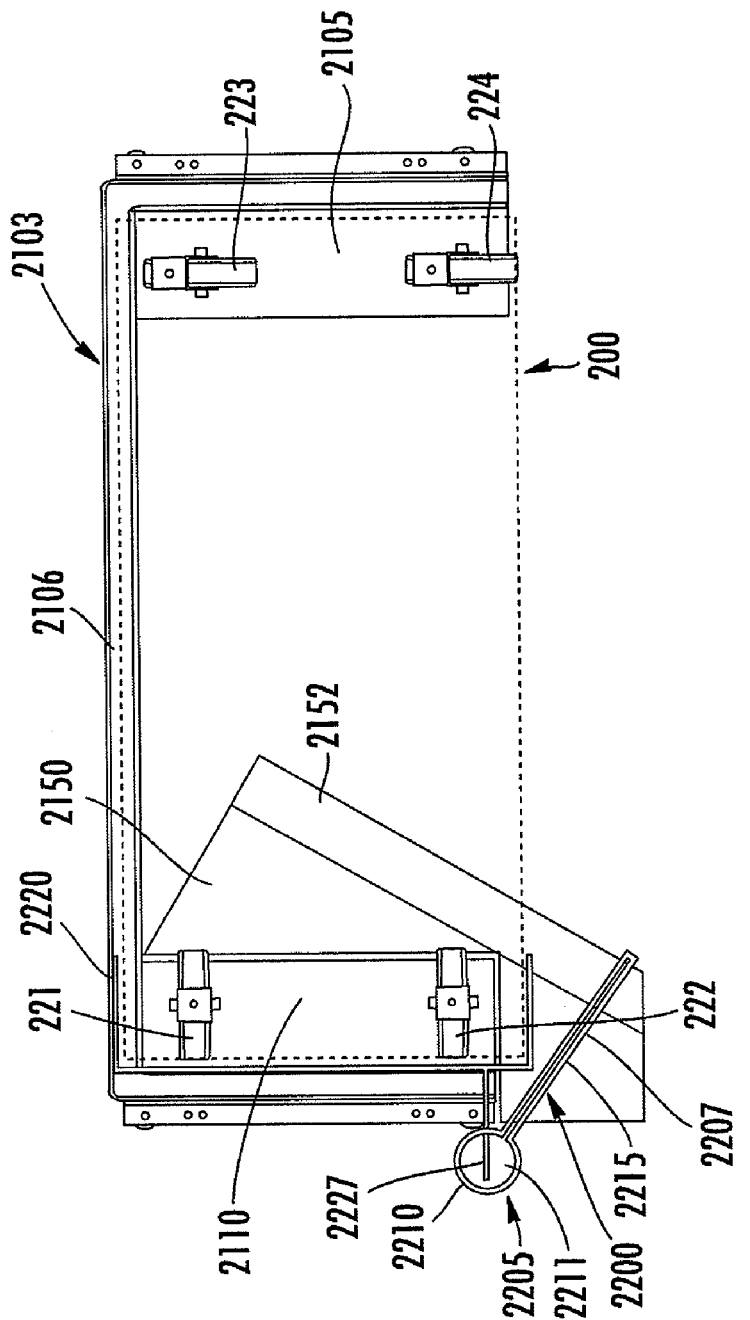

The operation of the exemplary cart guide 2200 of FIGS. 44-46 is shown in FIGS. 47-49. In this example, the cart guide 2200 is used to position a cart 200 having two front, substantially fixed (e.g., fixed), wheels 221, 222, and two rear, swiveled wheels 223, 224. In particular, the cart guide 2200 is used to: (1) position the cart's rear swiveled wheels 223, 224 onto a first support surface 2105 of a scale 2103; and (2) position the cart's front, substantially fixed wheels 221, 222 onto the scale's second support surface 2110. The first and second support surfaces 2105, 2110 of the scale 2103 are connected by a connecting member 2106.

In this example, a wheel support portion 2150 and a ramp 2152 are provided adjacent the first support surface 2110 to facilitate the movement of the cart's front wheels 221, 222 from a floor surface adjacent the scale's second support surface 2110 onto the scale's second support surface 2110. In particular embodiments, the wheel support portion 2150 is substantially horizontal and extends between the upper edge of the ramp 2152 to about the perimeter of the scale's second support surface 2110. The front wheel support portion 2150 serves to facilitate the movement of the cart's first wheels 221, 222 from the upper portion of the ramp 2152 onto the scale's second support surface 2110. In particular embodiments, the upper surface of the substantially horizontal wheel support portion 2150 is a reduced friction (e.g., smooth) surface, which allows the cart's front wheels 221, 222 to slide relative to the substantially horizontal wheel support portion 2150. Similarly, in various embodiments, the upper surface of the scale's second support surface 2110 is a reduced friction (e.g., smooth) surface, which allows the cart's front wheels 221, 222 to slide into position on the second support surface 2110.

To use the cart guide 2200, a user first positions the cart bracket 2220, as shown in FIG. 44, so that the cart bracket support's guide interface member 2229 is positioned adjacent an outer end 2217 of the linear guide portion 2215 of the cart bracket support guide 2207. The user then positions the cart 200 as shown in FIG. 47 so that the cart's lateral sides are respectfully substantially in-line with, and substantially parallel to, the inner sides of the cart bracket's the first and second side members 2232, 2234. The user then pushes the cart 200 toward the cart bracket 2220 until the cart's front edge engages the cart bracket's base portion 2230. In this "cart docked" orientation, the cart bracket's first and second side members 2232, 2234 engage respective side walls of the cart 200. As a result, the cart 200 is restricted from moving laterally relative to the cart bracket 2220 and from rotating relative to the cart bracket 2220.

Next, while maintaining the cart 200 in a "cart docked" orientation, the user pushes the cart 200 toward the cart guide's rotational guide portion 2205, which causes the cart bracket support's guide interface member 2229 to slide relative to the upper surface of the linear guide portion 2215 of the cart bracket support guide 2207 (e.g., as shown in FIGS. 44 and 45, and in FIGS. 47 and 48) until the guide interface member 2229 moves from within the elongate guide opening 2216 into the substantially circular guide opening 2211 (See FIGS. 44 and 45). After the guide interface member 2229 moves entirely out of the elongate guide opening 2216 and into the substantially circular guide opening 2211 (e.g., so that the lateral sides of the guide interface member 2229 are adjacent opposite inner surfaces of the rotational guide portion 2205—See FIGS. 45 and 48), the user pushes the rear end of the cart 200 toward the scale's first support surface 2105. This causes the cart bracket support 2227 (and also the cart bracket 2220) to rotate adjacent the rotational guide portion 2205 about the center of the circular guide opening 2211. (See FIGS. 46 and 49). As a result, the cart bracket 2220 guides: (1) the sliding rotational movement of the cart's front, substantially fixed wheels 221, 222 from atop the substantially horizontal wheel support portion 2150, and onto the scale's second support surface 2110, as shown in FIGS. 48 and 49; and (2) the rolling movement of the cart's swiveled wheels 223, 224 onto the scale's first support surface 2105, as is also shown in FIGS. 48 and 49. Once the cart's front and rear wheels 221-224 are fully supported by the scale's first and second support surfaces 2105 and 2110, the cart may be weighed.

To remove the cart from its position on the scale 2103, the user simply reverses the steps outlined above.

It should be understood, in light of this disclosure, that various embodiments of the cart guide may be used, for example, for positioning a cart onto a scale within a dispenser, or within any other suitably dimensioned enclosure. It should also be understood in light of this disclosure that a variety of other suitable mechanisms may be used for guiding the cart's wheels along a predetermined path by restricting the movement of the cart's body.

Conclusion

Many modifications and other embodiments of the invention will come to mind to one skilled in the art to which this invention pertains having the benefit of the teachings presented in the foregoing descriptions and the associated drawings. For example, as will be understood by one skilled in the relevant field in light of this disclosure, the invention may take form in a variety of different mechanical and operational configurations. In addition, although various aspects of the invention are described above in the context of a dispenser (e.g., an automated dispenser), the invention may be implemented in a variety of different contexts. For example, the invention may be embodied in cartridge storage systems that are adapted for: (1) loading a storage cartridge with items to be stored; and (2) moving the loaded storage cartridge into a loaded position within a secure storage cabinet. In addition, although many of the embodiments of the invention described herein were described in the context of loading a storage cartridge having a pair of fixed wheels and a pair of swiveled wheels, it should be understood that the techniques and apparatuses described herein may be applied, for example, to any wheeled device having any combination of wheels (e.g., fixed and/or swiveled wheels). Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What we claimed is:

1. A wheel positioning assembly for facilitating the insertion of a cart into a cart enclosure, said cart having a first fixed front wheel disposed adjacent both a front portion of said cart and a first lateral side of said cart, a second fixed front wheel disposed adjacent both the front portion of said cart and a second lateral side of said cart, a first rear wheel disposed adjacent both the rear portion of said cart and said first lateral side of said cart, and a second rear wheel disposed adjacent the rear portion of said cart and said second lateral side of said cart, said wheel positioning assembly comprising:

a first wheel stop comprising one or more walls defining a first front wheel enclosure having an entrance opening, said entrance opening configured to permit said first fixed front wheel to be received within said first front wheel enclosure; said first front wheel enclosure configured for:

receiving said first fixed front wheel within said first front wheel enclosure, and engaging and stopping said first fixed front wheel when said first fixed front wheel is adjacent a desired first-front-wheel position within said first front wheel enclosure; and permitting said first fixed front wheel to rotate with said cart, within said first front wheel enclosure, and about a vertical axis extending through said first fixed front wheel as said second rear wheel moves toward a desired second-rear-wheel position within said cart enclosure while maintaining said first front wheel adjacent said desired first-front-wheel position; and a second wheel stop that is configured for engaging and stopping said second rear wheel when said second rear wheel is adjacent said desired second-rear-wheel position within said cart enclosure.

2. The wheel positioning assembly of claim 1, wherein:
said cart enclosure comprises a rear wall, a first side wall, and a second side wall; and
when said first-front-wheel is in said desired first-front-wheel position, said cart does not engage said rear wall, said first side wall, or said second side wall of said cart enclosure.

3. The wheel positioning assembly of claim 1, wherein said wheel positioning assembly comprises a first wheel guide that is configured for physically guiding said first front wheel toward said desired first-front-wheel position within said cart enclosure.

4. The wheel positioning assembly of claim 3, wherein:
said first wheel guide comprises a first wall and a second wall;
said first and second walls are positioned on opposite sides of a substantially linear path leading to first-front-wheel position; and
said first and second walls are configured to prevent said first front wheel from diverging from said path as said first, front wheel travels between said first and second walls.

5. The wheel positioning assembly of claim 4, wherein said wheel guide comprises a ramp disposed between said first and second walls.

6. The wheel positioning assembly of claim 4, wherein said first wall is spaced apart from said second wall by a distance that is between about 10% and about 50% greater than the distance between first and second lateral sides of said first front wheel.

7. The wheel positioning assembly of claim 6, wherein said first wall is spaced apart from said second wall by a distance that is between about 20% and about 30% greater than the distance between said first and second lateral sides of said first front wheel.

8. The wheel positioning assembly of claim 4, wherein said wheel positioning assembly comprises a barrier for obstructing the movement of said second rear wheel into said desired second-rear-wheel position when said first, front wheel is disposed between said first and second walls of said first wheel guide.

9. The wheel positioning assembly of claim 8, wherein:
said first wheel guide comprises an inner threshold that is adjacent an inner end of said first wheel guide;
said barrier defines an inner lateral edge; and
at least a portion of said inner threshold is spaced apart from said inner lateral edge of said barrier by a distance that is about equal to, or less than, a distance between: (a) an axis of rotation of said first front wheel of said cart; and (b) a swivel axis of said second rear wheel of said cart.

10. The wheel positioning assembly of claim 1, wherein:
when said first front wheel is in said desired first-front-wheel position, said first front wheel is positioned on a scale within said cart enclosure; and
when said second front wheel is in said desired second-front-wheel position, said second front wheel is positioned on said scale.

11. The wheel positioning assembly of claim 10, wherein, when said second rear wheel is in said second-rear-wheel position, said second rear wheel is positioned on said scale.

12. The wheel positioning assembly of claim 11, wherein:
said scale comprises a first weighing platform and a second weighing platform, said second weighing platform being spaced apart from said first weighing platform;
when said first front wheel is in said desired first-front-wheel position, said first front wheel is positioned on said first weighing platform; and
when said second front wheel is in said desired second-front-wheel position, said second front wheel is positioned on said second weighing platform.

13. The wheel positioning assembly of claim 11, wherein:
said scale comprises a first weighing platform and a second weighing platform, said second weighing platform being spaced apart from said first weighing platform;
when said first front wheel is in said desired first-front-wheel position, said first front wheel is positioned on said first weighing platform; and
when said second rear wheel is in said desired second-rear-wheel position, said second rear wheel is positioned on said second weighing platform.

14. The wheel positioning assembly of claim 1, further comprising a wheel lock for selectively locking said second rear wheel in said desired second-rear-wheel position.

15. The wheel positioning assembly of claim 1, further comprising a gate that is configured to:
prevent the movement of said second rear wheel toward said desired second-front-wheel position along a particular path; and
allow the movement of said second rear wheel away from said desired second-front-wheel position along said particular path.

16. The wheel positioning assembly of claim 15, wherein said gate is a one-way gate.

17. The wheel positioning assembly of claim 1, wherein:
said first and second rear wheels are mounted to swivel relative to said base portion of said cart.

18. The wheel positioning assembly of claim 17, wherein said wheel positioning assembly comprises a first wheel guide that is configured for physically guiding said first front wheel toward a desired first-front-wheel position within said cart enclosure.

19. The wheel positioning assembly of claim 18, wherein said wheel positioning assembly comprises a second wheel guide that is configured for physically guiding said second front wheel toward a desired second-front-wheel position within said cart enclosure.

20. A method of inserting a cart into an enclosure, said cart having a first, fixed front wheel disposed adjacent both the front portion of said cart and a first lateral side of said cart; a second, fixed front wheel disposed adjacent both a front portion of said cart and a second lateral side of said cart; a first rear wheel disposed adjacent both a rear portion of said cart and said first lateral side of said cart; and a second rear wheel disposed adjacent both the rear portion of said cart and said second lateral side of said cart; said method comprising the steps of:
moving said cart into a first position in which: (A) said second lateral side of said cart and a front face of said enclosure form an angle of between about 10 and about 80 degrees; and (B) a linear path of travel of said first, fixed front wheel is at least substantially aligned with a desired first-front-wheel position within said enclosure;

rolling said cart from said first position into a second position in which said first, fixed front wheel engages a first wheel stop that is disposed adjacent said desired first-front-wheel position; and while maintaining said first, fixed front wheel positioned adjacent said first wheel stop, rotating said cart about said first, fixed front wheel until said cart is in a third position in which: (A) said cart is disposed substantially entirely within said enclosure; and (B) said second lateral side of said cart is substantially parallel to said front face of said enclosure.

21. The method of claim 20, wherein:
said enclosure is a dispenser that comprises a scale that is configured to weigh said cart when said cart is in said third position.

22. The method of claim 20, wherein:
said method further comprises using a wheel guide to physically guide the movement of said first, fixed front wheel as said cart moves from said first position to said second position; and
said wheel guide comprises a ramp for use in moving said cart from said first position to said second position.

23. The method of claim 22, wherein:
said wheel guide comprises a first wall and a second wall;
said first and second walls are positioned on opposite sides of a path traveled by said first front wheel as said cart moves from said first position to said second position; and
said first and second walls are configured to prevent said first front wheel from diverging from said path as said first, front wheel travels between said first and second walls.

24. The method of claim 20, further comprising the step of locking said second, rear wheel in place while said cart is in said third position.

25. A wheel positioning assembly for facilitating the insertion of a cart into a dispenser, said cart having a first, fixed front wheel that is disposed adjacent both a front portion of said cart and a first lateral side of said cart; a second, fixed front wheel that is disposed adjacent both the front portion of said cart and a second lateral side of said cart; a first rear wheel that is disposed adjacent a rear portion of said cart and said first lateral side of said cart; and a second rear wheel that is disposed adjacent the rear portion of said cart and said second lateral side of said cart; said wheel positioning assembly comprising:
a first wheel guide for physically guiding said first, fixed front wheel into a desired first-front-wheel position in which said first front wheel is disposed within said dispenser and adjacent a first wheel barrier; and
a user controllable locking mechanism for selectively engaging said second rear wheel, said locking mechanism having a locked configuration maintaining said second rear wheel in a desired second-rear-wheel position within said dispenser and an unlocked configuration allowing said second rear wheel to move away from said desired second-rear-wheel position, wherein:
said first wheel barrier and said locking mechanism cooperate to physically prevent removal of said cart from said dispenser when:
(A) said first front wheel is in said desired first-front-wheel position; and
(B) said second rear wheel is in said desired second-rear-wheel position and said locking mechanism is in said locked configuration.

26. The wheel positioning assembly of claim 25, wherein:
said first and second rear wheels are mounted to swivel relative to said base portion of said cart.

27. The wheel positioning assembly of claim 26, further comprising a gate that is configured for:
preventing said movement of said second rear wheel, along a particular path, toward said second-front-wheel position; and
allowing said movement of said second rear wheel away from said desired second-front-wheel position along said particular path.

28. The wheel positioning assembly of claim 27, wherein said gate is a one-way gate.

29. The wheel positioning assembly of claim 25, further comprising:
a second wheel guide for facilitating the movement of said second, rear wheel into said desired second-rear-wheel position within said dispenser.

30. A wheel positioning assembly for facilitating the insertion of a cart into an enclosure, said cart having a first front wheel disposed adjacent both a front portion of said cart and a first lateral side of said cart, a second front wheel disposed adjacent both the front portion of said cart and a second lateral side of said cart, a first rear wheel disposed adjacent both a rear portion of said cart and said first lateral side of said cart, and a second rear wheel disposed adjacent the rear portion of said cart and said second lateral side of said cart, said wheel positioning assembly comprising:
a first wheel stop that is configured for:
engaging and stopping said first front wheel when said first front wheel is adjacent a desired first-front-wheel position within said enclosure;
a second wheel stop that is configured for engaging and stopping said second rear wheel when said second rear wheel is adjacent a desired second-rear-wheel position within said enclosure;
a wheel guide that is configured for physically guiding said first front wheel toward said desired first-front-wheel position within said enclosure, wherein said wheel guide comprises a first wall and a second wall; and
a barrier for obstructing the movement of said second rear wheel into said desired second-rear-wheel position when said first front wheel is disposed between said first and second walls of said wheel guide.

31. The wheel positioning assembly of claim 30, wherein:
said wheel guide comprises an inner threshold that is adjacent an inner end of said wheel guide;
said barrier defines an inner lateral edge; and
at least a portion of said inner threshold is spaced apart from said inner lateral edge of said barrier by a distance that is about equal to, or less than, a distance between: (a) an axis of rotation of said first front wheel of said cart; and (b) a swivel axis of said second rear wheel of said cart.

* * * * *